United States Patent
Nishino et al.

(10) Patent No.: US 9,451,679 B2
(45) Date of Patent: Sep. 20, 2016

(54) ILLUMINATING LIGHT COMMUNICATION DEVICE

(75) Inventors: Hiroyuki Nishino, Hirakata (JP); Eiji Shiohama, Katano (JP); Shigeaki Yamasaki, Ibaraki (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 288 days.

(21) Appl. No.: 13/215,165

(22) Filed: Aug. 22, 2011

(65) Prior Publication Data
US 2012/0051757 A1 Mar. 1, 2012

(30) Foreign Application Priority Data

Aug. 25, 2010 (JP) .................................. 2010-188633
May 25, 2011 (JP) .................................. 2011-116927

(51) Int. Cl.
H05B 37/02 (2006.01)
H04B 10/114 (2013.01)
H04B 10/116 (2013.01)

(52) U.S. Cl.
CPC ......... H05B 37/0272 (2013.01); H04B 10/116 (2013.01); H04B 10/1149 (2013.01)

(58) Field of Classification Search
CPC . H05B 33/083; H05B 10/502; H04B 10/116
USPC ............ 315/158, 121, 153, 185 R, 193, 291, 315/307, 308
See application file for complete search history.

(56) References Cited

U.S. PATENT DOCUMENTS

| 5,517,608 | A | * | 5/1996 | Suzuki et al. ................... 398/23 |
| 5,736,881 | A | * | 4/1998 | Ortiz .............................. 327/175 |
| 6,724,376 | B2 | * | 4/2004 | Sakura et al. ................ 345/204 |
| 6,794,831 | B2 | * | 9/2004 | Leeb et al. ..................... 315/307 |
| 6,864,867 | B2 | * | 3/2005 | Biebl ............................... 345/82 |
| 7,564,198 | B2 | * | 7/2009 | Yamamoto et al. .......... 315/307 |
| 7,755,743 | B2 | * | 7/2010 | Kumahara et al. ......... 356/5.05 |
| 2006/0062582 | A1 | * | 3/2006 | Suzuki et al. ................ 398/183 |
| 2007/0065160 | A1 | * | 3/2007 | Shinohara ..................... 398/182 |

(Continued)

FOREIGN PATENT DOCUMENTS

| EP | 1 732 248 A1 | 12/2006 | |
| EP | 2094063 | * 8/2009 | ............. H05B 37/02 |

(Continued)

OTHER PUBLICATIONS

International Rectifier, Data Sheet No. PD 10037 revl, Series PVT422PbF Microelectronic Power IC, Feb. 2008.*

(Continued)

Primary Examiner — Thai Pham
(74) Attorney, Agent, or Firm — McDermott Will & Emery LLP

(57) ABSTRACT

An illuminating light communication device comprises a constant current source, a smoothing capacitor connected to an output of the constant current source, a load circuit comprising a light emitting diode and connected to the output of the constant current source, a load change element added to the load circuit and thereby partially changing load characteristic of the load circuit, and a switch element configured to determine whether or not the load change element is added to the load circuit in accordance with a binary optical communication signal.

21 Claims, 47 Drawing Sheets

(56) References Cited

U.S. PATENT DOCUMENTS

| | | |
|---|---|---|
| 2008/0068311 A1* | 3/2008 | Rast .................................. 345/82 |
| 2008/0258641 A1 | 10/2008 | Nakagawa et al. |
| 2008/0308840 A1* | 12/2008 | Ogura ............................ 257/185 |
| 2009/0045359 A1* | 2/2009 | Kumahara et al. ....... 250/559.38 |
| 2009/0213099 A1* | 8/2009 | Park et al. ..................... 345/204 |
| 2009/0232502 A1* | 9/2009 | Miyashita ........................ 398/79 |
| 2009/0245806 A1* | 10/2009 | Murayama et al. ........... 398/130 |
| 2011/0101882 A1 | 5/2011 | Endres et al. |
| 2011/0236034 A1* | 9/2011 | Schenk .............. H05B 33/0809 398/201 |

FOREIGN PATENT DOCUMENTS

| | | |
|---|---|---|
| JP | 3-8899 U | 1/1991 |
| JP | 08-191271 A | 7/1996 |
| JP | 2006-120910 A | 5/2006 |
| JP | 2010-506396 A | 2/2010 |
| JP | 2010-055824 A | 3/2010 |
| WO | 2008/041152 A2 | 4/2008 |
| WO | WO2008060469 * | 5/2008 |
| WO | WO2010064175 * 11/2009 | ............. H05B 37/02 |
| WO | WO-2010/064175 A1 | 6/2010 |
| WO | WO2010064175 * 6/2010 | ............. H05B 37/02 |
| WO | WO-2011/054552 A1 | 5/2011 |

OTHER PUBLICATIONS

European Search Report for Application No. EP 11 17 7425 dated Dec. 14, 2011.

* cited by examiner

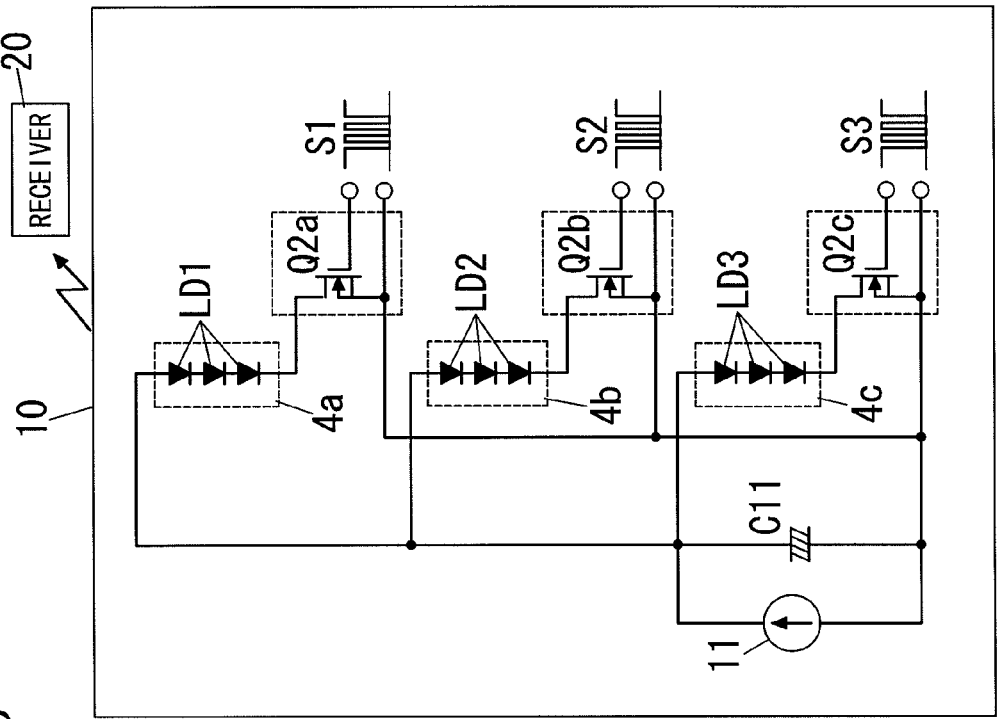
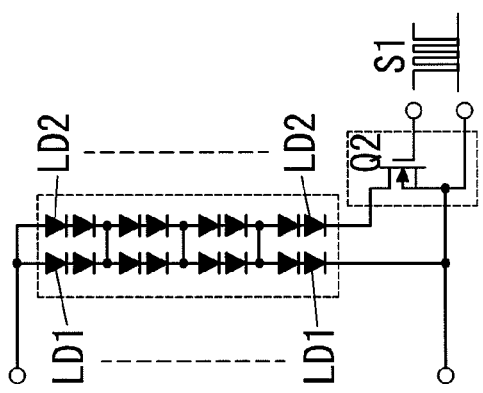
FIG. 12A
FIG. 12B

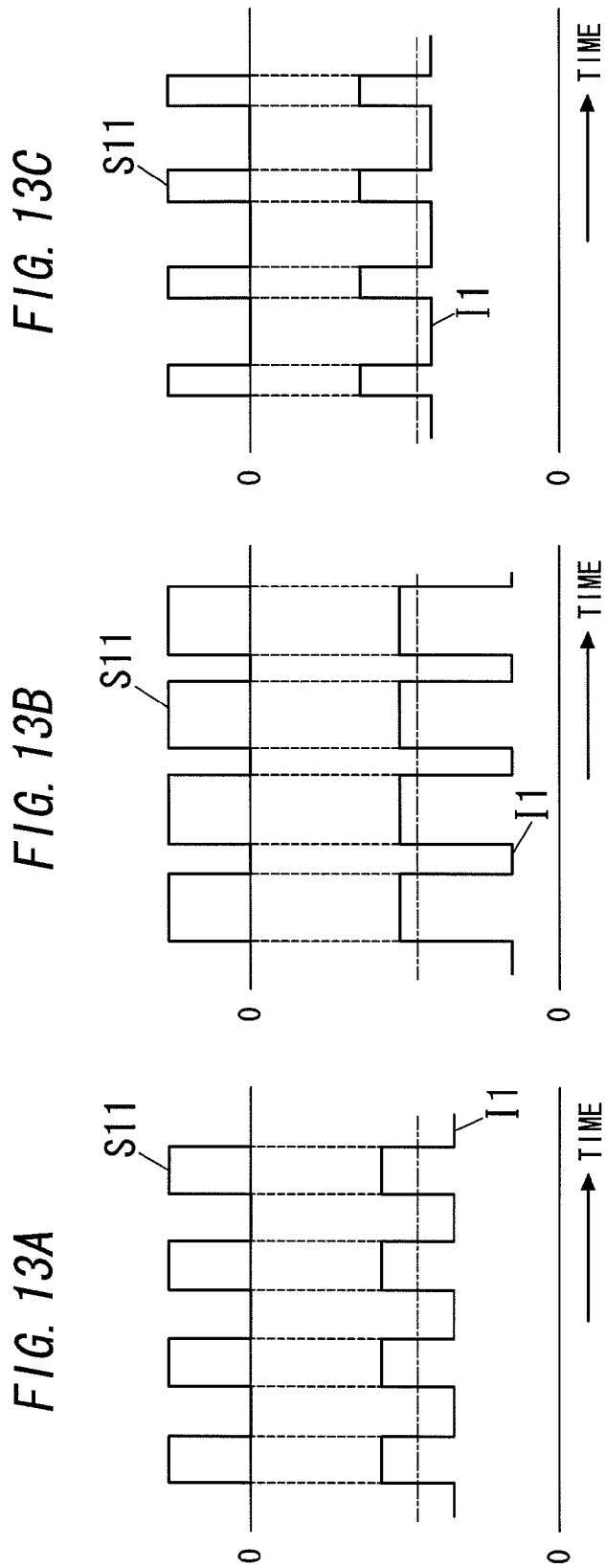

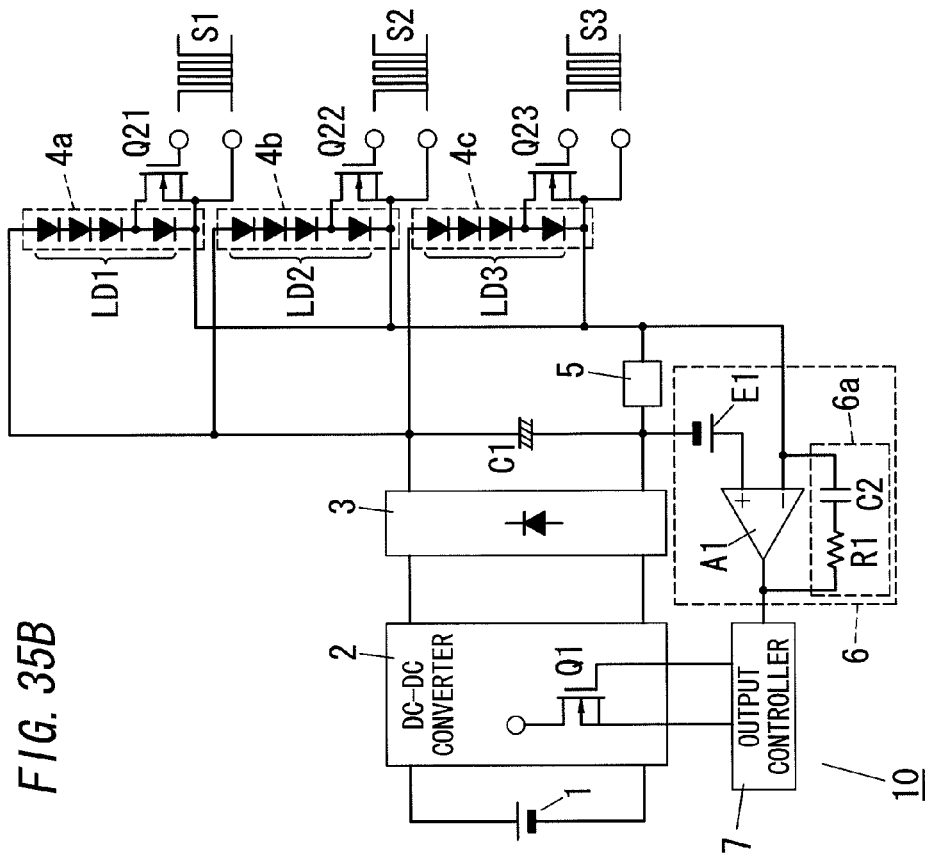
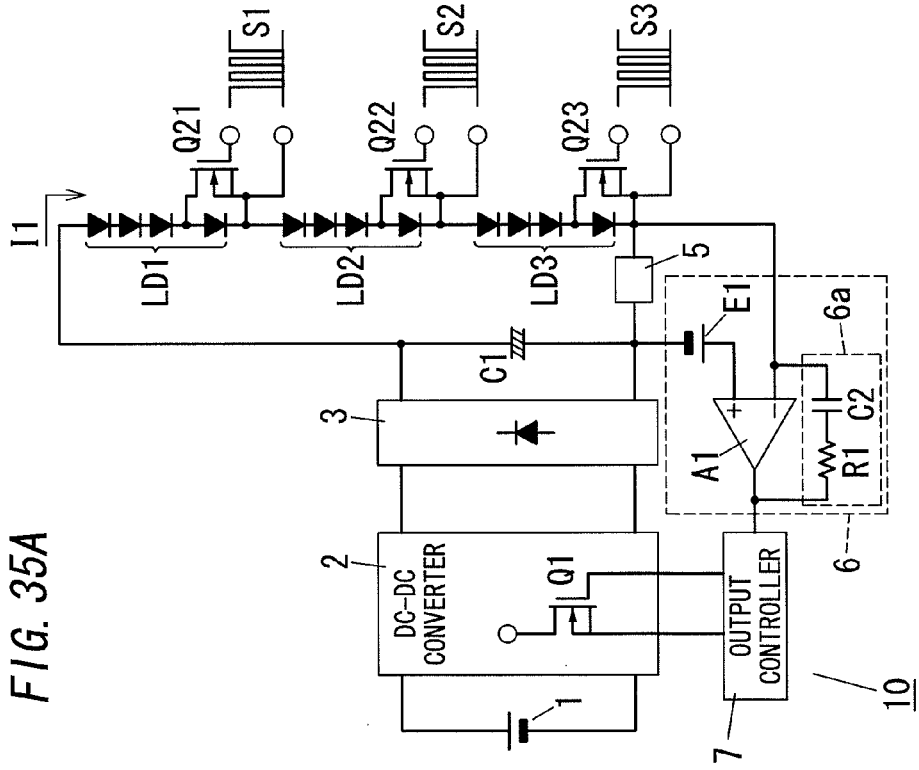
FIG. 35A
FIG. 35B

*FIG. 44 PRIOR ART*
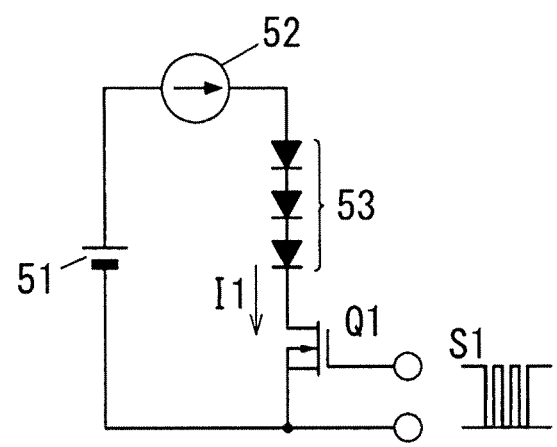
*FIG. 45A PRIOR ART* S1
*FIG. 45B PRIOR ART* I1
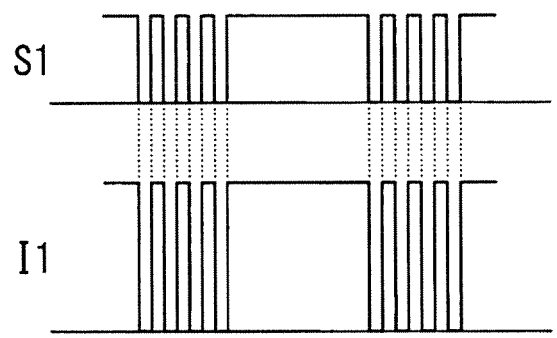

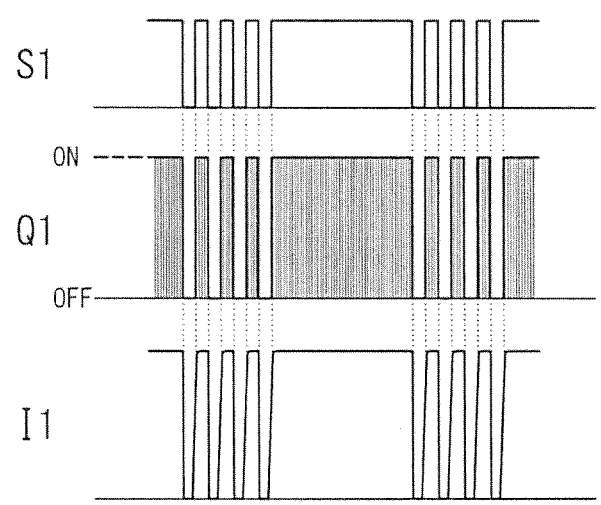
FIG. 47A PRIOR ART  S1
FIG. 47B PRIOR ART  Q1
FIG. 47C PRIOR ART  I1
FIG. 48 PRIOR ART
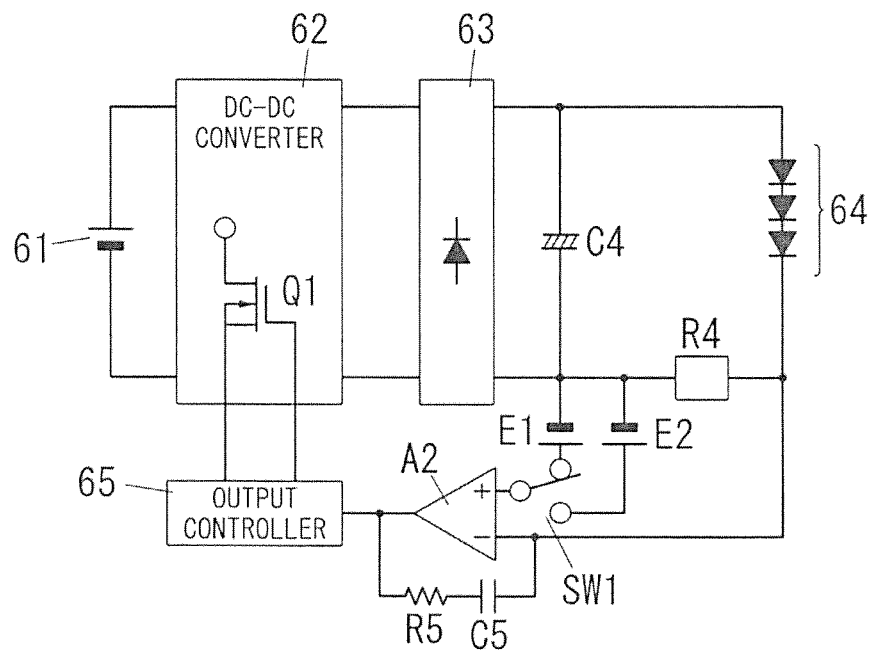

ILLUMINATING LIGHT COMMUNICATION DEVICE

TECHNICAL FIELD

The present invention relates generally to illuminating light communication devices.

BACKGROUND ART

In the past, there have been proposed a lighting apparatus, which comprises a light emitting diode (LED) as a light source, and transmits a signal by modulating intensity of an illuminating light. Because such an illuminating light communication device transmits the signal by modulating the illuminating light itself, a special device such as an infrared-ray communication device is not required. Then, because the light emitting diode is used as the light source for illuminating, electric power saving can be implemented. Therefore, it has been studied that the illuminating light communication device is used for the ubiquitous information system in underground malls.

FIG. 44 is a circuit diagram of the conventional illuminating light communication device. Then, a constant current circuit 52, three light emitting diodes 53, and a switching element Q1 are connected in series between both ends of a DC power supply 51. The switching element Q1 is switched on/off in accordance with high/low of an optical communication signal S1, and thereby a load current I1 flowing to the light emitting diodes 53 is modulated while keeping a constant current property (see FIGS. 45A and 45B).

In this circuit, the constant current circuit 52 is located to make the light emitting diode 53, having a small operating resistance, turn on stably, and then circuit loss of the constant current circuit 52 increases. For example, when the constant current circuit 52 comprises a constant current diode, assuming that the load current I1 is 500 [mA], the estimated circuit loss becomes about 2.3 [W]. Therefore, even as the light emitting diode needs little electricity, the benefit of the light emitting diode is diminished.

Thus, as shown in FIG. 46A, a DC-DC converter is located in substitution for the constant current circuit 52, and then it is conceivable that the DC-DC converter is controlled by PWM (pulse-width modulation) and thereby the circuit loss decreases. In this circuit, a current sensing resistor R3, three light emitting diodes 53, an inductor L1, and a switching element Q1 are connected in series between both ends of a DC power supply 51. Then, on/off operation of the switching element Q1 is controlled by a control circuit 54. Then, a smoothing capacitor C3 and a rectifier diode D2 are connected between both ends of a series circuit comprising the three light emitting diodes 53 and the inductor L1, and constitute the DC-DC converter, together with the inductor L1 and the switching element Q1. A feedback signal is inputted from a constant current feedback circuit 55 into the control circuit 54, and thereby an output current of the DC-DC converter is controlled to be kept generally constant. In addition, the optical communication signal S1 is inputted into the control circuit 54, and the switching element Q1 is switched on/off with a high frequency during a period of a high value of the optical communication signal S1 and thereby the load current I1 is modulated (see FIGS. 47A-47C).

Now, FIG. 46B shows a specific example of the constant current feedback circuit 55, and then an error amplifier A1 is configured to compare a voltage drop of a resistor R3, to which the load current I1 flows, to a reference voltage E1, and amplifies to output its partial difference into the control circuit 54. A series circuit comprises a resistor R4 and a capacitor C2, which are connected between an inverting input terminal and an output terminal of the error amplifier A1, and constitutes a phase compensation circuit to secure stability of the above-mentioned feedback system. For such a phase compensation circuit, a compensation circuit including an integral element is generally used to adjust a gain and a phase in a loop transfer function, and has been known as PI (Proportional-Integral) control or PID (Proportional-Integral-Derivative) control of a classic information theory. For example, FIG. 46C shows a circuit diagram of a mean current detecting circuit disclosed in Japanese Patent Application Laid-Open No. 2006-120910. An integral circuit 56 (comprising a resistor R5 and a capacitor C3) is connected between both ends of a current sensing resistor R3, and is configured to use the above-mentioned PI control as a means for averaging output.

In the illuminating light communication device shown in the above-mentioned FIG. 46A, the load current I1 is modulated by operating the DC-DC converter intermittently in accordance with the optical communication signal S1, and then the following two conditions are needed to reproduce the optical communication signal S1 faithfully as a current waveform. One of the conditions is that an operating frequency of the DC-DC converter is higher than a frequency of the optical communication signal (condition 1), and the other is that the load current I1 is not smoothed (condition 2).

For satisfying the condition 1, for example, if a communication speed is 9.6 [kbps], it is necessary that the operating frequency of the DC-DC converter is equal to or more than 100 [kHz] (that is, about 10 times of the communication speed), preferably equal to or more than 1 [MHz] (that is, about equal to or more than 100 times of that). However, if the operating frequency of the DC-DC converter is relatively high, loss of the switching element Q1 in the DC-DC converter increases, and thus there is a problem that measures of noise-reduction are needed.

Then, in the case of the condition 2, when a smoothing capacitor is connected in parallel to the light emitting diode 53, the load current I1 is not intermitted even if the switching element Q1 in the DC-DC converter is intermitted. Therefore, it becomes difficult to modulate the load current I1 in accordance with the optical communication signal. On the other hand, if the load current I1 is not smoothed, a ripple current occurs in the load current I1. The ripple current depends on the operating frequency component of the DC-DC converter. Thus, there is a problem that measures of noise from electric wiring are needed. It is desirable to increase the operating frequency of the DC-DC converter to inhibit the ripple of the operating frequency component while keeping a capacity of the smoothing capacitor as small as possible so as not to smooth the load current I1. However, when the operating frequency increases, there is a problem that loss of the switching element Q1 also increases.

Then, in the past, there have been also proposed an illuminating light communication device, having a circuit configuration shown in FIG. 48, and using a DC-DC converter to which a constant current feedback circuit is added. In this circuit, a DC-DC converter 62 is operated by an input from a DC power supply 61, and its output is converted to a DC voltage having a desired voltage value by a rectifier circuit 63 and a smoothing capacitor C4. Three light emitting diodes 64 and a current sensing resistor R4 are connected in series between both ends of the smoothing capacitor C4. When the load current I1 flows, the voltage drop occurred in the resistor R4 is compared to the reference voltage E1 by an error amplifier A2. Then, its partial difference is amplified and is fed back to an output controller 65 in the DC-DC converter 62 by the error amplifier A2, and then the load current I1 is controlled so as to be a constant current. In addition, a series circuit, comprising a resistor R5 and a capacitor C5, is connected between an inverting input terminal and an output terminal of the error amplifier A2, and the series circuit constitutes a phase compensation circuit, and adjusts a phase of a feedback signal while increasing the gain in a low frequency domain and inhibiting the gain in a high frequency domain.

FIG. 49A is Bode diagram showing an output property of this circuit, and then the gain (L1 in FIG. 49A) linearly decreases with increasing of the frequency. Then, the phase angle (L2 in FIG. 49A) maintains around 90 degrees to the frequency of about 10 [kHz] and phase margin is secured. Thus, stability of the feedback system is good.

In the circuit shown in FIG. 48, a reference voltage E1 or E2 is connected to a non-inverting input terminal of the error amplifier A2 through an electric switch SW1, and the electric switch SW1 is switched in accordance with the optical communication signal S1, and thereby the load current I1 can be modulated. That is, one reference voltage E1 is set so that the load current I1 becomes a current value for normal illumination, and the other reference voltage E2 is set so that the load current I1 becomes a current value smaller than the current value for normal illumination. Then, the switch SW1 is switched in accordance with the optical communication signal S1, and thereby the load current is modulated. Here, when the load current in the reference voltage E1 is 500 [mA] and the load current in the reference voltage E2 is 100 [mA] and the switch SW1 is switched in accordance with the optical communication signal of 10 [kHz], FIG. 49B shows a simulation result of the load current I1. In this simulation result, the load current I1 is averaged into a value (about 300 [mA]) intermediate between the current value (500 [mA]) in the reference voltage E1 and the current value (100 [mA]) in the reference voltage E2, and thus the load current I1 is not modulated in accordance with the optical communication signal.

As can be expected from Bode diagram in FIG. 49A, when the optical communication signal has a frequency of about 10 [kHz], the frequency domain is a domain where the gain of the error amplifier A2 can not be expected and output control can not follow. Therefore, when the load currents in the reference voltages E1, E2 are averaged, only the averaged load current can be provided. Here, if the phase compensation circuit is removed from the circuit shown in FIG. 48, the gain of the error amplifier A2 can be secured even in a high frequency domain, and it can be expected that the load current is modulated in accordance with the optical communication signal. However, the feedback system becomes unstable and thereby abnormality oscillation may occur. Therefore, there is a problem that it is difficult to modulate the load current I1 by changing a circuit constant of the phase compensation circuit added to the error amplifier A2.

DISCLOSURE OF THE INVENTION

It is an object of the present invention to provide an illuminating light communication device, of which a circuit added for communication can be simplified, which can faithfully modulate an outputted light in accordance with a signal for an optical communication (hereinafter referred to as "an optical communication signal") having a high frequency.

An illuminating light communication device of the present invention comprises a constant current source, a smoothing circuit, a load circuit, a load change element, and a switch element. The smoothing circuit and the load circuit comprising a light emitting diode are connected to an output of the constant current source. The load change element is configured to partially change load characteristic of the load circuit when being added to the load circuit. The switch element is configured to determine whether or not the load change element is added to the load circuit in accordance with a binary optical communication signal.

According to the invention, a circuit added for communication can be simplified, and an outputted light can be faithfully modulated in accordance with an optical communication signal having a high frequency.

In the illuminating light communication device, it's preferred that the load change element is a resister which is connected in series to the light emitting diode, and the switch element is connected in parallel to the resister.

In the illuminating light communication device, it's preferred that the load change element comprises a constant voltage circuit section, which includes at least a constant voltage element connected in series to the light emitting diode, and the switch element is connected in parallel to the constant voltage circuit section.

In the illuminating light communication device, it's preferred that the load circuit comprises a plurality of load circuits, and the plurality of load circuits are connected in parallel between outputs of the constant current source, and at least one of the plurality of load circuits is provided with the load change element and the switch element.

In the illuminating light communication device, it's preferred that each of the plurality of load circuits comprises the switch element and the light emitting diode having a different emission color with respect to each load circuit.

In the illuminating light communication device, it's preferred that the load circuit comprises the light emitting diode comprising a plurality of light emitting diodes which are connected in series, and the switch element is connected in parallel to a part of the plurality of light emitting diodes.

In the illuminating light communication device, it's preferred that the load circuit comprises a plurality of load circuits, and the plurality of load circuits are connected in parallel between outputs of the constant current source, and each of the plurality of load circuits comprises the light emitting diode comprising a plurality of light emitting diodes which are connected in series, and the light emitting diode has a different emission color with respect to each load circuit, and the switch element in each of the plurality of load circuits is connected in parallel to a part of the plurality of light emitting diodes.

In the illuminating light communication device, it's preferred that the load circuit comprises a plurality of load circuits, and the plurality of load circuits are connected in parallel between outputs of the constant current source, and the switch element is connected in series to one or more load circuits, at least except for one load circuit, of the plurality of load circuits, and the load change element is the one or more load circuits to which the switch element is connected in series.

It's preferred that the illuminating light communication device further comprises a duty regulation unit to change an on/off duty ratio of the optical communication signal.

In the illuminating light communication device, it's preferred that the constant current source comprises a constant current feedback system, which comprises a converter, a current sensing unit, a difference amplifying unit, and a controller. The converter generates a DC output. The current sensing unit generates a voltage drop depending on a load current flowing to the load circuit. The difference amplifying unit amplifies a difference between the voltage drop generated in the current sensing unit and a predetermined reference voltage. The controller controls an output of the converter so that an average value of the load current becomes generally constant in accordance with an output of the difference amplifying unit.

In the illuminating light communication device, it's preferred that the constant current feedback system is provided with a phase compensation circuit including an integral element, and adjusting a phase of the output of the difference amplifying unit.

It's preferred that the illuminating light communication device further comprises a communication unit. A signal generation circuit for generating the optical communication signal, the load change element, and the switch element are housed inside a case of the communication unit, and then the communication unit is connected to the load circuit through a mechanism element for connection.

It's preferred that the illuminating light communication device further comprises an insulation, which electrically insulates the switch element from the signal generation circuit, for generating the optical communication signal.

In the illuminating light communication device, it's preferred that the optical communication signal comprises several different kinds of optical communication signals, and is divided into a plurality of signal groups by difference in signals, and the insulation comprises a plurality of insulations, and the switch element is located in each of the plurality of signal groups, and each of the plurality of insulations is located to electrically insulate the signal generation circuit from the switch element.

It's preferred that the illuminating light communication device further comprises a carrier wave generation unit, a modulation unit, an insulating transformer, and a demodulation unit. The carrier wave generation unit generates a carrier wave, which is set so as to have a higher frequency than the optical communication signal, and thereby the carrier wave can be separated from the optical communication signal. The modulation unit modulates the optical communication signal with the carrier wave. The insulating transformer is connected between the modulation unit and the switch element. The demodulation unit outputs a signal, obtained by removing the carrier wave from an output of the insulating transformer, into the switch element.

In the illuminating light communication device, it's preferred that the light emitting diode is an organic light emitting diode.

BRIEF DESCRIPTION OF THE DRAWINGS

Preferred embodiments of the invention will now be described in further details. Other features and advantages of the present invention will become better understood with regard to the following detailed description and accompanying drawings where:

FIG. 12A is a circuit diagram showing other configuration of the Embodiment 8;

FIG. 12B is a circuit diagram showing other configuration of the Embodiment 8;

FIG. 13A is a wave form chart of a load current flowing to an illuminating light communication device of an Embodiment 9;

FIG. 13B is a wave form chart of a load current flowing to an illuminating light communication device of an Embodiment 9;

FIG. 13C is a wave form chart of a load current flowing to an illuminating light communication device of an Embodiment 9;

FIG. 35A is a circuit diagram for an illuminating light communication device of an Embodiment 18;

FIG. 35B is a circuit diagram for the illuminating light communication device of the Embodiment 18;

FIG. 44 is a circuit diagram for a conventional illuminating light communication device;

FIG. 45A is a wave form chart for describing an operation of the conventional illuminating light communication device;

FIG. 45B is a wave form chart for describing an operation of the conventional illuminating light communication device;

FIG. 47A is a wave form chart for describing an operation of the another conventional illuminating light communication device;

FIG. 47B is a wave form chart for describing an operation of the another conventional illuminating light communication device;

FIG. 47C is a wave form chart for describing an operation of the another conventional illuminating light communication device;

FIG. 48 is a circuit diagram for yet another conventional illuminating light communication device;

BEST MODE FOR CARRYING OUT THE INVENTION

Hereinafter, embodiments of the present invention is explained with reference to figures.

Embodiment 1

Figure 1A:
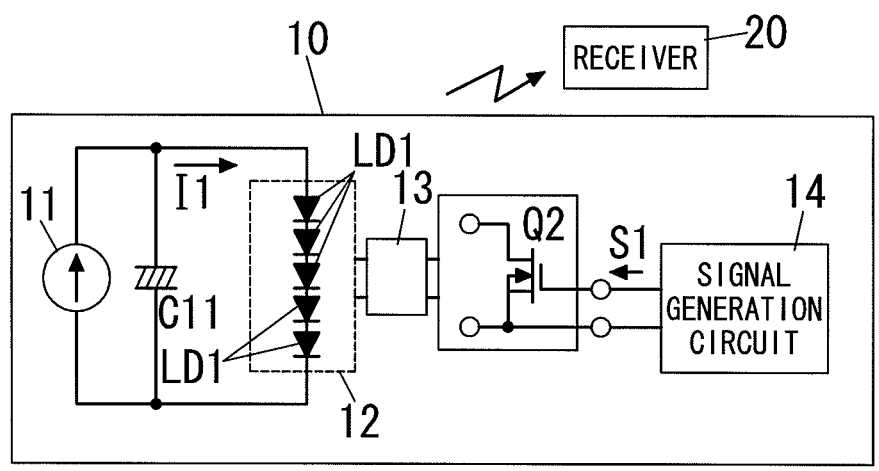
FIG. 1A is a circuit diagram for an illuminating light communication device of an Embodiment 1.

An illuminating light communication device of Embodiment 1 is explained with reference to FIGS. 1A and 1B. FIG. 1A is a circuit diagram for an illuminating light communication device 10. The illuminating light communication device 10 comprises a constant current source 11, a smoothing capacitor C11 (a smoothing circuit), a load circuit 12, a load change element 13, a signal generation circuit 14, and a switch element Q2.

The smoothing capacitor C11 is connected between outputs of the constant current source 11, and smoothes a power outputted from the constant current source 11.

The load circuit 12 comprises a plurality of light emitting diodes LD1, which are connected in series between the outputs of the constant current source 11, and receives the power outputted from the constant current source 11.

The load change element 13 is configured to partially change load characteristic of the load circuit 12, when being added to the load circuit 12. Then, for example, the load change element 13 comprises a resister, which is connected in parallel to a part of the plurality of light emitting diodes LD1.

The signal generation circuit 14 is configured to generate a binary optical communication signal. In addition, the signal generation circuit 14 may generate the binary optical communication signal in accordance with a transmitting signal, which is transmitted from an external device.

The switch element Q2 comprises a switching device (for example, MOSFET) connected in series to the resistor of the load change element 13. The switch element Q2 is switched on/off by receiving the binary optical communication signal, and thereby determines whether or not the load change element 13 is added to the load circuit 12.

Figure 1B:
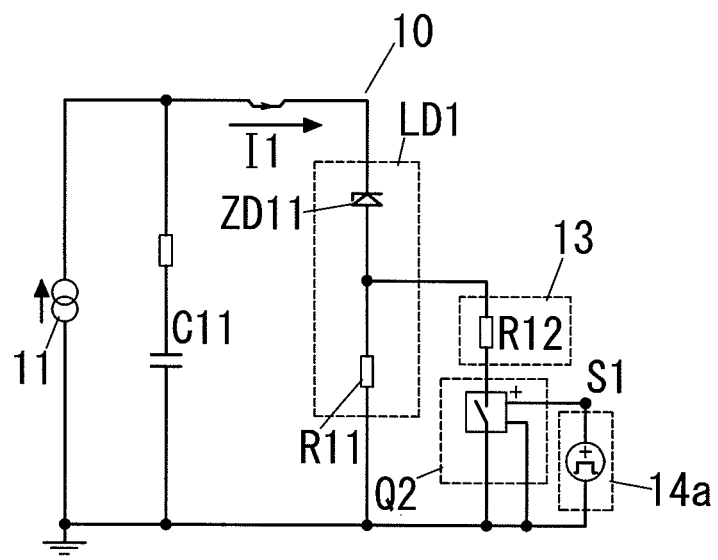
FIG. 1B is a circuit diagram modeled for simulation of the illuminating light communication device of the Embodiment 1.

FIG. 1B is a circuit diagram modeled for simulation with respect to a circuit shown in FIG. 1A, and then the same code is referred to circuit components of FIG. 1B corresponding to circuit components of FIG. 1A. In addition, a light emitting diode LD1 is equivalently replaced with a series circuit, which comprises a Zener diode ZD11 having a constant on-voltage and an on-resistance R11. Then, a resistor R12 is used as the load change element 13, and is connected in parallel to the on-resistance R11 when the switch element Q2 is switched on. That is, a series circuit comprising the resistor R12 and the switch element Q2 is connected between both ends of the on-resistance R11. Then, the signal generation circuit 14 is equivalently replaced with an oscillator 14a generating a rectangular wave signal of 10 [kHz] corresponding to an optical communication signal S1.

Figure 2A:
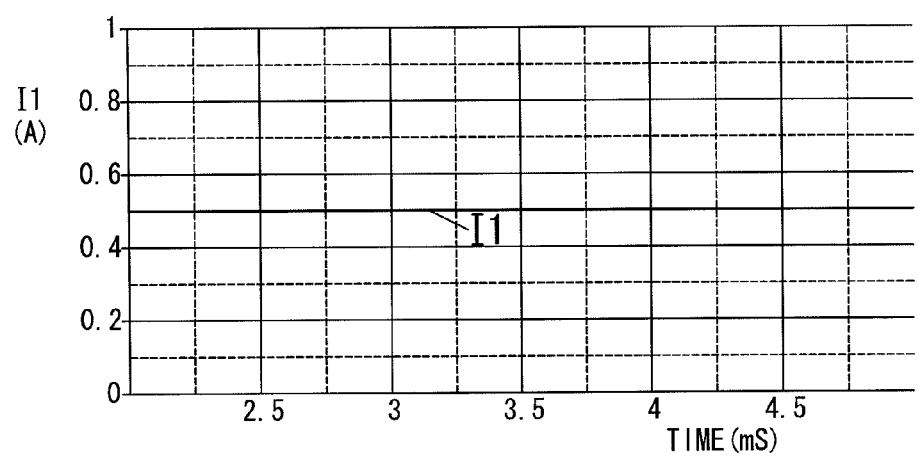
FIG. 2A is a wave form chart showing a simulation result.
Figure 2B:
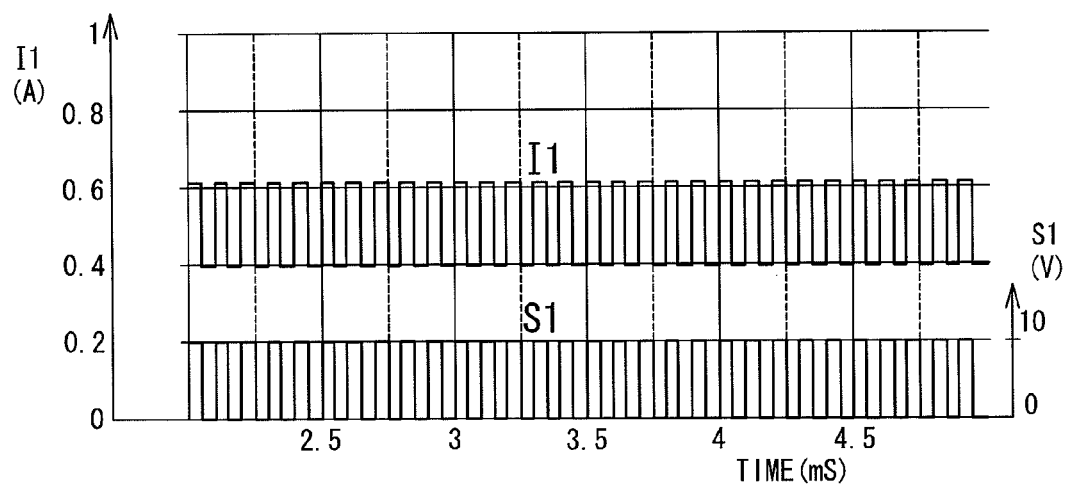
FIG. 2B is a wave form chart showing a simulation result.

Each of FIGS. 2A and 2B shows a simulation result of a load current I1 by use of a circuit shown in FIG. 1B. FIG. 2A shows a simulation result of the load current I1 in a state where the optical communication signal S1 is stopped, and an average value of the load current I1 is about 500 [mA]. FIG. 2B shows a wave form chart for the load current I1 flowing to the light emitting diode LD1. This wave form chart shows the load current I1 modulated by alternately switching a connection-state where the rectangular wave signal of 10 [kHz] is outputted from the oscillator 14a and the resistor R12 is connected in parallel to the on-resistance R11 through the switch element Q2, and a non-connection-state where the resistor R12 is not connected to the on-resistance R11. Here, the load current I1 is about 600 [mA] when the switch element Q2 is switched on, and is about 400 [mA] when the switch element Q2 is switched off. Then a modulation wave form, which is faithful to the optical communication signal S1, can be provided, and its average current is kept to about 500 [mA], which is equal to the value of the load current I1 in the state where the optical communication signal S1 is stopped.

Then, an optical output is outputted from the illuminating light communication device 10 and is received by a receiver 20 having a photo IC. Then, the receiver 20 detects a difference between an optical output not superimposed on the optical communication signal and an optical output superimposed on the optical communication signal, and thereby the receiver 20 receives the optical communication signal. The receiver 20 can detect even a minute modulation light by applying such a method.

As explained above, the illuminating light communication device 10 of the present embodiment comprises the constant current source 11, the smoothing circuit (comprising the smoothing capacitor C11), the load circuit 12, the load change element 13, and switch element Q2. The smoothing circuit and the load circuit 12 including the light emitting diode LD1 are connected to the output of the constant current source 11. The load change element 13 partially changes load characteristic of the load circuit 12 when being added to the load circuit 12. The switch element Q2 determines whether or not the load change element 13 is added to the load circuit 12 in accordance with the binary optical communication signal.

Thereby, the load characteristic of the load circuit 12 is changed in accordance with the optical communication signal, and then the load current flowing to the light emitting diode LD1 is modulated faithfully with respect to the wave form of the optical communication signal.

By the way, in the simulation circuit in FIG. 2B, a change caused by the load change element 13 is added to the on-resistance R11 constituting an equivalent circuit of the light emitting diode LD1. However, even if the change is added to a voltage value of the Zener diode ZD1, the load current I1 can be modulated as well as the case that the change is added to the on-resistance R11.

Embodiment 2

Figure 3A:
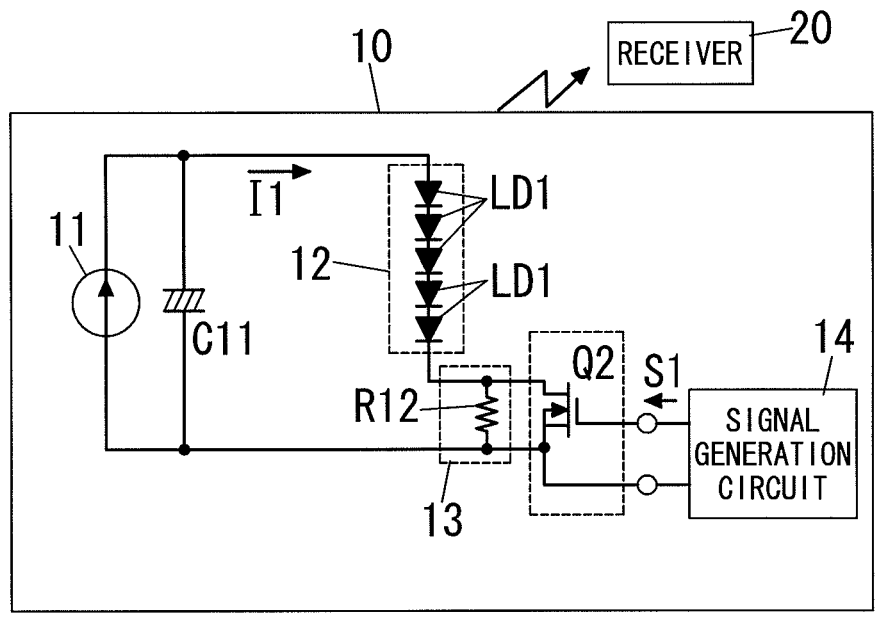
FIG. 3A is a circuit diagram for an illuminating light communication device of an Embodiment 2.

An illuminating light communication device of Embodiment 2 is explained with reference to FIGS. 3A and 3B. FIG. 3A is a circuit diagram for an illuminating light communication device 10, and then the same code is referred to circuit components of FIG. 3A corresponding to circuit components of FIG. 1A, which was explained in the Embodiment 1, and the explanation is omitted. In the present embodiment, a plurality of light emitting diodes LD1 and a resistor R12 are connected between both ends of a smoothing capacitor C11, and a switch element Q2 is connected between both ends of the resistor R12. Here, the load change element 13 comprises the resistor R12 connected in series to the plurality of light emitting diodes LD1. Then, the switch element Q2 is switched on/off in accordance with the optical communication signal, and thereby the load change element 13 achieves the same effect as when load characteristic of the diodes LD1 is changed.

Figure 3B:
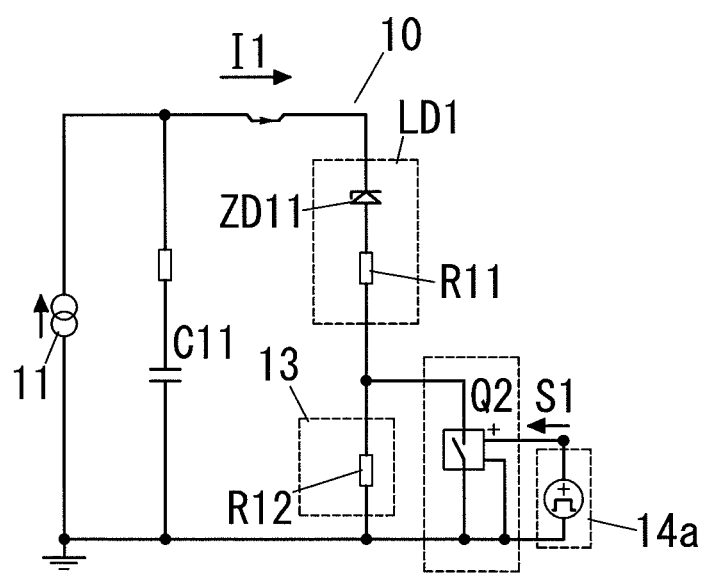
FIG. 3B is a circuit diagram modeled for simulation of the illuminating light communication device of the Embodiment 2.

FIG. 3B is a circuit diagram modeled for simulation with respect to a circuit shown in FIG. 3A, and then the same code is referred to circuit components of FIG. 3B corresponding to circuit components of FIG. 3A. Also, in this simulation circuit, the light emitting diode LD1 is equivalently replaced with a series circuit, which comprises a Zener diode ZD11 having a constant on-voltage and an on-resistance R11. In addition, a signal generation circuit 14 is equivalently replaced with an oscillator 14a which generates a rectangular wave signal of 10 [kHz] corresponding to an optical communication signal S1.

A simulation result of the load current I1, obtained by using the circuit of FIG. 3B, becomes congruent with the simulation result of FIGS. 2A and 2B, and the load current I1 is about 500 [mA] in a state where the optical communication signal S1 is stopped. Then, when the 10 [kHz] rectangular wave signal is inputted to the switch element Q2 as the optical communication signal S1, the switch element Q2 is switched on/off and thereby the resistor 12 is short-circuited or opened between its both ends and then the current I1 flowing to the light emitting diode LD1 is modulated. Therefore, the load current I1 becomes about 600 [mA] when the switch element Q2 is switched on, and becomes about 400 [mA] when the switch element Q2 is switched off. Then, a modulation wave form, which is faithful to a change of the optical communication signal S1, can be provided, and its average current becomes about 500 [mA], which is equal to the value of the load current I1 in the state where the optical communication signal S1 is stopped.

As explained above, in the illuminating light communication device 10 of the present embodiment, the light emitting diode LD1 and the resistor 12 of the load change element 13 are connected to the constant current source 11, and the switch element Q2 determines whether or not the resistor R12 is added to the load circuit 12. That is, the load change element 13 comprises the resistor 12 connected in series to the light emitting diode LD1, and the switch element Q2 is connected in parallel to the resistor 12.

Thereby, the switch element Q2 determines whether or not the resistor R12 is added to the load circuit 12, and thus the load characteristic of the light emitting diode LD1 can be changed in accordance with the optical communication signal, and the load current can be modulated faithfully with respect to the wave form of the optical communication signal.

Embodiment 3

An illuminating light communication device of Embodiment 3 is explained with reference to FIGS. 4A to 4E. An illuminating light communication device 10 of the present embodiment is different in only a configuration of the load change element 13 from the illuminating light communication device 10 which was explained in the Embodiment 1 or the Embodiment 2. Then, only the load change element 13 and the switch element Q2 are shown in FIGS. 4A to 4E, and other parts are omitted.

Figure 4A:
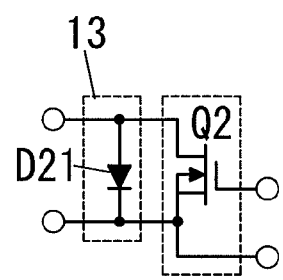
FIG. 4A is a circuit diagram showing a feature of an illuminating light communication device of an Embodiment 3.

In the circuit of FIG. 4A, a diode D21 is used as the load change element 13, and the diode D21 is connected in series to the light emitting diode LD1. Then, a switch element Q2 is connected in parallel to the diode D21. When the switch element Q2 is switched on, short-circuiting is generated between both ends of the diode D21 through the switch element Q2 and then the diode D21 becomes not to be connected to the light emitting diode LD1. On the other hand, when the switch element Q2 is switched off, the diode D21 becomes to be connected to the light emitting diode LD1. Then, the switch element Q2 is switched on/off in accordance with the optical communication signal S1, and thereby the load change element 13 achieves the same effect as when load characteristic of the load circuit 12 comprising the light emitting diode LD1 is changed. Therefore, as explained in the Embodiments 1 and 2, the load current flowing to the light emitting diode LD1 can be modulated faithfully with respect to the wave form of the optical communication signal.

Figure 4B:
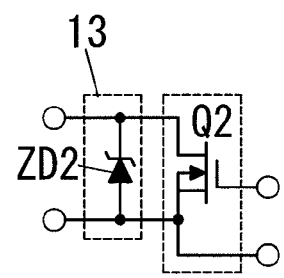
FIG. 4B is a circuit diagram showing a feature of the illuminating light communication device of the Embodiment 3.

Then, in the circuit of FIG. 4B, a Zener diode ZD2 is used as the load change element 13, and the Zener diode ZD2 is connected in series to the light emitting diode LD1. Then, a switch element Q2 is connected in parallel to the Zener diode ZD2. Also, in the present circuit, the switch element Q2 is switched on/off in accordance with the optical communication signal S1, and thereby the load change element 13 achieves the same effect as when load characteristic of the load circuit 12 comprising the light emitting diode LD1 is changed. Furthermore, in the present circuit, a modulated width of the load current I1 flowing to the light emitting diode LD1 can be easily adjusted by selection of a Zener voltage of the Zener diode ZD2.

Figure 4C:
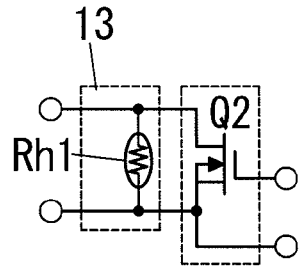
FIG. 4C is a circuit diagram showing a feature of the illuminating light communication device of the Embodiment 3.

Then, in the circuit of FIG. 4C, a thermistor resistance Rh1 is used as the load change element 13, and the thermistor resistance Rh1 is connected in series to the light emitting diode LD1. Then, a switch element Q2 is connected in parallel to the thermistor resistance Rh1. Also, in the present circuit, the switch element Q2 is switched on/off in accordance with the optical communication signal S1, and thereby the load change element 13 achieves the same effect as when load characteristic of the load circuit 12 comprising the light emitting diode LD1 is changed. Furthermore, in the present circuit, temperature characteristic can be given a modulated level of the load current I1 flowing to the light emitting diode LD1 and temperature correction can be added to the modulated level.

Figure 4D:
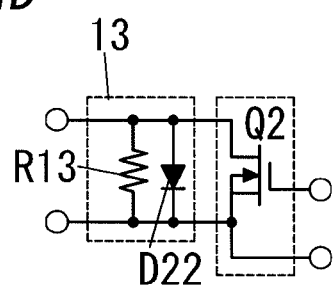
FIG. 4D is a circuit diagram showing a feature of the illuminating light communication device of the Embodiment 3.

Then, in the circuit of FIG. 4D, a parallel circuit comprising a resistor R13 and a diode D22 is used as the load change element 13, and the parallel circuit is connected in series to the light emitting diode LD1. Then, a switch element Q2 is connected in parallel to the parallel circuit. Also, in the present circuit, the switch element Q2 is switched on/off in accordance with the optical communication signal S1, and thereby the load change element 13 achieves the same effect as when load characteristic of the load circuit 12 comprising the light emitting diode LD1 is changed. Then, because the parallel circuit comprising the resistor R13 and the diode D22 is connected in series to the light emitting diode LD1, a modulated width of the load current flowing to the light emitting diode LD1 can be adjusted, for example, by adjustment of a resistance value of the resistor R13.

Figure 4E:
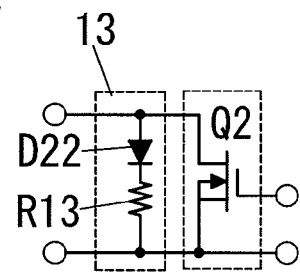
FIG. 4E is a circuit diagram showing a feature of the illuminating light communication device of the Embodiment 3.

Then, in the circuit of FIG. 4E, a series circuit comprising a resistor R13 and a diode D22 is used as the load change element 13, and the series circuit is connected in series to the light emitting diode LD1. Then, a switch element Q2 is connected between both ends of the series circuit. Also, in the present circuit, the switch element Q2 is switched on/off in accordance with the optical communication signal S1, and thereby the load change element 13 achieves the same effect as when load characteristic of the load circuit 12 comprising the light emitting diode LD1 is changed. Then, because the series circuit comprising the resistor R13 and the diode D22 is connected in series to the light emitting diode LD1, a modulated width of the load current I1 flowing to the light emitting diode LD1 can be adjusted, for example, by adjustment of a resistance value of the resistor R13.

As explained above, in the present embodiment, the load change element 13 comprises a constant voltage circuit section comprising a constant voltage element (for example, the diodes D21, D22, the Zener diode ZD2) connected in series to the light emitting diode LD1, or an impedance circuit comprising a resistive element (for example, the resistor R12, the thermistor resistance Rh1) connected in series to the light emitting diode LD1. Then, the switch element Q2 is connected in parallel the above-mentioned constant voltage circuit section.

Thereby, when the switch element Q2 is switched on/off in accordance with the optical communication signal, load characteristic of the load circuit 12 comprising the light emitting diode LD1 is partially changed. Therefore, the current flowing to the load current I2 can be modulated faithfully with respect to the wave form of the optical communication signal. Then, in the present embodiment, various circuit elements or their combinational circuit are used as the load change element 13, and thereby modulation characteristic of the load current I1 flowing to the diode LD1 can be adjusted.

Embodiment 4

Figure 5A:
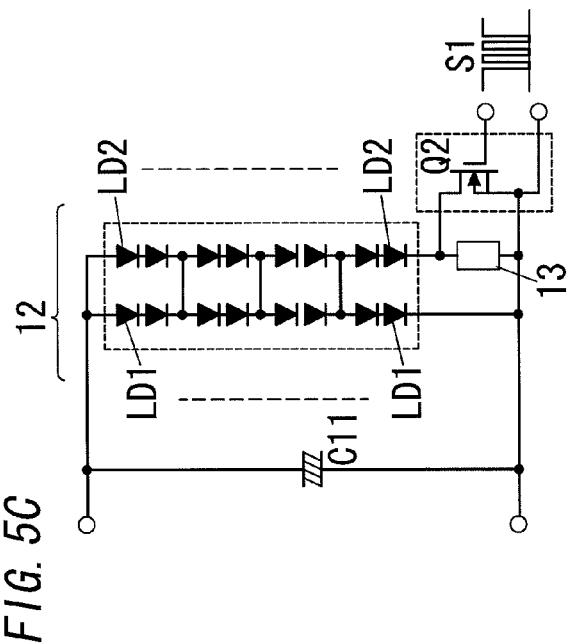
FIG. 5A is a circuit diagram for an illuminating light communication device of an Embodiment 4.

An illuminating light communication device of Embodiment 4 is explained with reference to FIGS. 5A to 5C. An illuminating light communication device 10 of the present embodiment is different in a configuration of the load circuit 12 from the illuminating light communication device 10 which was explained in the Embodiments 1 to 3. As shown in FIG. 5A, the illuminating light communication device 10 of the present embodiment comprises a series circuit 4a comprising a plurality of light emitting diodes LD1 connected in series and a series circuit 4b comprising a plurality of light emitting diodes LD2 connected in series. Here, the load circuit 12 comprises the two series circuits 4a, 4b, which are connected between both ends of the smoothing capacitor C11 through the load change element 13. In the present circuit, a switch element Q2 is connected in parallel to the load change element 13. Then, the switch element Q2 is switched on/off in accordance with the optical communication signal, and thereby currents flowing to the light emitting diodes LD1, LD2 can be modulated, as well as the Embodiments 1 to 3.

In addition, in the circuit of FIG. 5A, the two series circuits 4a, 4b comprises the plurality of light emitting diodes connected in series, respectively, and are connected in parallel between both ends of the smoothing capacitor C11, but each of the two series circuits 4a, 4b may comprise one light emitting diode and the number of light emitting diodes is no object. Then, the two series circuits 4a, 4b are connected in parallel, but the number of series circuits is not limited to two and can be set optionally.

Then, in the circuit of FIG. 5A, both of the series circuits 4a, 4b are connected to the load change element 13, but the circuit is not limited to such a configuration. For example, as shown in FIG. 5B, the series circuit 4a may be connected between both ends of the smoothing capacitor C11 without the load change element 13, and only the series circuit 4b may be connected between the both ends through the load change element 13. The switch element Q2 is connected in parallel to the load change element 13, and then the switch element Q2 is switched on/off in accordance with the optical communication signal S1 and thereby the current flowing to the light emitting diodes LD2 is modulated. Then, the number of light emitting diodes through the load change element 13 and the number of light emitting diodes without the load change element 13 may be set appropriately in response to a condition, such as a modulated level given the load current.

Figure 5B:
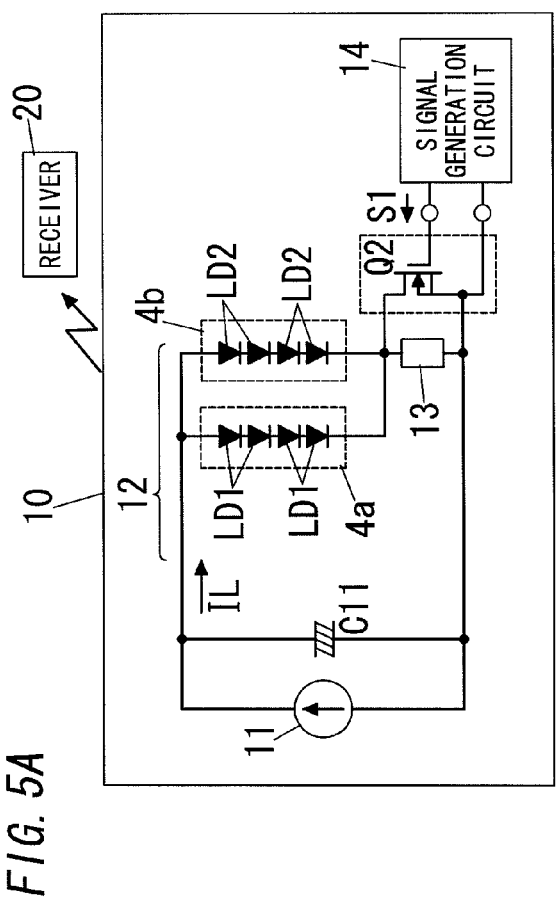
FIG. 5B is a circuit diagram showing a feature of the illuminating light communication device of the Embodiment 4.
Figure 5C:
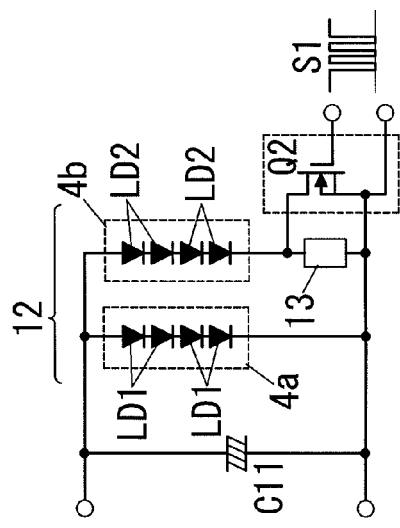
FIG. 5C is a circuit diagram showing a feature of the illuminating light communication device of the Embodiment 4.

Then, in FIG. 5C, a ladder-structured circuit is connected between both ends of the smoothing capacitor C11. That is, the circuit comprises four circuit blocks connected in series, and each of the four circuit blocks comprises a series circuit comprising two light emitting diodes LD1 and a series circuit comprising two light emitting diodes LD2. These two series circuits are connected in parallel. Then, the load change element 13 is connected in series to the light emitting diodes LD2 of the circuit block located in a low side, and the switch element Q2 is connected between both ends of the load change element 13. Here, the switch element Q2 determines whether or not the load change element 13 (for example, a resistor) is added to the load circuit 12, by being switched on/off in accordance with the optical communication signal S1. Therefore, currents flowing to the light emitting diodes LD1, LD2 can be modulated.

As explained above, also, in the illuminating light communication device 10 of the present embodiment, the switch element Q2 determines whether or not the load change element 13 is added to the load circuit 12, by being switched on/off in accordance with the optical communication signal. Therefore, load characteristic of the load circuit 12 is partially changed in accordance with the optical communication signal, as well as the Embodiments 1 to 3, and thereby the load current flowing to the light emitting diode can be modulated faithfully with respect to the wave form of the optical communication signal. Then, because a modulated level of the load current can be adjusted by changing a configuration of the light emitting diode, being a load in the present device, the configuration of the light emitting diode may be selected in response to a desired modulated level.

Then, in each of the circuits of FIGS. 5B and 5C, a plurality of series circuits (load circuits) comprising the light emitting diodes are connected in parallel between outputs of the constant current source 11, and the load change element 13 and the switch element Q2 are located in at least one of the plurality of load circuits.

Thus, because the load change element 13 and the switch element Q2 are located in at least one of the plurality of load circuits, total load characteristic can be modulated by changing load characteristic of the load circuit in which the load change element 13 and the switch element Q2 are located.

Embodiment 5

An illuminating light communication device of Embodiment 5 is explained with reference to FIG. 6. An illuminating light communication device 10 of the present embodiment is different in a configuration of the load circuit from the illuminating light communication device 10 which was explained in the Embodiments 1 to 4. In addition, the same code is referred to circuit components corresponding to circuit components explained in the Embodiments 1 to 4, and the explanation is omitted.

Figure 6:
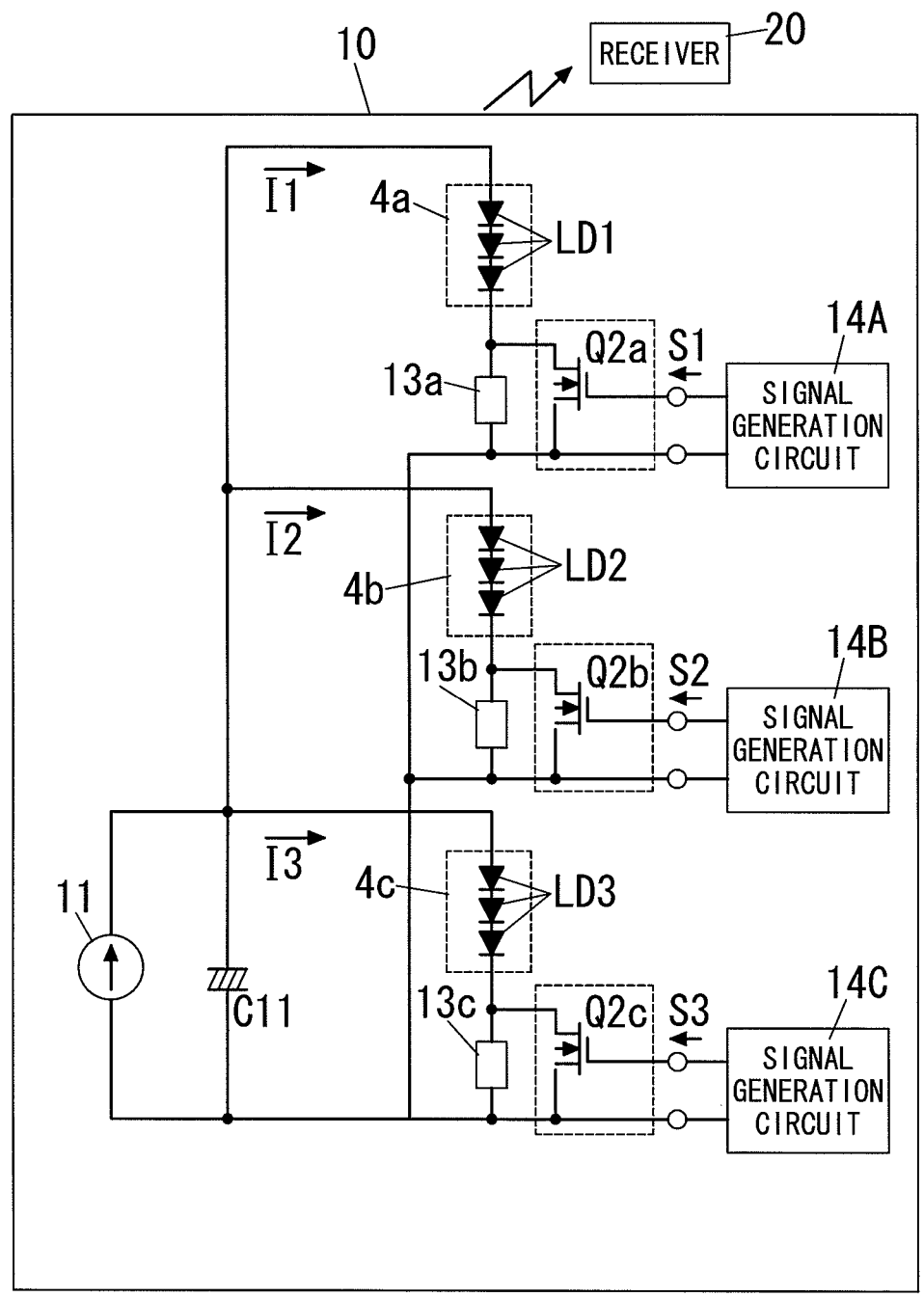
FIG. 6 is a circuit diagram for an illuminating light communication device of an Embodiment 5.

As shown in FIG. 6, the illuminating light communication device 10 comprises a constant current source 11, and a smoothing capacitor C11 connected between both ends of the constant current source 11. A series circuit comprises a plurality of light emitting diodes LD1 and a load change element 13a. Also, a series circuit comprises a plurality of light emitting diodes LD2 and a load change element 13b, and a series circuit comprises a plurality of light emitting diodes LD3 and a load change element 13c. Then, these three series circuits are connected in parallel between both ends of the smoothing capacitor C11. Here, a series circuit 4a comprising the plurality of light emitting diodes LD1 constitutes a load circuit. Also, series circuits 4b, 4c comprising the plurality of light emitting diodes LD2, LD3 constitute load circuits, respectively. Then, switch elements Q2a, Q2b, Q2c are connected in parallel to the load change elements 13a, 13b, 13c, respectively. The switch elements Q2a, Q2b, Q2c are switched on/off in accordance with optical communication signals S1, S2, S3 inputted from signal generation circuits 14A, 14B, 14C, respectively.

Here, when the light emitting diodes LD1 are red light emitting diodes and the light emitting diodes LD2 are green light emitting diodes and the light emitting diodes LD3 are blue light emitting diodes, the switch elements Q2a, Q2b, Q2c are switched on/off in accordance with individual optical communication signals S1, S2, S3, respectively. Thereby, outputs of the light emitting diodes having various emission colors are modulated. Then, if a receiver 20 can identify color temperatures of light outputted from the illuminating light communication device 10, three kinds of signals can be received without interference. Thus, amount of transmittable information with the optical communication increases threefold in comparison with one-colored light emitting diode.

As explained above, in the illuminating light communication device 10 of the present invention, a plurality of load circuits (series circuits 4a, 4b, 4c) are connected in parallel between outputs of the constant current source 11. The plurality of load circuits (series circuit 4a, 4b, 4c) comprises the light emitting diodes LD1, LD2, LD3, respectively. Then, the light emitting diodes LD1, LD2, LD3 have different emission colors with respect to each load circuit, and the switch elements Q2a, Q2b, Q2c are located with respect to each load circuit.

Thereby, the switch elements Q2a, Q2b, Q2c determine whether or not the load change elements 13a, 13b, 13c are added to the load circuits, respectively. Thus, load characteristic can be modulated with respect to each light emitting diode having a different emission color, and outputs of the light emitting diodes having various emission colors can be modulated in accordance with optical communication signals, respectively.

Then, if the receiver 20 can identify color temperatures of light outputted from the illuminating light communication device 10, three kinds of signals can be received without interference. Thus, amount of transmittable information with optical communication increases in comparison with one-colored light emitting diode.

Embodiment 6

An illuminating light communication device of Embodiment 6 is explained with reference to FIGS. 7A to 7C and FIGS. 8A and 8B. An illuminating light communication device 10 of the present embodiment is different in a configuration of the load circuit from the illuminating light communication device 10 which was explained in the Embodiments 1 to 5. In addition, the same code is referred to circuit components corresponding to circuit components explained in the Embodiments 1 to 5, and the explanation is omitted.

Figure 7A:
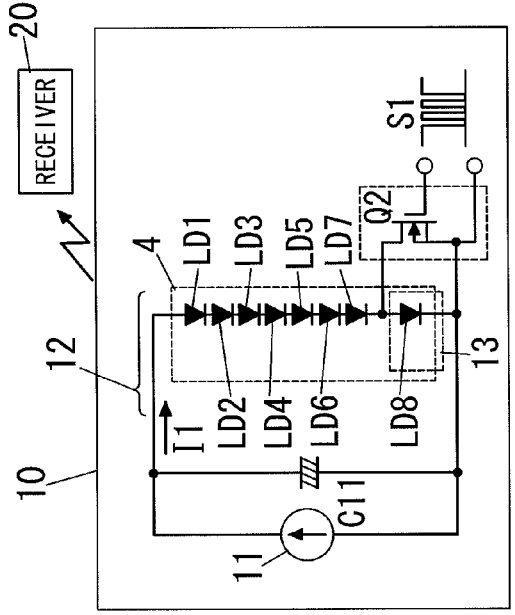
FIG. 7A is a circuit diagram for an illuminating light communication device of an Embodiment 6.

As shown in FIG. 7A, the illuminating light communication device 10 comprises a constant current source 11, and a smoothing capacitor C11 connected between both ends of the constant current source 11. A series circuit 4 comprises a plurality of light emitting diodes LD1 to LD8 (that is, for example, eight diodes in present embodiment), and is connected between both ends of the smoothing capacitor C11, and then a switch element Q2 is connected in parallel to the light emitting diode LD8. Here, a load circuit in present embodiment is the series circuit 4 which is connected in parallel to the smoothing capacitor C11 and comprises the light emitting diodes LD1 to LD8. Then, the light emitting diode LD8, being a part of the load circuit 4, is a load change element 13 and is connected in parallel to the switch element Q2.

Figure 7C:
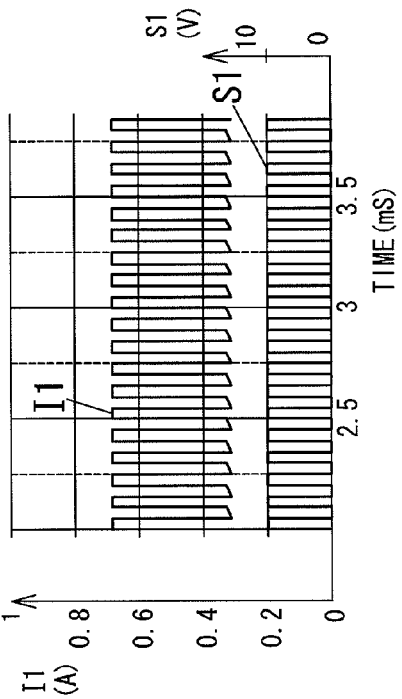
FIG. 7C is a wave form chart showing a simulation result of the illuminating light communication device of the Embodiment 6.
Figure 7B:
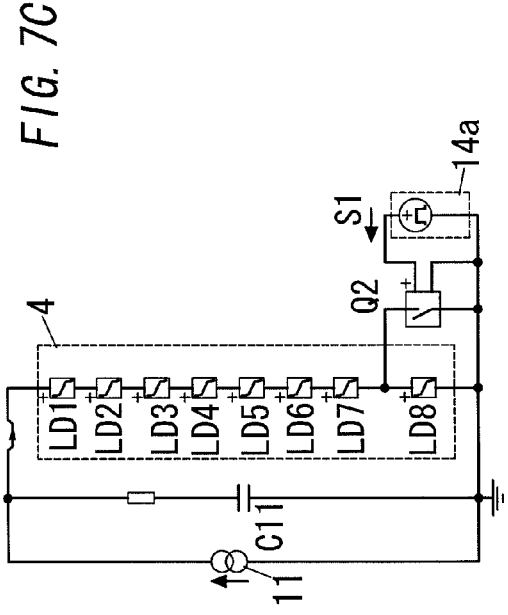
FIG. 7B is a circuit diagram modeled for simulation of the illuminating light communication device of the Embodiment 6.

FIG. 7B shows a circuit diagram modeled for simulation with respect to a circuit shown in FIG. 7A, and then the same code is referred to circuit components of FIG. 7B corresponding to circuit components of FIG. 7A. In this simulation circuit, the light emitting diodes LD1 to LD8 are equivalently replaced with simulation devices which are previously modeled after characteristic of the light emitting diode.

FIG. 7C shows simulation results of a load current I1 by use of a circuit shown in FIG. 7B. In addition, the load current I1 is set to be about DC 500 [mA] in a state where the optical communication signal S1 is stopped.

When a rectangular wave signal of 10 [kHz] is inputted to the switch element Q2 as the optical communication signal S1, the switch element Q2 is switched on/off and thereby determines whether or not the light emitting diode LD8 is added to the load circuit 12, and then a wave form of the load current I1 is modulated. When the switch element Q2 is switched on, the load current I1 becomes about 700 [mA], and then when the switch element Q2 is switched off, the load current I1 becomes about 300 [mA]. Thus, the load current is modulated faithfully with respect to the wave form of the optical communication signal S1, and then its average current is generally equal to an average current (about 500 [mA]) in a state where the load current is not modulated.

Figure 8A:
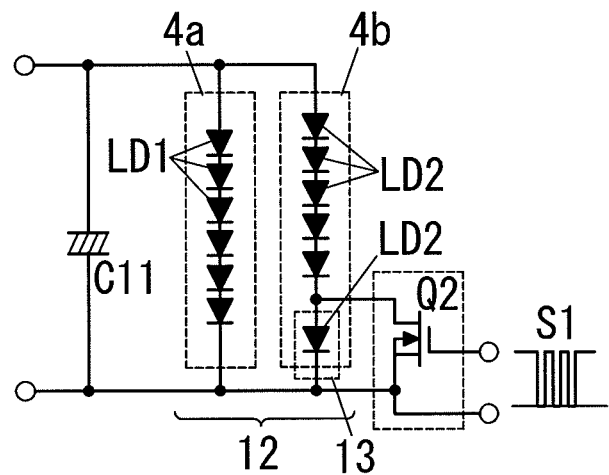
FIG. 8A is a circuit diagram showing other configuration of the Embodiment 6.

By the way, in the present embodiment, the series circuit comprising the light emitting diodes LD1 to LD8 is connected between both ends of the smoothing capacitor C11, but the circuit is not limited to the above-mentioned configuration and may be a configuration shown in FIG. 8A. In this circuit, a series circuit 4a comprises a plurality of light emitting diodes LD1, and a series circuit 4b comprises a plurality of light emitting diodes LD2. Then, the series circuits 4a, 4b are connected in parallel between both ends of the smoothing capacitor C11. A switch element Q2 is connected in parallel to a light emitting diode LD2 (for example, one diode in FIG. 8A) constituting a part of the series circuit 4b. In this case, the load change element 13 is the light emitting diode LD2, connected in parallel to the switch element Q2. In addition, in the circuit of FIG. 8A, the two series circuits are connected in parallel between both ends of the smoothing capacitor C11, but the number of the series circuits is not limited to two and can be set optionally.

Figure 8B:
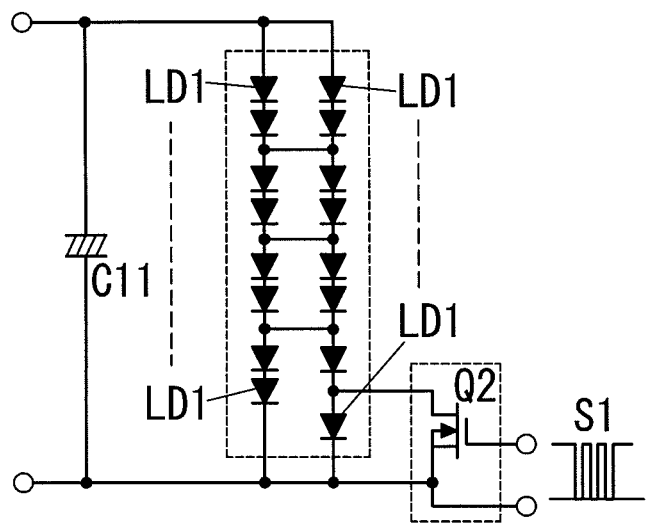
FIG. 8B is a circuit diagram showing other configuration of the Embodiment 6.

Then, as shown in FIG. 8B, a ladder-structured circuit may be connected between both ends of the smoothing capacitor C11. That is, the circuit comprises four circuit blocks connected in series, and each of the four circuit blocks comprises a series circuit comprising two light emitting diodes LD1 and a series circuit comprising two light emitting diodes LD1. These two series circuits are connected in parallel. Then, in this circuit, the switch element Q2 is connected in parallel to a part of the light emitting diodes LD1 (for example, one light emitting diode LD1 which belongs to a sequence of the right side). The switch element Q2 is switched on/off in accordance with the optical communication signal S1, and thereby load characteristic of the load circuit is modulated and then the load current is modulated.

As explained above, in the illuminating light communication device 10 of the present embodiment, the load circuit comprises the plurality of light emitting diodes connected in series, and the switch element Q2 is connected in parallel to a part of the plurality of light emitting diodes.

Thereby, the light emitting diode itself, connected in parallel to the switch element Q2, is the load change element 13, and the load current flowing to the light emitting diode can be modulated faithfully with respect to the wave form of the optical communication signal, without addition of a new member for the load change element 13.

Embodiment 7

Figure 9:
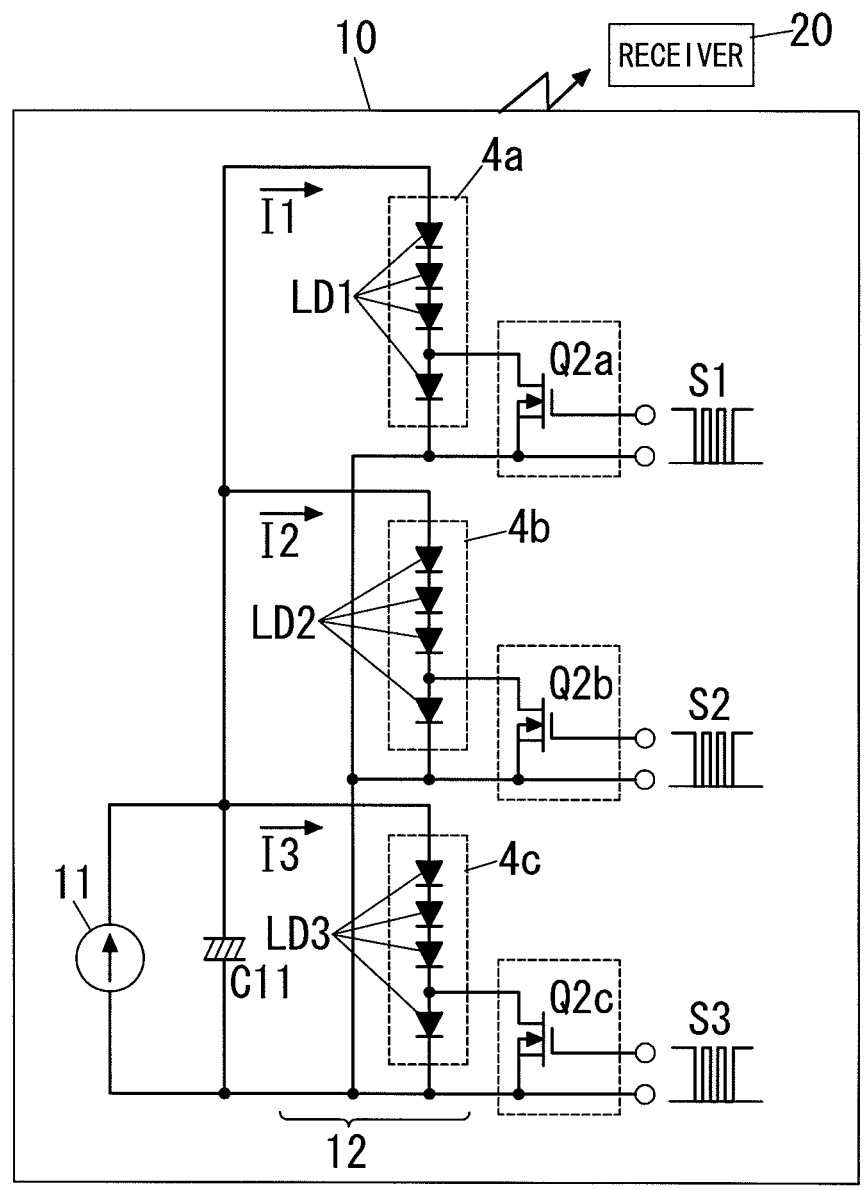
FIG. 9 is a circuit diagram for an illuminating light communication device of an Embodiment 7.

An illuminating light communication device of Embodiment 7 is explained with reference to FIG. 9. In the circuit of FIG. 6 explained in the Embodiment 5, each of the plurality of series circuits comprises the plurality of light emitting diodes and the load change element, and then the series circuits are connected in parallel between both ends of the smoothing capacitor C11, and the switch element is connected in parallel to the load change element in each of the series circuits. On the other hand, in the present embodiment, as shown in FIG. 9, series circuits 4a, 4b, 4c comprise a plurality of light emitting diodes LD1, LD2, LD3, respectively. Then, these series circuits 4a, 4b, 4c are connected in parallel between both ends of the smoothing capacitor C11. That is, a plurality of load circuits (series circuits 4a, 4b, 4c) are connected in parallel between both ends of the smoothing capacitor C11. Then, red light emitting diodes are used as the light emitting diodes LD1, and green light emitting diodes are used as the light emitting diodes LD2, and blue light emitting diodes are used as the light emitting diodes LD3. That is, light emitting diodes have different emission colors with respect to each load circuit, and such light emitting diodes are used.

A switch element Q2a is connected in parallel to a part (for example, one light emitting diode LD1) of the plurality of light emitting diodes LD1 constituting the series circuit 4a, and is switched on/off in accordance with the optical communication signal S1. When the switch element Q2a is switched on, short-circuiting is generated between both ends of the light emitting diode LD1 connected in parallel to the switch element Q2a. Thus, load characteristic of the load circuit (series circuit 4a) is partially changed in response to on/off operation of the switch element Q2a.

Also, a switch element Q2b is connected in parallel to a part (for example, one light emitting diode LD2) of the plurality of light emitting diodes LD2 constituting the series circuits 4b, and is switched on/off in accordance with the optical communication signal S2. When the switch element Q2b is switched on, short-circuiting is generated between both ends of the light emitting diode LD2 connected in parallel to the switch element Q2b. Thus, load characteristic of the load circuit (series circuit 4b) is partially changed in response to on/off operation of the switch element Q2b.

Also, a switch element Q2c is connected in parallel to a part (for example, one light emitting diode LD3) of the plurality of light emitting diodes LD3 constituting the series circuits 4c, and is switched on/off in accordance with the optical communication signal S3. When the switch element Q2c is switched on, short-circuiting is generated between both ends of the light emitting diode LD3 connected in parallel to the switch element Q2c. Thus, load characteristic of the load circuit (series circuit 4c) is partially changed in response to on/off operation of the switch element Q2c.

As explained above, in the present embodiment, each of the plurality of load circuits comprises the plurality of light emitting diodes connected in series, and the switch element is connected in parallel to the part of the plurality of light emitting diodes of each load circuit. That is, the load change element is the light emitting diode connected in parallel to the switch element.

Thereby, when the switch element is switched on/off in accordance with the optical communication signal, load characteristic of the load circuit is partially modulated. Therefore, the load current is modulated in accordance with the optical communication signal, and optical communication can be provided without addition of a new member for the load change element.

Then, in the present embodiment, the plurality of load circuits (series circuit 4a, 4b, 4c) are connected in parallel between outputs of the constant current source 11, and each of the load circuits comprises the plurality of light emitting diodes connected in series. Then, emission colors of the light emitting diodes are different from with respect to each load circuit, and the switch element is connected in parallel to the part of the plurality of light emitting diodes in each of load circuits.

Thereby, when the switch element in each of load circuits is switched on/off, load characteristic in each of load circuits is modulated. Therefore, outputs of the light emitting diodes having various emission colors can be modulated. Then, if a receiver 20 can identify color temperatures of light outputted from the illuminating light communication device 10, three kinds of signals can be received without interference. Thus, amount of transmittable information with optical communication can increase threefold in comparison with one-colored light emitting diode.

Embodiment 8

Figure 10:
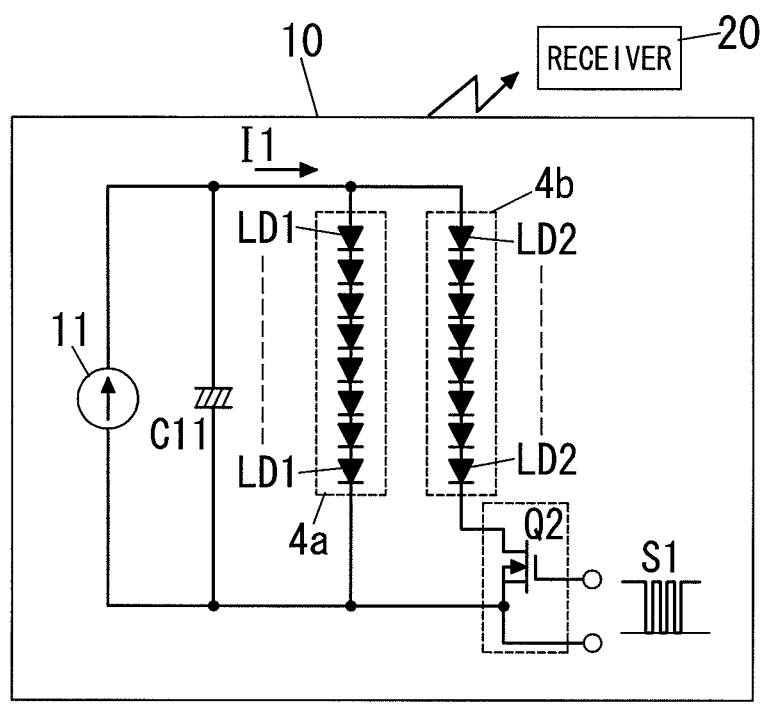
FIG. 10 is a circuit diagram for an illuminating light communication device of an Embodiment 8.

An illuminating light communication device of Embodiment 8 is explained with reference to FIGS. 10, 11A, 11B, 12A, and 12B. In the circuit of FIGS. 8A and 8B explained in the Embodiment 6, the series circuit 4a comprises the plurality of light emitting diodes LD1, and the series circuit 4b comprises the plurality of light emitting diodes LD2, and these series circuits 4a, 4b are connected between both ends of the smoothing capacitor C11. Then, the switch element Q2 is connected in parallel to the part (one light emitting diode LD2) of the plurality of light emitting diodes LD2 of the series circuit 4b. In contrast, in the present embodiment, as shown in FIG. 10, a series circuit 4a comprises a plurality of light emitting diodes LD1, and is connected between both ends of a smoothing capacitor C11. Also, a series circuit 4b comprises a plurality of light emitting diodes LD2, and is connected between both ends of the smoothing capacitor C11 through a switch element Q2, which is switched on/off in accordance with an optical communication signal S1. When the switch element Q2 is switched on in accordance with the optical communication signal, the series circuits 4a, 4b become connected in parallel between both ends of the smoothing capacitor C11. On the other hand, when the switch element Q2 is switched off in accordance with the optical communication signal, only the series circuit 4a becomes connected between both ends of the smoothing capacitor C11. In addition, it is necessary to evade an unloaded condition that all loads (light emitting diodes LD1, LD2) are separated from the constant current source 11 at the same time, in order to restrain the overvoltage. Then, in order to do this, it is necessary to leave a load (a light emitting diode) to which the current is supplied by the constant current source 11, even if the light emitting diodes LD2 are separated from the constant current source 11 by operation of the switch element Q2. In the present embodiment, because the plurality of light emitting diodes LD1 are connected to the constant current source 11 without the switch element Q2, the load current is always supplied to the plurality of light emitting diodes LD1. Thereby, the unloaded condition is not generated and the overvoltage can be restrained.

Figure 11A:
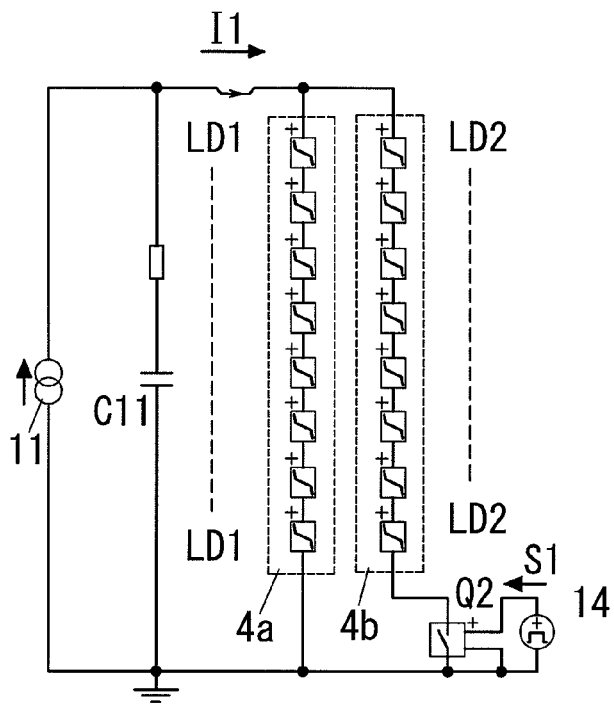
FIG. 11A is a circuit diagram modeled for simulation of the illuminating light communication device of the Embodiment 8.

FIG. 11A shows a circuit diagram modeled for simulation with respect to the circuit shown in FIG. 10, and then the same code is referred to circuit components of FIG. 11A corresponding to circuit components of FIG. 10. In this simulation circuit, the light emitting diodes LD1, LD2 are equivalently replaced with simulation devices which are previously modeled after characteristic of the light emitting diode.

Figure 11B:
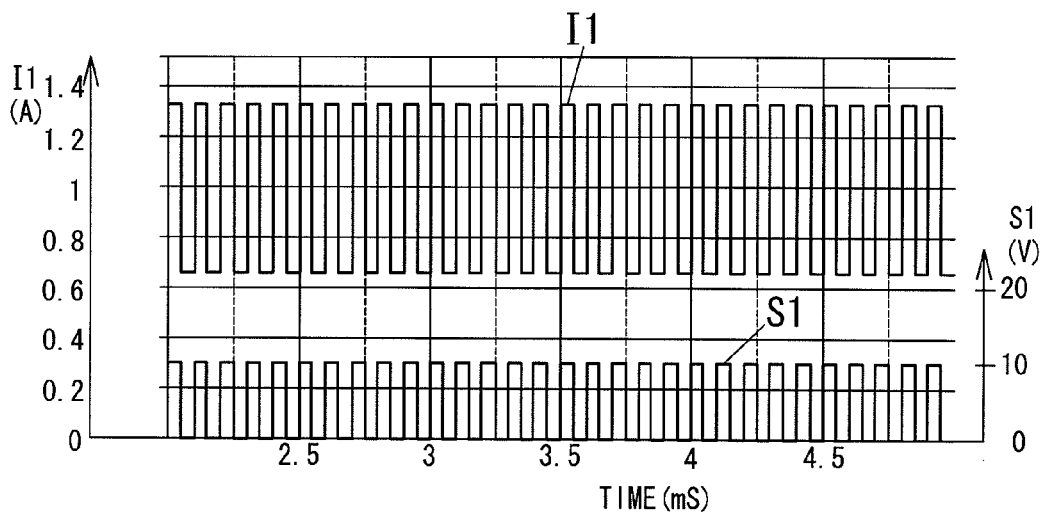
FIG. 11B is a wave form chart showing a simulation result of the illuminating light communication device of the Embodiment 8.

FIG. 11B shows simulation results of a load current I1 by use of the circuit shown in FIG. 11A. In addition, the load current I1 (a resultant current of currents flowing to the series circuits 4a and 4b) is set to be about DC 1 [A] in a state where the optical communication signal S1 is stopped. A rectangular wave signal of 10 [kHz] is inputted to the switch element Q2 as the optical communication signal S1, and the series circuit 4b comprising the light emitting diodes LD2 is intermitted by on/off operation of the switch element Q2, and thereby a wave form of the load current I1 becomes a rectangular wave form of about 1.3 [A] when the switch element Q2 is switched on, and becomes a rectangular wave form of about 0.7 [A] when the switch element Q2 is switched off. Therefore, the load current I1 is modulated faithfully with respect to the wave form of the optical communication signal S1. Then, an average current of the load current I1 is kept to about 1 [A], which is equal to a current value of the load current I1 in the state where the optical communication signal S1 is stopped.

As explained above, in the present embodiment, each of the plurality of load circuits comprises the plurality of light emitting diodes, and the plurality of load circuits are connected in parallel between outputs of the constant current source 11, and the switch element is connected in series to one or more load circuits, at least except for one load circuit, of the plurality of load circuits.

Thereby, the load change element is the load circuit, connected to the switch element, and then the load current of the light emitting diode can be modulated faithfully with respect to the wave form of the optical communication signal, without addition of a new member for the load change element. Then, the switch element is not located in at least one load circuit of the plurality of load circuits, and thus even if all switch elements are switched off at the same time, the unloaded condition is not generated.

By the way, in the above-mentioned series circuits 4a and 4b, as shown in FIG. 12A, a ladder-structured circuit may be formed by connecting connection points in the plurality of light emitting diodes LD1 and connection points in the plurality of light emitting diodes LD2 to each other every one. In the circuit, a part of the plurality of light emitting diodes LD2 is intermitted by on/off operation of the switch element Q2 in accordance with the optical communication signal S1, and the unloaded condition is not generated.

Then, in a circuit of FIG. 12B, a series circuit comprises a plurality of light emitting diodes LD1 and a switch element Q2a, and a series circuit comprises a plurality of light emitting diodes LD2 and a switch element Q2b, and a series circuit comprise a plurality of light emitting diodes LD3 and a switch element Q2c, and then these three series circuits are connected in parallel between a smoothing capacitor C11. Individual optical communication signals S1, S2, S3 are inputted to the switch elements Q2a, Q2b, Q2c, respectively, and then the switch elements Q2a, Q2b, Q2c are switched on/off in accordance with these signals S1, S2, S3, respectively. Here, red light emitting diodes are used as the light emitting diodes LD1, and green light emitting diodes are used as the light emitting diodes LD2, and blue light emitting diodes are used as the light emitting diodes LD3. Then, currents flowing to these diodes LD1, LD2, LD3 are modulated with the optical communication signals S1, S2, S3, respectively. Then, if a receiver 20 can identify color temperatures of light outputted from the illuminating light communication device 10, three kinds of signals can be received without interference. Therefore, amount of transmittable information with optical communication can increase threefold in comparison with one-colored light emitting diode. In addition, when all switch elements Q2a, Q2b, Q2c are switched off at the same time, the unloaded condition is generated. Thus the optical communication signals S1, S2, S3 are set so that the switch elements Q2a, Q2b, Q2c are switched off at the same time.

Embodiment 9

An illuminating light communication device of Embodiment 9 is explained with reference to FIGS. 13A to 13C and 14. In addition, in present embodiment, a circuit configuration of the illuminating light communication device 10 is equal to that of FIG. 1A explained in the Embodiment 1, and thus the drawing and explanation are omitted.

The signal generation circuit 14 of the Embodiment 1 generates the optical communication signal S1 with a constant duty cycle. In contrast, a signal generation circuit 14 of the present embodiment comprises a duty regulation unit 14b. The duty regulation unit 14b changes a duty cycle of the optical communication signal S1, comprising a rectangular wave signal with a constant duty cycle, inputted from outside, while keeping a frequency of the optical communication signal S1 constant, to generate a signal S11.

The switch element Q2 is switched on/off in accordance with the signal S11 inputted from the signal generation circuit 14, and then determines whether or not the load change element 13 is added to the load circuit 12. Therefore, a wave form of the load current I1 flowing to the load current I2 is modulated in accordance with the signal S11 generated based on the optical communication signal S1.

FIGS. 13A to 13C are wave form charts of the load current I1 and the signal S11 outputted from the signal generation circuit 14. FIG. 13A is a wave form chart in a case where the duty cycle of the signal S11 is about 50%, and FIG. 13B is a wave form chart in a case where the duty cycle of the signal S11 is about 75%, and FIG. 13C is a wave form chart in a case where the duty cycle of the signal S11 is about 25%. If the load current I1 has a wave form as shown in FIG. 13A in the case where the duty cycle is 50%, a peak value of the wave form of the load current I1 is inhibited and a bottom value thereof decreases and a modulation width thereof increases as shown in FIG. 13B in the case where the duty cycle is extended to 75%. Then, the peak value and the bottom value increase and the modulation width decreases, as shown in FIG. 13C in the case where the duty cycle is narrowed to 25%.

Figure 14:
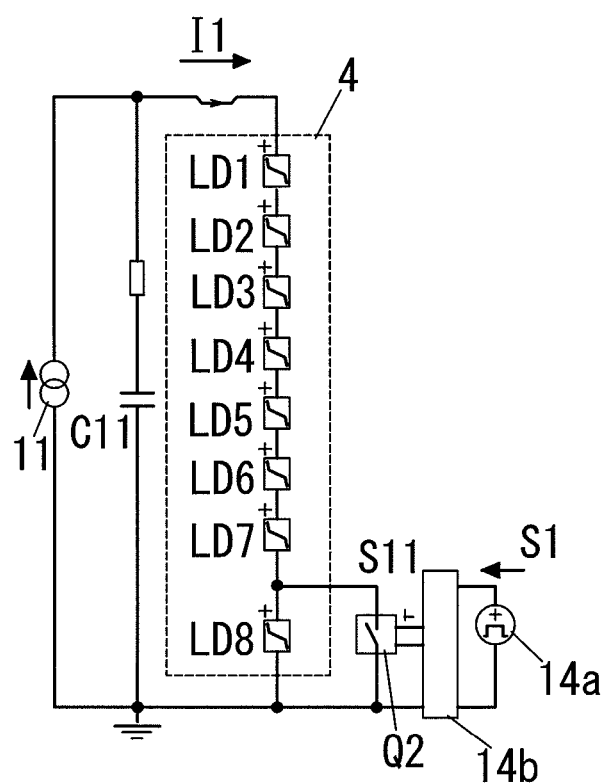
FIG. 14 is a circuit diagram modeled for simulation of the illuminating light communication device of the Embodiment 9.

Then, FIG. 14 shows a circuit diagram modeled for simulation with respect to the circuit of the present embodiment, and the circuit of FIG. 7A explained the Embodiment 6 is used as the load circuit 12. That is, the load circuit 12 comprises the light emitting diodes LD1 to LD8 which are connected in series between both ends of the smoothing capacitor C11, and then the switch element Q2 is connected in parallel to the light emitting diode LD8. That is, the load change element 13 is the light emitting diode LD8 connected in parallel to the switch element Q2. In this simulation circuit, the light emitting diodes LD1 to LD8 are equivalently replaced with simulation devices which are previously modeled after characteristic of the light emitting diode.

Figure 15A:
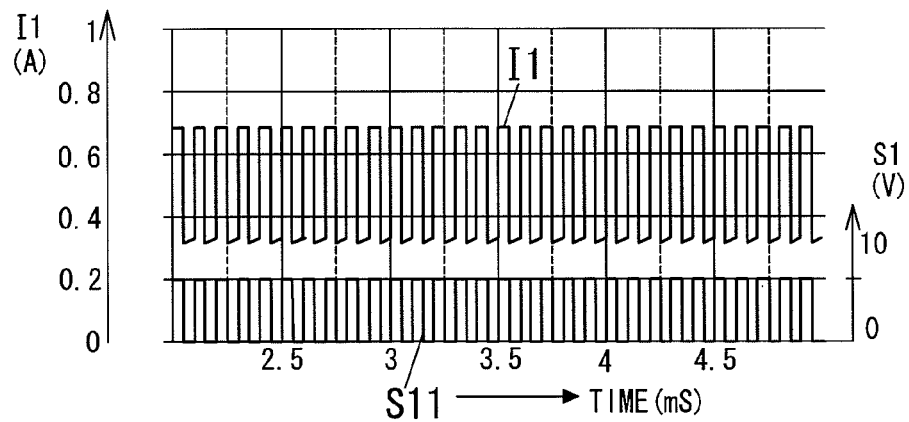
FIG. 15A is a wave form chart showing a simulation result of the illuminating light communication device of the Embodiment 9.
Figure 15B:
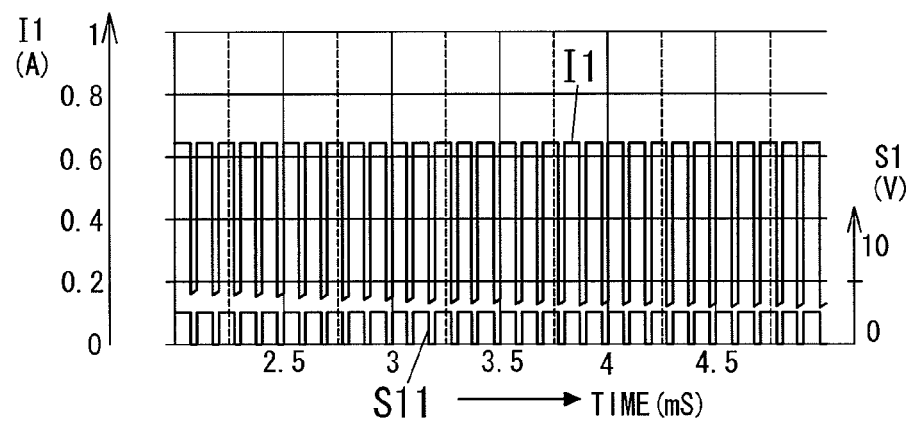
FIG. 15B is a wave form chart showing a simulation result of the illuminating light communication device of the Embodiment 9.
Figure 15C:
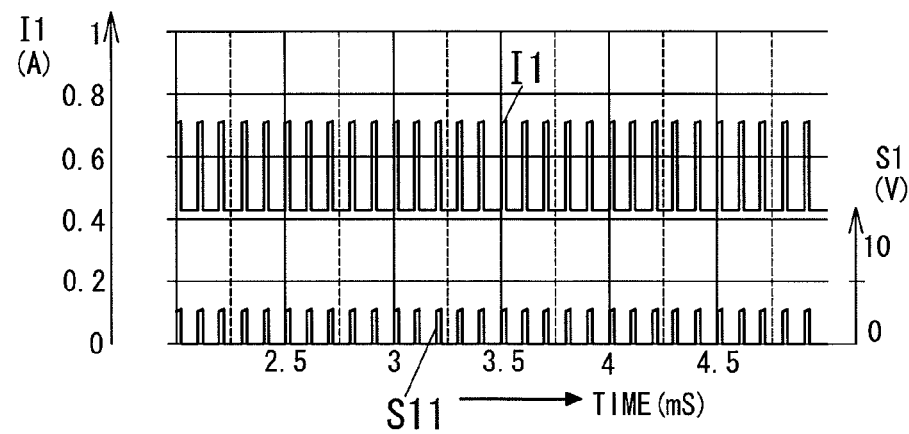
FIG. 15C is a wave form chart showing a simulation result of the illuminating light communication device of the Embodiment 9.

FIGS. 15A to 15C show simulation results of a load current I1 by use of the circuit shown in FIG. 14.

FIG. 15A is wave form charts of the load current I1 flowing to the load circuit 4, when the signal generation circuit 14 outputs the signal S11, having a frequency of 10 [kHz], of which the duty cycle is 50%. The peak value of the load current I1 is about 700 [mA] and the bottom value is about 300 [mA] and the modulation width is about 400 [mA] and the average value is about 500 [mA].

FIG. 15B is wave form charts of the load current I1 flowing to the load circuit 4, when the signal generation circuit 14 outputs the signal S11, having a frequency of 10 [kHz], of which the duty cycle is 75%. The peak value of the load current I1 is about 630 [mA] and the bottom value is about 120 [mA] and the modulation width is about 510 [mA] and the average value is about 500 [mA].

FIG. 15C is wave form charts of the load current I1 flowing to the load circuit 4, when the signal generation circuit 14 outputs the signal S11, having a frequency of 10 [kHz], of which the duty cycle is 25%. The peak value of the load current I1 is about 710 [mA] and the bottom value is about 430 [mA] and the modulation width is about 280 [mA] and the average value is about 500 [mA].

From these results, it is found that when the signal generation circuit 14 changes the duty cycle of the optical communication signal S1 while keeping the frequency of the optical communication signal S1 constant, to generate a signal S11 and the load current I1 is modulated in accordance with the signal S11, the modulation width can be adjusted by a value of the duty cycle.

As explained above, the illuminating light communication device 10 of the present embodiment comprises the duty regulation unit 14b to change an on/off duty ratio of the optical communication signal.

Thereby, a duty ratio of a signal is changed by the duty regulation unit 14b, and the switch element is switched on/off in accordance with the changed signal, and thus load characteristic of the load circuit can be modulated. Furthermore, the modulation width of the load current flowing to the load circuit can be adjusted to a desired value by changing the duty cycle.

Embodiment 10

An illuminating light communication device of Embodiment 10 is explained with reference to FIGS. 16A to 16D. In the illuminating light communication device 10 of the Embodiments 1 to 9 explained above, a power source for the light emitting diode is the constant current source 11. Then, in the present embodiment, a circuit configuration of the constant current source 11 is explained specifically.

Figures 16A, 16B, 16C, 16D:
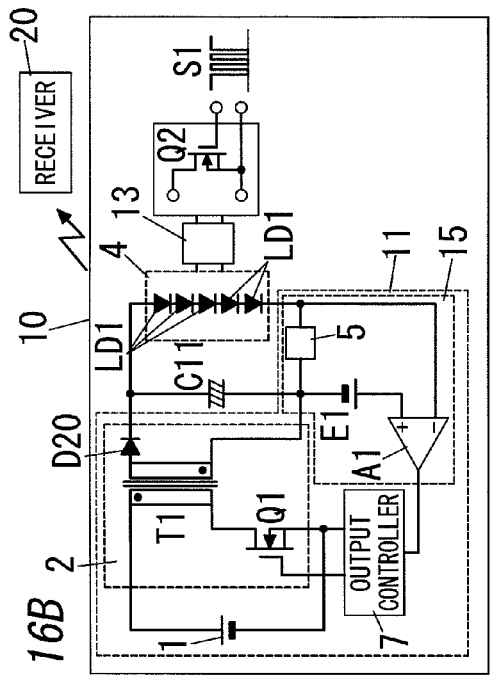
FIG. 16A is a circuit diagram for an illuminating light communication device of an Embodiment 10.
FIG. 16B is a circuit diagram for the illuminating light communication device of the Embodiment 10.
FIG. 16C is a circuit diagram for the illuminating light communication device of the Embodiment 10.
FIG. 16D is a circuit diagram for the illuminating light communication device of the Embodiment 10.

FIG. 16A shows a circuit diagram for an illuminating light communication device 10. In the present embodiment, the constant current source 11 comprises a DC-DC converter 2 (a converter) connected to a DC power supply 1, a feedback circuit 15 comprising a current sensing resistor 5 (a current sensing unit) and an error amplifier A1 (a difference amplifying unit), and output controller 7 (a controller).

The current sensing resistor 5 generates a voltage drop depending on a load current flowing to the load circuit 4. The error amplifier A1 amplifies a difference between a reference voltage E1 and the voltage drop generated in the current sensing resistor 5. Then, an output of the error amplifier A1 is transmitted to the output controller 7. The output controller 7 controls an output of the DC-DC converter 2 so that the voltage drop generated in the current sensing resistor 5 becomes equal to the reference voltage E1 (that is, so that the output of the error amplifier A1 becomes small).

In this circuit, a smoothing capacitor C11 is connected to outputs of the DC-DC converter 2. A load circuit 4 comprises a series circuit of a plurality of light emitting diodes LD1, and is connected between both ends of the smoothing capacitor C11. Here, a switch element Q2 is switched on/off in accordance with an optical communication signal S1, and thereby determines whether or not a load change element 13 is added to the load circuit 12. Thus, load characteristic of the load circuit 4 is partially changed.

In addition, various kinds of methods can be applied to the DC-DC converter 2, and in a circuit shown in FIG. 16B, the DC-DC converter 2 is a flyback converter comprising a switching device Q1, an output transformer T1, and a diode D20.

Then, in a circuit shown in FIG. 16C, the DC-DC converter 2 is a back converter comprising a switching device Q1, a choke coil L21, and a diode D21.

Then, in a circuit shown in FIG. 16D, the DC-DC converter 2 is an inverse back converter comprising a switching device Q1, a choke coil L22, and a diode D22. That is, a smoothing capacitor C11 is connected in parallel to a load circuit 4 comprising a series circuit of a plurality of light emitting diodes LD1, and then the current sensing resistor 5 is located in a source side of the switching device Q1 and detects a load current flowing to the light emitting diodes LD1. The error amplifier A1 amplifies a difference between the reference voltage E1 and the voltage drop, which is generated in the current sensing resistor 5 by a source current of the switching device Q1. Then, the feedback circuit 15 and the output controller 7 control to keep the current flowing to the light emitting diodes LD1 constant.

In each of the circuits shown in FIGS. 16A to 16D, a constant current is outputted from a constant current source 11, and a switch element Q2 is switched on/off in accordance with an optical communication signal S1, and thereby determines whether or not a load change element 13 is added to the load circuit 4. Thus, load characteristic of each load circuit 4 is modulated partially, and the load current is modulated in accordance with the optical communication signal, and the load current can be modulated faithfully with respect to a wave form of the optical communication signal S1.

Figure 17:
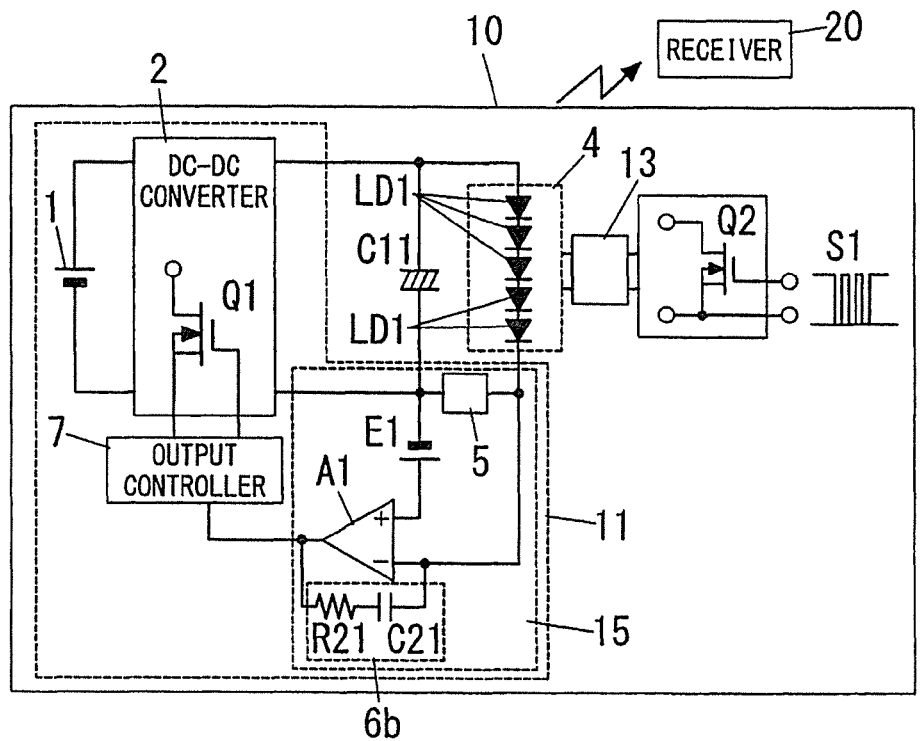
FIG. 17 is a circuit diagram showing other configuration of the Embodiment 10.

By the way, in each of specific circuits (see FIGS. 16A to 16D) of the constant current source 11 explained in the present embodiment, it is preferred that a phase compensation element is added to the constant current feedback system, and thereby the constant current source 11 becomes more suitable for practical use. FIG. 17 shows a circuit diagram that the phase compensation element is added to the circuit of FIG. 16A. This constant current source 11 comprises a phase compensation circuit 6b, and then the phase compensation circuit 6b includes an integral element comprising a resistor R21 and a capacitor C21 which are connected between an inverting input terminal and an output terminal of the error amplifier A1. The phase compensation circuit 6b secures stability of a loop transfer function in the feedback system, while increasing the gain in a low frequency domain and inhibiting the gain in a high frequency domain.

In addition, the modulation method, explained in each of the above embodiments, for optical communication by modulation of load characteristic does not depend on responsivity of the constant current feedback system, and then the constant current feedback circuit comprises the error amplifier A1 and has a function to control to keep the average value of the load current generally constant upon modulation and non-modulation. Here, it is expected that the responsivity to obtain a modulated wave form modulated faithfully with respect to the optical communication signal S1 is determined by an electric wiring inductance between the light emitting diodes LD1 and the smoothing capacitor C11 connected in parallel to the light emitting diodes LD1. Therefore, high-speed communication can be also expected by wiring in consideration of the electric wiring inductance. In addition, as a specific configuration of the DC-DC converter 2, various circuits in FIGS. 16B to 16D can be applied.

As explained above, in the present embodiment, the constant current source 11 comprises a constant current feedback system The constant current feedback system comprises a converter (the DC-DC converter 2) generating a DC output, a current sensing unit (the current sensing resistor 5) generating a voltage drop depending on a load current flowing to the load circuit, a difference amplifying unit (the error amplifier A1) amplifying a difference between a predetermined reference voltage and the voltage drop generated in the current sensing unit, and a controller (the output controller 7) controlling an output of the converter so that an average value of the load current becomes generally constant in accordance with an output of the difference amplifying unit.

Thereby, the controller feeds back the load current to control the output of the converter. Therefore, the circuit can have a function to control to keep the average value of the load current generally constant upon modulation and non-modulation.

Furthermore, in the present embodiment, the phase compensation circuit 6b is located in the constant current feedback system, and includes the integral element, and adjusts a phase of the output of the difference amplifying unit (the error amplifier A1).

As described above, because in the present embodiment the constant current source 11 comprises a phase compensation circuit 6b, the phase compensation circuit 6b can secure stability of a loop transfer function in the feedback system, while increasing the gain in a low frequency domain and inhibiting the gain in a high frequency domain.

Embodiment 11

An illuminating light communication device of Embodiment 11 is explained with reference to FIG. 18. In each of the above embodiments, the constant current source 11, the smoothing capacitor C11, and the load circuit 4 (comprising the light emitting diodes LD1) connected between both ends of the smoothing capacitor C11 are typically basic circuits used in a lighting apparatus, of which a load is a light emitting diode. Therefore, a block for illuminating light communication comprises the load change element 13, which is added to the load circuit and partially changes load characteristic of the load circuit, and the switch element Q2, which determines whether or not the load change element 13 is added to the load circuit through on/off operation in accordance with the optical communication signal S1, and then if such a block can be installed in an existing general light apparatus, an optical communication function can be easily added to the existing general light apparatus, and spread of the optical communication function can be expected.

Figure 18:
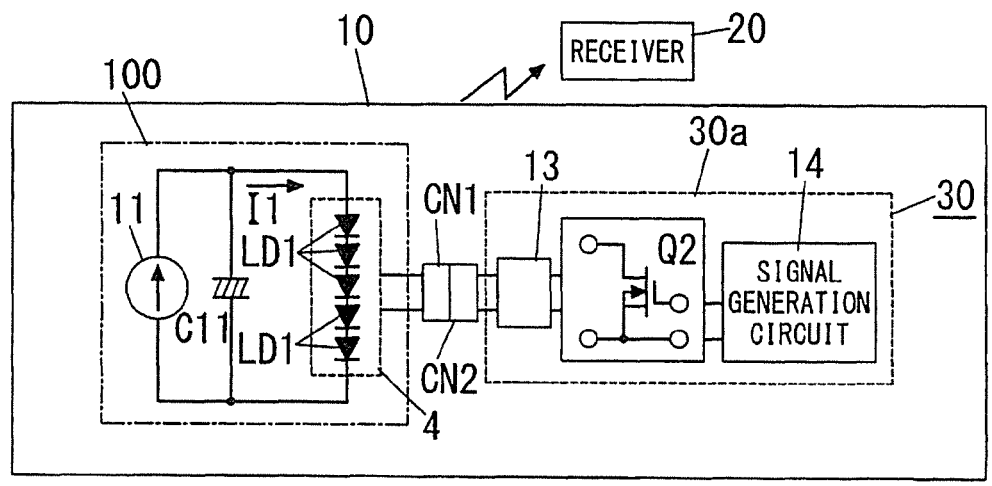
FIG. 18 is a circuit diagram for an illuminating light communication device of an Embodiment 11.

FIG. 18 is a circuit diagram for an illuminating light communication device 10 of the present embodiment, and the illuminating light communication device 10 comprises an existing light apparatus 100 and a communication unit 30 which can be connected to the light apparatus 100 later.

The light apparatus 100 comprises a constant current source 11, a smoothing capacitor C11 connected between outputs of the constant current source 11, and a load circuit 4 connected between both ends of the smoothing capacitor C11. The load circuit 4 comprises a plurality of light emitting diodes LD1 connected in series.

The communication unit 30 comprises a signal generation circuit 14 generating an optical communication signal S1, a load change element 13 partially changing load characteristic of the load circuit 4 of the light apparatus 100 through addition to the load circuit 4, and a switch element Q2 switched on/off in accordance with the optical communication signal S1 and thereby determining whether or not the load change element 13 is added to the load circuit 4. Then, the communication unit 30 comprises a connector CN2 detachably connected to a connector CN1 located in the light apparatus 100. Then, when the connector CN2 is connected to the connector CN1, the load change element 13 is electrically connected to the load circuit 4.

Then, the connector CN2 of the communication unit 30 is connected to the connector CN1 of the existing light apparatus 100, and thereby the optical communication function can be easily added to the existing light apparatus 100 without the optical communication function later.

Figure 19A:
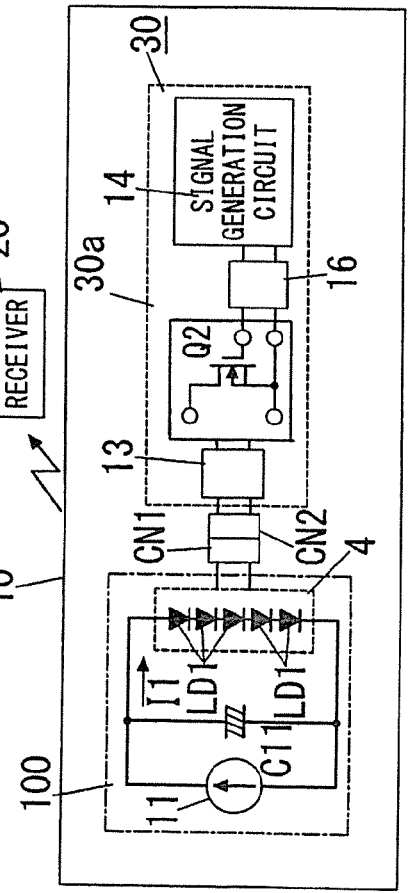
FIG. 19A is a circuit diagram showing other configuration of the Embodiment 11.

In addition, as shown in FIG. 19A, it is preferred that the communication unit 30 of the present embodiment comprises an insulation 16 which electrically insulates the switch element Q2 from the signal generation circuit 14 generating the signal communication signal S1.

Figure 19B:
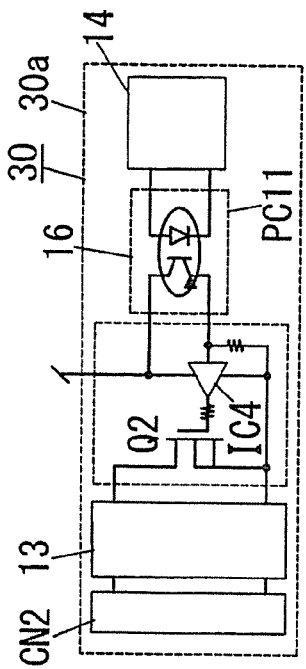
FIG. 19B is a circuit diagram showing a specific configuration of a communication unit of the Embodiment 11.
Figure 19C:
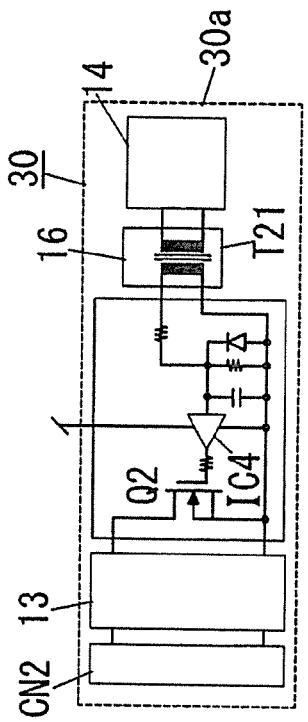
FIG. 19C is a circuit diagram showing a specific configuration of the communication unit of the Embodiment 11.

FIGS. 19B and 19C show specific examples of the insulation 16, and in a circuit of FIG. 19B the insulation 16 comprises a photocoupler PC11, and in a circuit of FIG. 19C the insulation 16 comprises an isolation transformer T21. In the circuits of FIGS. 19B and 19C, the switch element Q2 is driven by the photocoupler PC11 or the isolation transformer T21 in the insulation 16 through a buffer IC4.

As explained above, the illuminating light communication device 10 of the present embodiment comprises the communication unit 30 Then, the signal generation circuit 14, the load change element 13 and switch element Q2 are required to achieve the optical communication function, and these are housed within a case 30a of the communication unit 30. Then, the communication unit 30 is configured to be connected to the load circuit 4 through a mechanical component (that is, the connectors CN1, CN2) for connection.

Thereby, the communication unit 30 can be connected to the existing light apparatus 100 later, and the optical communication function can be easily added to the existing light apparatus 100.

In addition, the communication unit 30 comprises the insulation 16 electrically insulating the switch element Q2 from the signal generation circuit 14.

Thereby, even when the communication unit 30 is connected to the light apparatus 100 through the connectors CN1 and CN2, the signal generation circuit 14 is electrically insulated from the light apparatus 100. Thus, the signal generation circuit 14 can be connected to an external control system to convert a signal inputted from the external control system to the optical communication signal S1, and such a connection operation becomes easily.

Embodiment 12

An illuminating light communication device of Embodiment 12 is explained with reference to FIGS. 20A, 20B. The communication unit 30 explained in the Embodiment 11 is connected to one light apparatus 100 to add the optical communication function. In contrast, in the present embodiment, the communication unit can be connected to a plurality of light apparatuses and thereby can add the optical communication function to the plurality of light apparatuses.

Figure 20A:
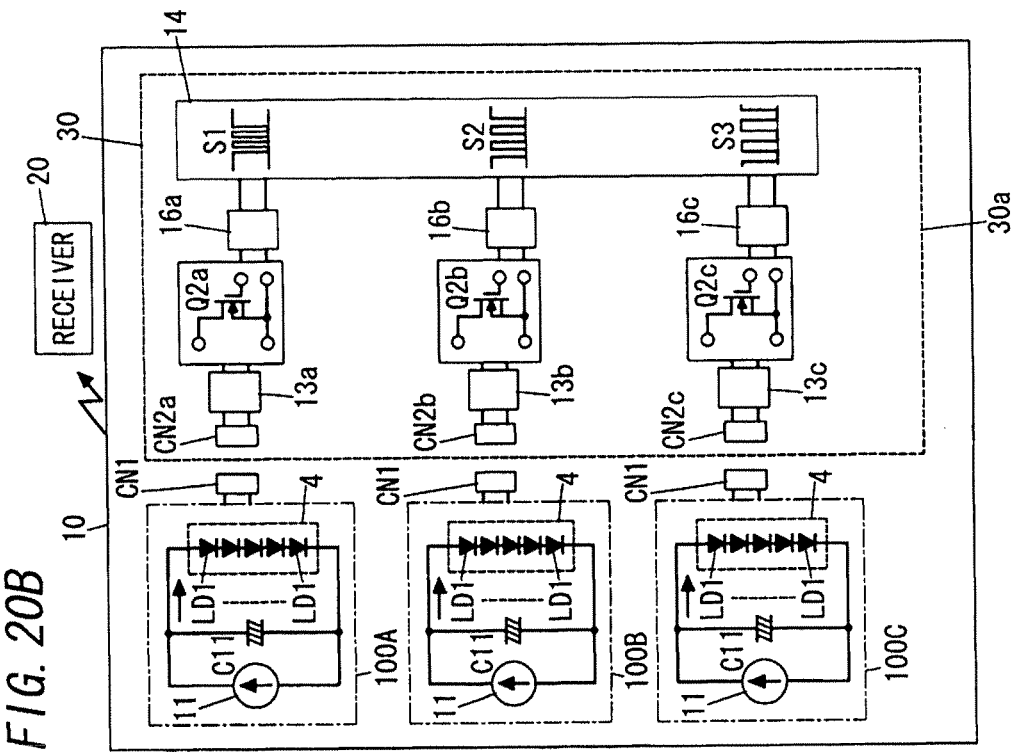
FIG. 20A is a circuit diagram for an illuminating light communication device of an Embodiment 12.

FIG. 20A is a circuit diagram for an illuminating light communication device 10 of the present embodiment, and the device 10 comprises three existing light apparatuses 100A, 100B, 100C, and a communication unit 30 connected to the three light apparatuses 100A, 100B, 100C.

The light apparatuses 100A, 100B, 100C have the same configuration, and each of the light apparatuses 100A, 100B, 100C comprises a constant current source 11, a smoothing capacitor C11 connected between both ends of the constant current source 11, and a load circuit 4 comprising a plurality of light emitting diodes LD1 connected in series between both ends of the smoothing capacitor C11.

The communication unit 30 receives the optical communication signal S1 from the signal generation circuit 14, and changes load characteristic of the plurality of light apparatuses to achieve optical communication. Then, the communication unit 30 comprises a plurality of load change elements and a plurality of switch elements, and is configured as a multichannel communication unit. The communication unit 30 comprises, for example, three systems. That is, as the three systems, the communication unit 30 comprises load change elements 13a, 13b, 13c, switch elements Q2a, Q2b, Q2c, insulations 16a, 16b, 16c, connectors CN2a, CN2b, CN2c, and a signal generation circuit 14, and these are housed within the same case 30a and thereby are unitized. The load change elements 13a, 13b, 13c are added to the load circuits 4 in the light apparatuses, respectively, and thereby load characteristic of the load circuit 4 is partially changed. The connectors CN2a, CN2b, CN2c are detachably connected to the connectors CN1 of the light apparatuses, respectively, and thereby the load change elements 13a, 13b, 13c are electrically connected to the load circuits 4 of the light apparatuses, respectively. The signal generation circuit 14 generates a binary optical communication signal S1. The switch elements Q2a, Q2b, Q2c are switched on/off in accordance with the optical communication signal S1 outputted from the signal generation circuit 14, and determines whether or not the load change elements 13a, 13b, 13c are added to the load circuits 4 of the light apparatuses, respectively. The insulations 16a, 16b, 16c electrically insulate the signal generation circuit 14 from the switch element Q2a, Q2b, Q2c, respectively, and have a configuration, such as the circuits in FIGS. 19B and 19C.

As explained above, the illuminating light communication device 10 of the present embodiment comprises the communication unit 30. Then, the signal generation circuit 14 required to achieve the optical communication function, the load change element 13 and switch element Q2 are housed within a case 30a of the communication unit 30. The communication unit 30 is connected to the load circuit 4 of the light apparatus through a mechanical component (that is, the three connectors CN1 and the connectors CN2a to CN2c) for connection.

Thereby, the communication unit 30 can be connected to the existing light apparatus 100 later, and the optical communication function can be easily added to the existing light apparatus 100.

In addition, the illuminating light communication device 10 of the present embodiment comprises a plurality of systems having the plurality of load change elements and the plurality of switch elements so as to be able to output the optical communication signal S1 outputted from the signal generation circuit 14 to the plurality of light apparatuses. Thus, in the illuminating light communication device 10, optical outputs of the plurality of light apparatuses can be modulated by only one communication unit 30.

Then, the switch elements Q2a, Q2b, Q2c in the plurality of systems are connected to the signal generation circuit 14 through the insulations 16a, 16b, 16c, respectively. Thus, the plurality of light apparatuses connected to the communication unit 30 are electrically insulated mutually, and mutual interference among the light apparatuses can be inhibited.

Figure 20B:
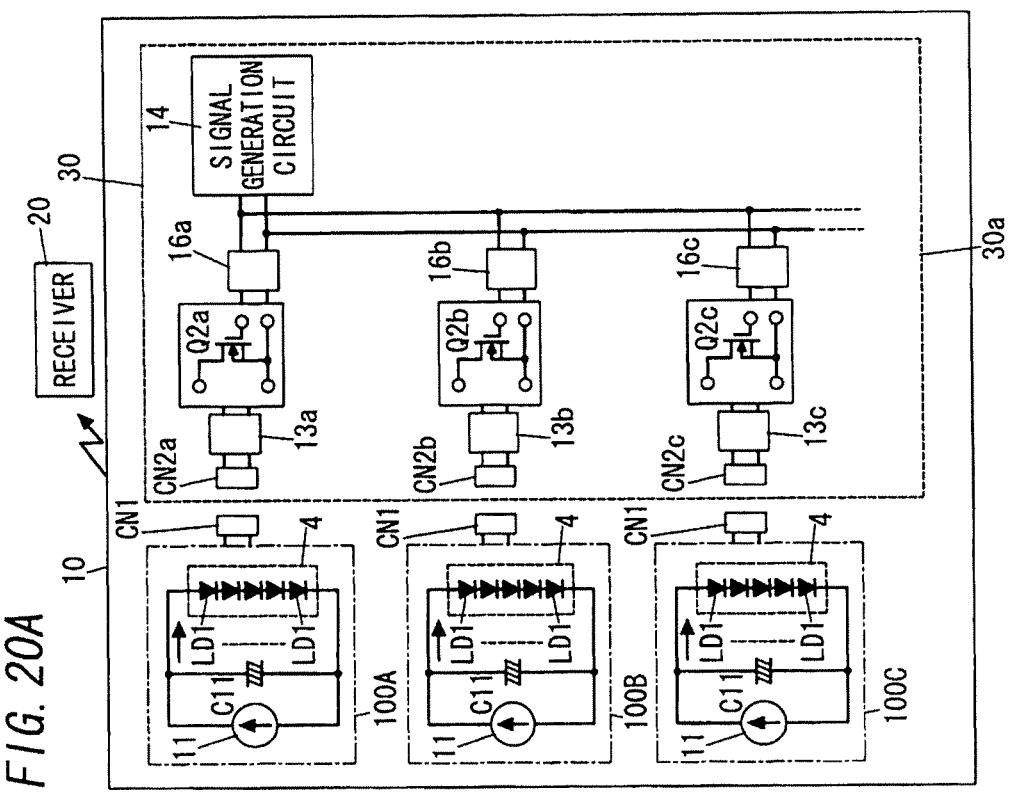
FIG. 20B is a circuit diagram for an illuminating light communication device of an Embodiment 12.
Figure 21:
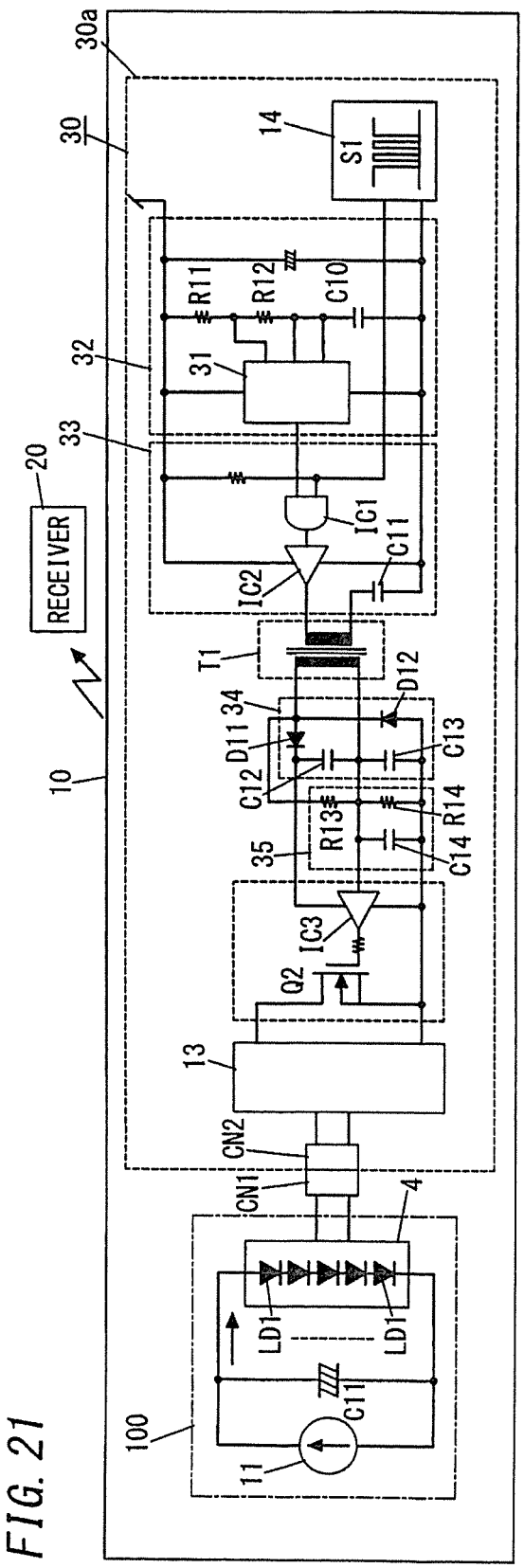
FIG. 21 is a circuit diagram for an illuminating light communication device of an Embodiment 13.

In addition, in the circuit of FIG. 20A, the communication unit 30 outputs the optical communication signal S1, outputted from the signal generation circuit 14, to the plurality of light apparatuses, but as shown in FIG. 20B, the signal generation circuit 14 may generate several different kinds (for example, three kinds) of optical communication signals S1, S2, S3, and the communication unit 30 may output these signals S1, S2, S3 to the light apparatuses 100A, 100B, 100C, respectively. In the circuit of FIG. 20B, the signals S1, S2, S3 is inputted to the switch elements Q2a, Q2b, Q2c, through the insulations 16a, 16b, 16c, respectively.

In this way, the signal generation circuit 14 generates several different kinds of optical communication signals (in the present embodiment, three kinds of signals S1, S2, S3). These optical communication signals are divided into a plurality of signal groups by difference in signals. Then, the switch element is located in each of the plurality of signal groups. That is, the switch elements Q2a, Q2b, Q2c are located so as to correspond to the signals S1, S2, S3, respectively. Furthermore, each of the plurality of insulations (16a, 16b, 16c) is located to electrically insulate the signal generation circuit 14 from the switch element.

In this way, the several different kinds of optical communication signals can be outputted to different light apparatuses, respectively. Thus, multichannel optical communication can be achieved by one communication unit 30.

Embodiment 13

An illuminating light communication device of Embodiment 13 is explained with reference to FIG. 21 and FIGS. 22A to 22E FIG. 21 is a circuit diagram for an illuminating light communication device 10 of the present embodiment. The communication unit 30 of the present embodiment is that a carrier wave generation unit 32, a modulation unit 33, an insulating transformer T1, a control power unit 34, and demodulation unit 35 are added to the communication unit 30 explained in the Embodiment 11.

The carrier wave generation unit 32 comprises an IC for timer 31, resistors R11, R12, and a capacitor C10, and constitutes an astable multi-vibrator, and oscillates with a frequency (for example, 1 [MHz]) being higher enough than a frequency of the optical communication signal S1. Further, for example, LMC555 of National Semiconductor Corp. is used as the IC for timer 31.

An output signal of the IC for timer 31 is inputted to the modulation unit 33, and then is inputted to one input terminal of an AND gate IC1. In contrast, the optical communication signal S1 is inputted to the other input terminal of the AND gate IC1. Then, a logical sum of the optical communication signal S1 and the output signal from the IC for timer 31 is inputted to a buffer IC2. Then, a primary winding of the insulating transformer T1 is excited through a coupling capacitor C11.

The optical communication signal S1 is modulated with, for example, a carrier wave of 1 [MHz], and thereby a high frequency voltage is evoked in a secondary winding of the insulating transformer T1, and is rectified and smoothed by the control power unit 34, which comprises a voltage double rectifier circuit having diodes D11, D12 and capacitors C12, C13. The power of a buffer IC3 for driving a gate of the switch element Q2 is generated by an output voltage of the voltage double rectifier circuit.

Then, the voltage evoked in the secondary winding of the insulating transformer T1 is inputted to the demodulation unit 35. In this demodulation unit 35, the voltage evoked in the secondary winding of the insulating transformer T1 is divided in resistors R13 and R14, and then a carrier wave component is removed in a capacitor C14 and thereby the optical communication signal S1 is reproduced. The demodulation unit 35 supplies the reproduced optical communication signal S1 to an input of the buffer IC3, and thereby the gate of the switch element Q2, being a MOSFET, is driven.

Figure 22A:
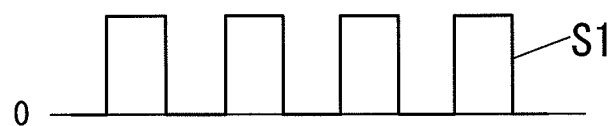
FIG. 22A is a wave form chart of each part of the Embodiment 13.
Figure 22B:
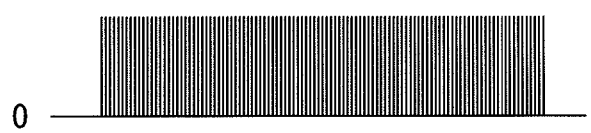
FIG. 22B is a wave form chart of each part of the Embodiment 13.
Figure 22C:
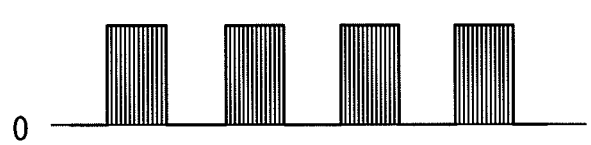
FIG. 22C is a wave form chart of each part of the Embodiment 13.
Figure 22D:
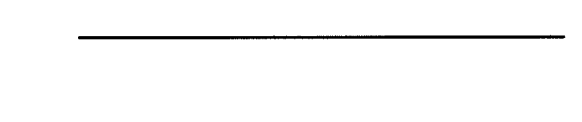
FIG. 22D is a wave form chart of each part of the Embodiment 13.
Figure 22E:
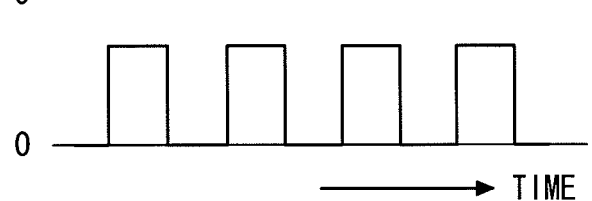
FIG. 22E is a wave form chart of each part of the Embodiment 13.

FIGS. 22A to 22E are wave form charts for explanation of the above-mentioned circuit operation in various parts. FIG. 22A is a wave form charts of the optical communication signal S1 (for example, 10 [kHz]) outputted from the signal generation circuit 14. FIG. 22B is a wave form charts of the carrier wave signal (for example, 1 [MHz]). FIG. 22C is a wave form charts of the output of the AND gate IC1 (the modulation unit 33), and the carrier wave signal is modulated with the optical communication signal S1. FIG. 22D is a wave form chart of the output of the control power unit 34, and a DC power is rectified and smoothed in the voltage double rectifier circuit and is supplied to the buffer IC3. FIG. 22E is a wave form chart (a signal wave form demodulated in the demodulation unit 35) of the output of the buffer IC3, and the signal is inputted to the gate terminal of the switch element Q2 comprising the MOSFET.

In the illuminating light communication device 10 of the present embodiment, the communication unit 30 comprises the carrier wave generation unit 32, the modulation unit 33, the insulating transformer T1, and the demodulation unit 34. The carrier wave generation unit 32 generates the carrier wave, which is set in the frequency being higher enough than the frequency of the optical communication signal S1, so as to be able to separate from the optical communication signal S1. The modulation unit 33 modulates the optical communication signal S1 with the carrier wave. The insulating transformer T1 is connected between the modulation unit 33 and the switch element Q2. The demodulation unit 35 obtains a signal by removing the carrier wave from the output of the insulating transformer T1, and outputs the obtained signal to the switch element Q2.

In this way, because the communication unit 30 comprises the carrier wave generation unit 32, the modulation unit 33, the control power unit 34 and the demodulation unit 35, a compact transformer can be used as the insulating transformer T1 constituting the insulation 16 located between the signal generation circuit 14 and the switch element Q2. Then, it is easy to secure an electric power for driving the switch element Q2, and thereby it is not necessary to secure a control power from the light apparatus. Thus, highly independent communication unit 30 can be achieved. In addition, the optical communication function can be easily added to the existing light apparatus 100 later, by integrating components, such as the load change element 13 and switch element Q2, as the communication unit 30. Then, it is needless to say that a configuration of the communication unit of the present embodiment can be applied to the multichannel communication unit explained in the Embodiment 12.

Embodiment 14

Figure 23A:
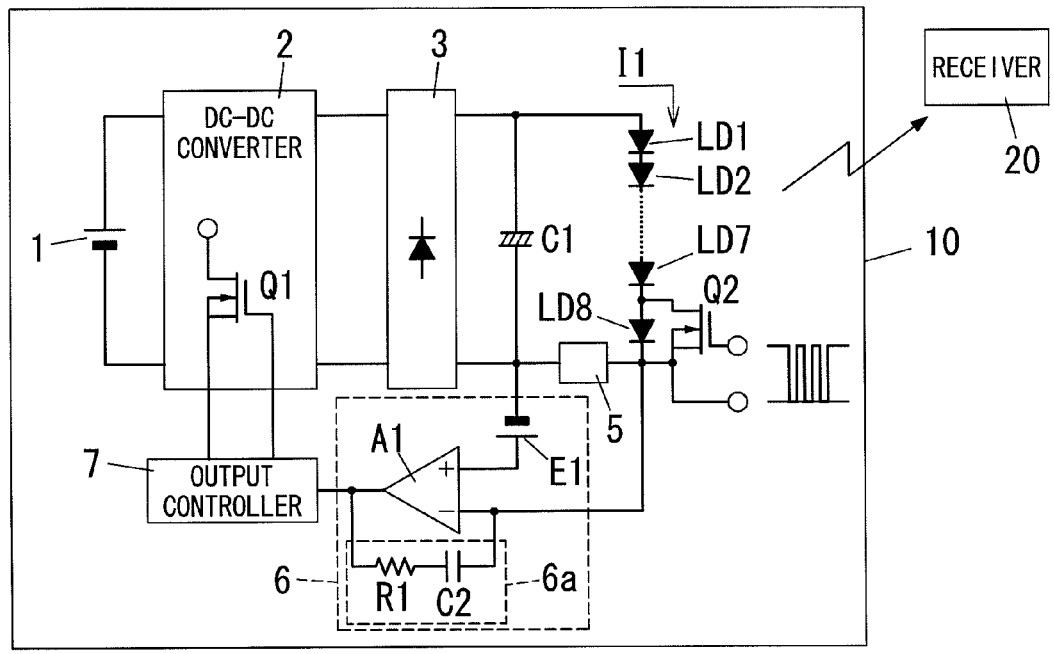
FIG. 23A is a circuit diagram for an illuminating light communication device of an Embodiment 14.

An illuminating light communication device of Embodiment 14 is explained with reference to FIGS. 23A, 23B, FIGS. 24A, 24B, FIGS. 25A to 25C, FIGS. 26A to 26E, and FIG. 27. FIG. 23A is a circuit diagram for an illuminating light communication device 10, and this device 10 comprises a DC-DC converter 2 (a converter) connected to a DC power supply 1, a rectifier circuit 3, and a smoothing capacitor C1 (a smoothing circuit). Then, the DC-DC converter 2 causes a switch element Q1 to switch a DC voltage from the DC power supply 1 on/off. Then, an output from the DC-DC converter 2 is rectified in the rectifier circuit 3 including a diode and is smoothed in the smoothing capacitor C1, and thereby is converted to a DC voltage having a predetermined voltage value. A plurality of light emitting diodes LD1 to LD8 (for example, eight diodes) and a current sensing resistor 5 (a current sensing unit) are connected in series between outputs of the DC-DC converter 2, that is, between both ends of the smoothing capacitor C1. A voltage drop of the current sensing resistor 5 is inputted to an inverting input terminal of an error amplifier A1 (a difference amplifying unit). The error amplifier A1 compares the voltage drop of the current sensing resistor 5 with a reference voltage E1 inputted to a non-inverting input terminal, and amplifies its difference signal, and then outputs the amplified signal to an output controller 7 (a controller). The output controller 7 controls on/off operation of the switch element Q1 in accordance with a feedback signal inputted from the error amplifier A1, and thereby a load current I1 is controlled. In addition, a phase compensation circuit 6a is connected between the output terminal and the inverting input terminal of the error amplifier A1, and comprises a resistor R1 and a capacitor C2, which are an integral element. Then, the error amplifier A1, the resistor R1, and the capacitor C2 constitutes a constant current feedback circuit 6.

Then, in the present circuit, a switch element Q2 (a switching device) is connected in parallel to a part of the plurality of light emitting diodes LD1 to LD8 connected in series, that is, to one light emitting diode LD8. The switch element Q2 is switched on/off in accordance with an optical communication signal S1 inputted from outside.

Figure 23B:
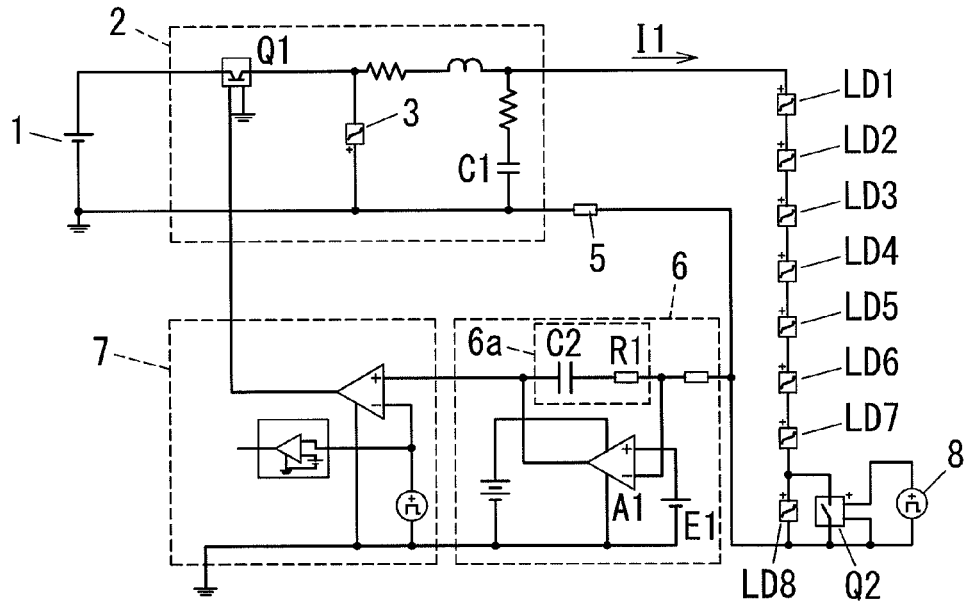
FIG. 23B is a circuit diagram modeled for simulation of the illuminating light communication device of the Embodiment 14.

Then, FIG. 23B shows a simulation circuit for inspecting a circuit operation. In this circuit, a step-down chopper circuit is used as the DC-DC converter 2. Then, the switch element Q2 is connected to the light emitting diode LD8 and, is switched on/off with a signal source 8, which outputs an oscillation signal of 10 [kHz] corresponding to the optical communication signal.

Figure 24A:
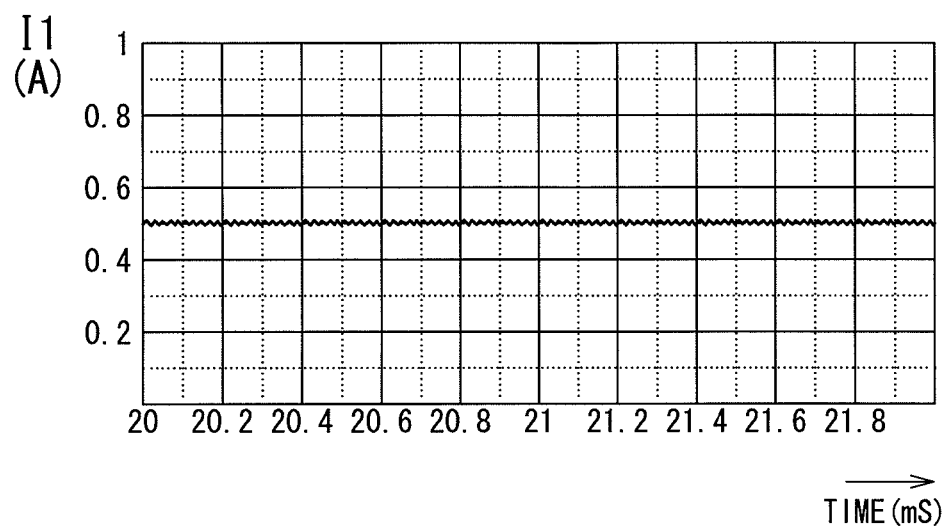
FIG. 24A is a wave form chart showing a simulation result of a load current of the illuminating light communication device of the Embodiment 14.
Figure 24B:
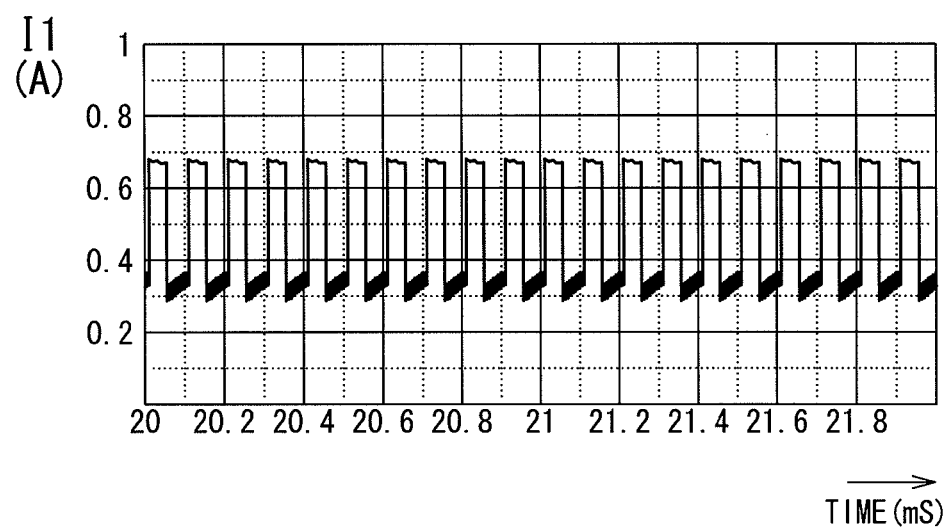
FIG. 24B is a wave form chart showing a simulation result of a load current of the illuminating light communication device of the Embodiment 14.

FIGS. 24A, 24B are wave form charts showing simulation result of the load current I1 obtained by using the above-mentioned simulation circuit. FIG. 24A shows the load current I1 in a state where the signal source 8 is stopped, and the load current I1 is set to about DC 500 [mA]. FIG. 24B shows the load current I1 in a state where the signal source 8 outputs a rectangular wave signal of 10 [kHz] and a current flowing to the diode LD8 is intermitted. Then, the load current I1 is about 700 [mA] when the switch element Q2 is switched on, and is about 300 [mA] when the switch element Q2 is switched off, and its average current is about 500 [mA]. In addition, a current flowing to the diode LD8 is 0 [mA] when the switch element Q2 is switched on. On the other hand, a rectangular wave current of about 300 [mA] flows to the diode LD8 when the switch element Q2 is switched off.

As explained above, the switch element Q2 is connected in parallel to a part of the plurality of light emitting diodes LD1 to LD8 connected in series, and then the switch element Q2 is switched on/off in accordance with the optical communication signal, and thereby a current flowing to the part of diodes is intermitted. Therefore, the load current flowing to the diodes LD1 to LD8 is modulated in accordance with the optical communication signal, and then illuminating lights outputted from the diodes LD1 to LD8 are modulated in accordance with the optical communication signal. Then, an optical output from the device 10 is received as an optical communication signal by a receiver 20 having a photo IC. The receiver 20 adopts a method for receiving the optical communication signal by detecting a difference between an optical output not superimposed on the optical communication signal and an optical output superimposed on the optical communication signal, and thereby the receiver 20 can detect even a minute modulation light. The DC-DC converter 2 controls so that the average value of the load current I1 becomes generally constant, and thereby the power loss can be decreased. Here, the load change element is the light emitting diode LD8 connected in parallel to the switch element Q2.

Figure 25A:
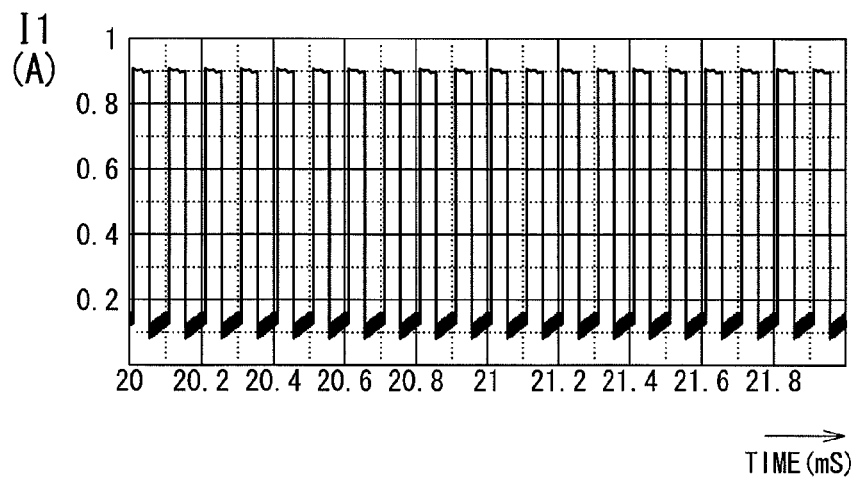
FIG. 25A is a wave form chart showing a simulation result of a load current of the illuminating light communication device of the Embodiment 14.

By the way, in the above-mentioned simulation circuit, one of the eight diodes is connected in parallel to the switch element Q2. In contrast, FIG. 25A shows the load current I1 in a state where two of the eight diodes are connected in parallel to the switch element Q2 and the switch element Q2 is intermittently switched on/off with the signal source 8. From the simulation result of FIG. 25A, it is found that when the number of diodes intermitted with the switch element Q2 increases (from one diode to two diodes), a peak value of the load current I1 increases and a bottom value thereof decreases and thus the optical output can be modulated more greatly. Also, in this case, it is found that the average current can be set to the same value (about 500 [mA]) as the average current upon non-modulation. In addition, although the switch element Q2 is switched on/off with a high frequency of about 10 [kHz] and thereby the optical output of the light emitting diode is modulated, human eyes can not recognize light modulation of the high frequency of about 10 [kHz]. Therefore, the light modulation does not bring a feeling of strangeness.

Figure 25B:
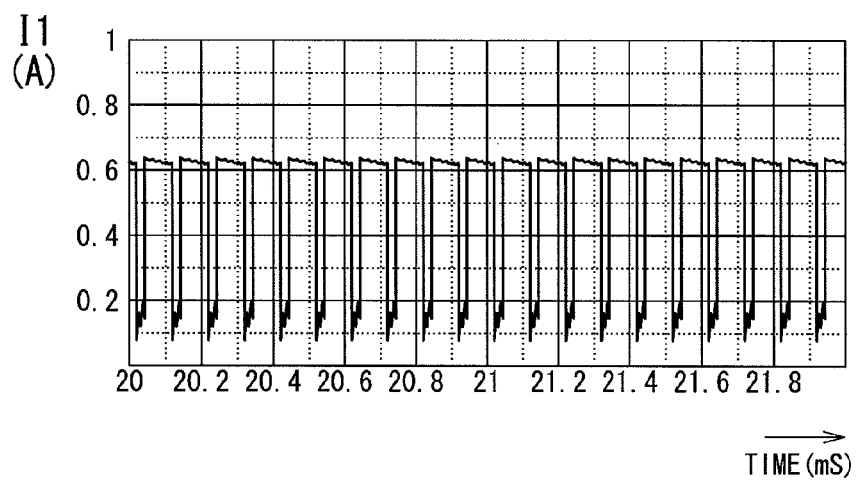
FIG. 25B is a wave form chart showing a simulation result of a load current of the illuminating light communication device of the Embodiment 14.
Figure 25C:
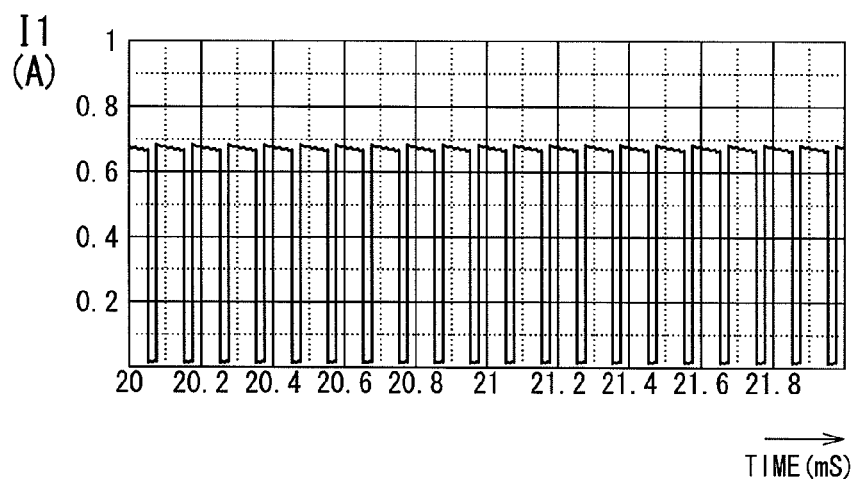
FIG. 25C is a wave form chart showing a simulation result of a load current of the illuminating light communication device of the Embodiment 14.

Then, in the above-mentioned simulation circuit, a duty cycle of the switch element Q2 is set to be 50%. In contrast, FIGS. 25B, 25C show simulation results in a state where the duty cycle is set to be 75%. Then, FIG. 25B shows the load current I1 in a state where one light emitting diode is intermitted with the switch element Q2, and FIG. 25C shows the load current I1 in a state where two light emitting diodes are intermitted with the switch element Q2. From these simulation results, it is found that if the duty cycle of the switch element Q2 is set be more than 50%, the circuit can lengthen a lights-out period of one or more than light emitting diodes connected in parallel to the switch element Q2. Thus, the circuit can inhibit the peak value of the rectangular wave of the load current I1, and the average current can be set to the same value as the average current upon non-modulation, and a capacity of a peak current rating of the light emitting diode and receiving sensitivity can be adjusted by changing the duty cycle of the switch element Q2.

Figure 26A:
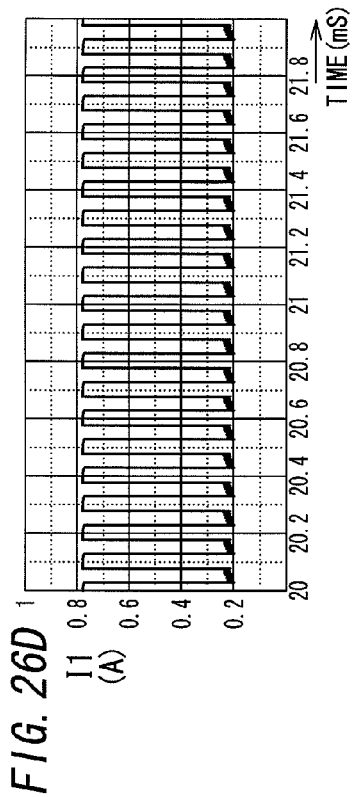
FIG. 26A is a wave form chart showing a simulation result of a load current of the illuminating light communication device of the Embodiment 14.
Figure 26D:
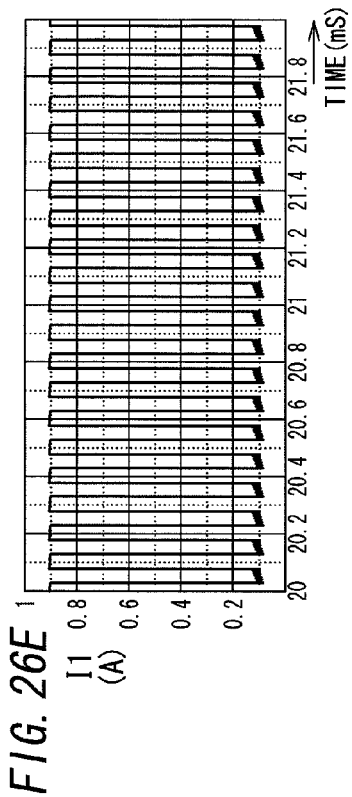
FIG. 26D is a wave form chart showing a simulation result of a load current of the illuminating light communication device of the Embodiment 14.
Figure 26B:
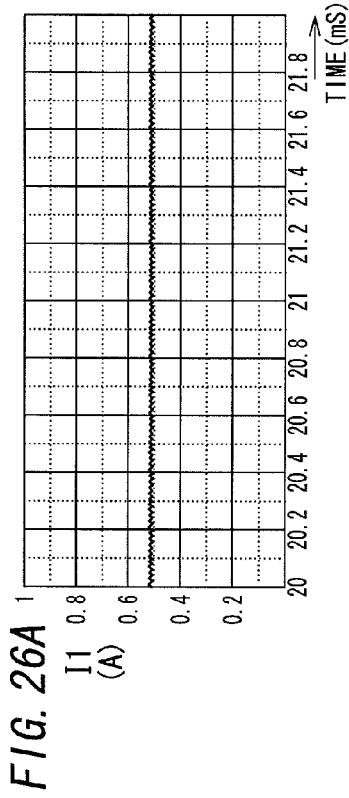
FIG. 26B is a wave form chart showing a simulation result of a load current of the illuminating light communication device of the Embodiment 14.
Figure 26E:
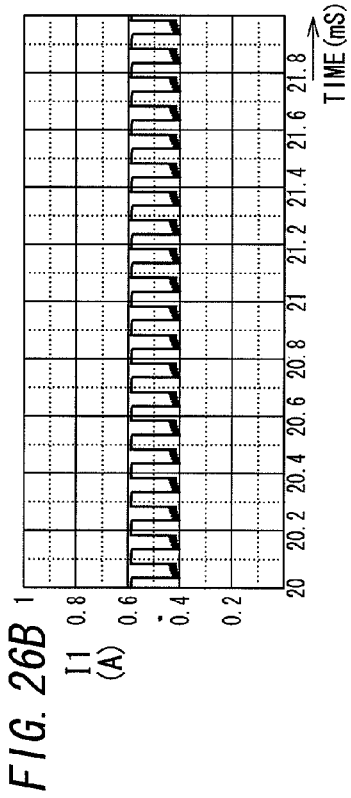
FIG. 26E is a wave form chart showing a simulation result of a load current of the illuminating light communication device of the Embodiment 14.
Figure 26C:
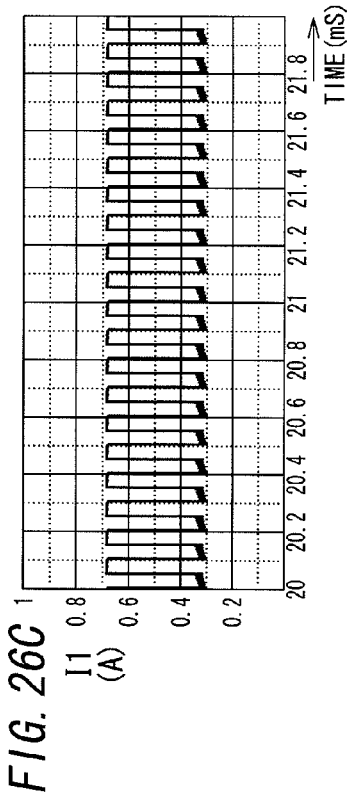
FIG. 26C is a wave form chart showing a simulation result of a load current of the illuminating light communication device of the Embodiment 14.

Then, in the above-mentioned simulation circuit, the eight light emitting diodes are used. In contrast, FIGS. 26A to 26E show simulation results in a state where twelve light emitting diodes are connected in series and the switch element Q2 is connected in parallel to 1-4 diodes of the twelve diodes. FIG. 26A shows the load current I1 when the signal source 8 is stopped (that is, when the switch element Q2 is switched off), and the load current I1 is set to be about DC 500 [mA]. FIG. 26B shows the load current I1 when one light emitting diode is intermitted, and FIG. 26C shows the load current I1 when two light emitting diodes are intermitted, and FIG. 26D shows the load current I1 when three light emitting diodes are intermitted, and FIG. 26E shows the load current I1 when four light emitting diodes are intermitted. In addition, in every case, the duty cycle of the switch element Q2 is set to be 50%. From these simulation results, it is found that the more the number of diodes, intermitted with the switch element Q2, increases, the more the degree of modulation increases, but the average current of the load current I1 is kept constant.

As explained above, in the present embodiment, the switch element Q2 is connected in parallel to a part of the plurality of light emitting diodes connected in series, and then the switch element Q2 is switched on/off in accordance with the signal communication signal. When the switch element Q2 is switched on, short-circuiting is generated between both ends of the part of the light emitting diodes connected in parallel to the switch element Q2. In that time, on-voltage of the diodes connected in series decreases depending on the number of short-circuited diodes, and then a difference ΔV is generated between output voltages of the DC-DC converter 2 (that is, voltages of both ends of the smoothing capacitor C1). Therefore, the load current I1 flowing to the remaining light emitting diodes is increased by a value, which is determined by the operation resistance and the above-mentioned difference ΔV. Because this increase is not caused by the feedback system (the constant current feedback circuit 6) through the error amplifier A1, the load current I1 increases instantly and then good following capability can be provided to the optical communication signal. Then, the more the number of the short-circuited light emitting diodes increases, the greater the increase of the load current becomes. On the other hand, although the load current I1 decreases compared with a state where the load current I1 is not modulated with the optical communication signal when the switch element Q2 is switched off, this current value is controlled so that the average current becomes to be equal to the load current before modulation by averaging control in the constant current feedback circuit 6.

In this illuminating light communication device, the part of the plurality of light emitting diodes LD1 to LD8, connected in series, used for illuminating is intermittently short-circuited in accordance with the optical communication signal, and thereby the load current I1 can be faithfully modulated with respect to the optical communication signal. Then, loss of circuit efficiency does not occur, and then, even if the load current I1 is modulated with the optical communication signal, the average value of the load current I1 does not change. Thus, there is not a possibility that quality of illuminating is detracted from.

As explained above, in the present embodiment, the circuit added for optical communication has a simple configuration, but the optical output can be faithfully modulated in accordance with the optical communication signal having a high frequency, and further the illuminating light communication device having low power loss can be provided.

Embodiment 15

Figure 27:
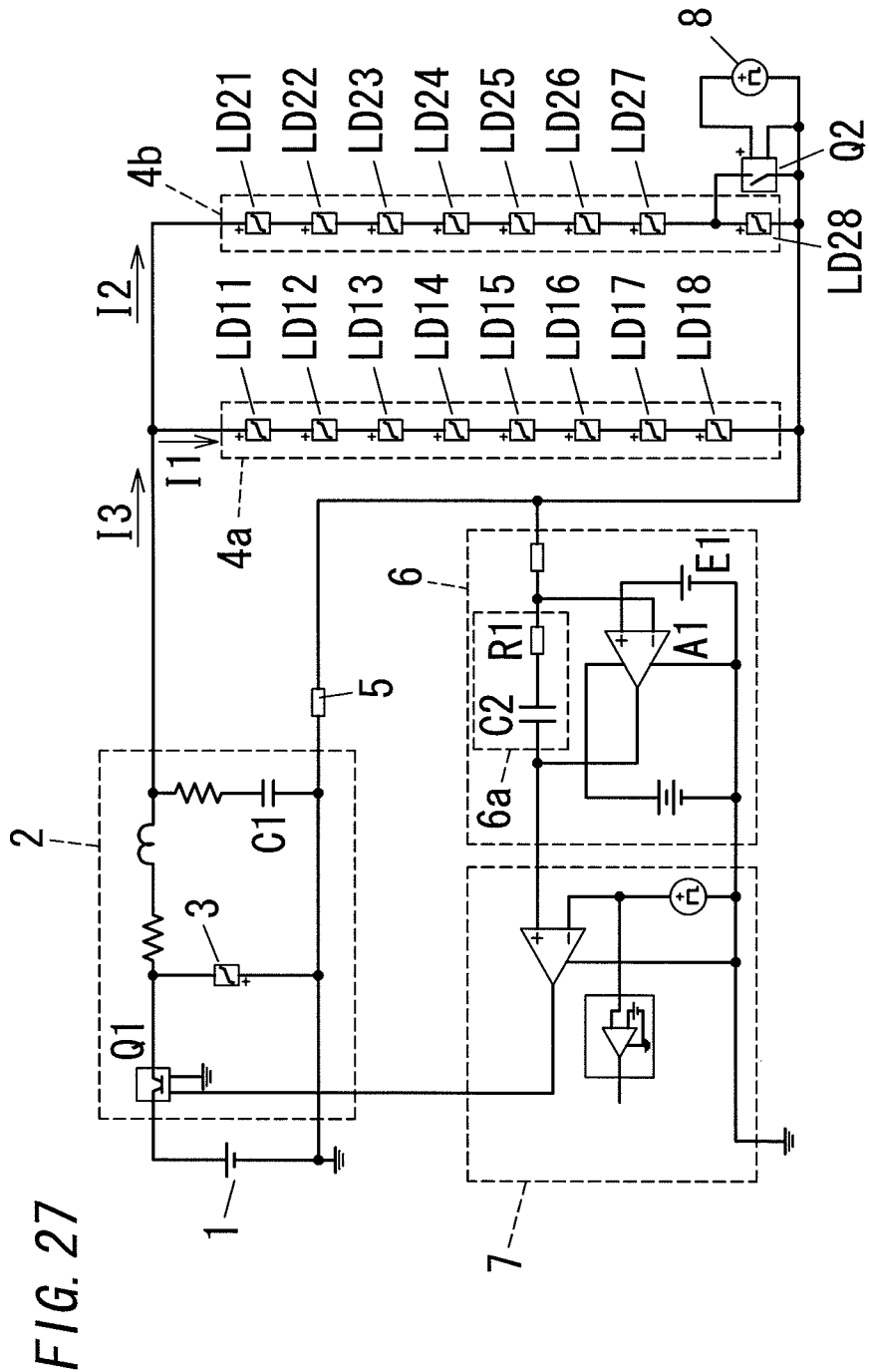
FIG. 27 is a circuit diagram for an illuminating light communication device of an Embodiment 15.

An illuminating light communication device of Embodiment 15 is explained with reference to FIG. 27, FIGS. 28A to 28C, FIG. 29, and FIGS. 30A to 30C. FIG. 27 shows a simulation circuit for inspecting a circuit operation of the present embodiment. In this circuit, a series circuit 4a comprises eight light emitting diodes LD11 to LD18, and a series circuit 4b comprises eight light emitting diodes LD21 to LD28, and the two series circuit 4a, 4b are connected in parallel between outputs of a DC-DC converter 2 through a current sensing resistor 5. Then, a switch element Q2 is connected in parallel to a part (for example, the light emitting diode LD28) of the light emitting diodes LD21 to LD28 of the series circuit 4b, and is switched on/off in accordance with the optical communication signal. Here, in the simulation circuit of FIG. 27, a signal source 8 outputs an oscillation signal of 10 [kHz] corresponding to the optical communication signal, and the switch element Q2 is switched on/off with the signal source 8. In addition, the circuit configuration of the present embodiment is equal to that of the Embodiment 14, except for the load circuit comprising the light emitting diodes LD11 to LD18, and LD21 to LD28. Thus, the same code is referred to circuit components corresponding to circuit components of the Embodiment 14, and the explanation is omitted.

Figure 28A:
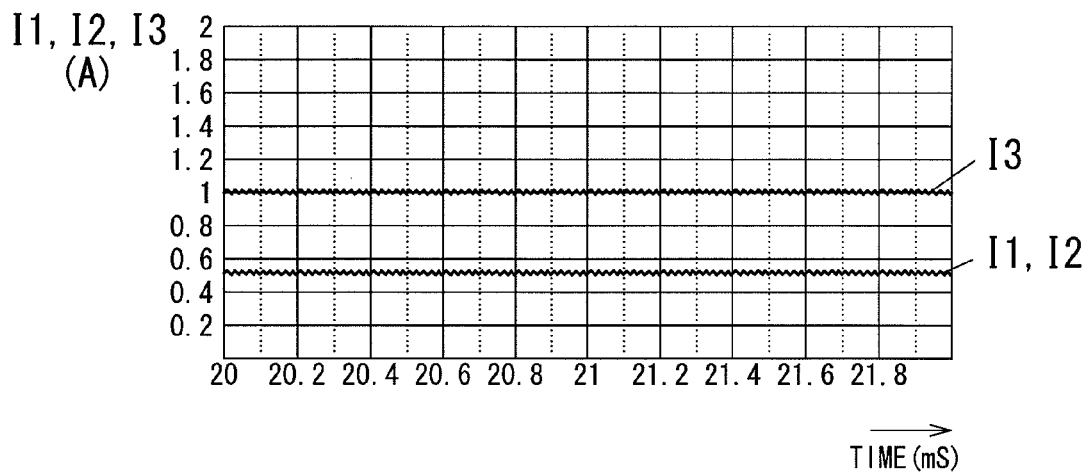
FIG. 28A is a wave form chart showing a simulation result of a load current of the illuminating light communication device of the Embodiment 15.
Figure 28B:
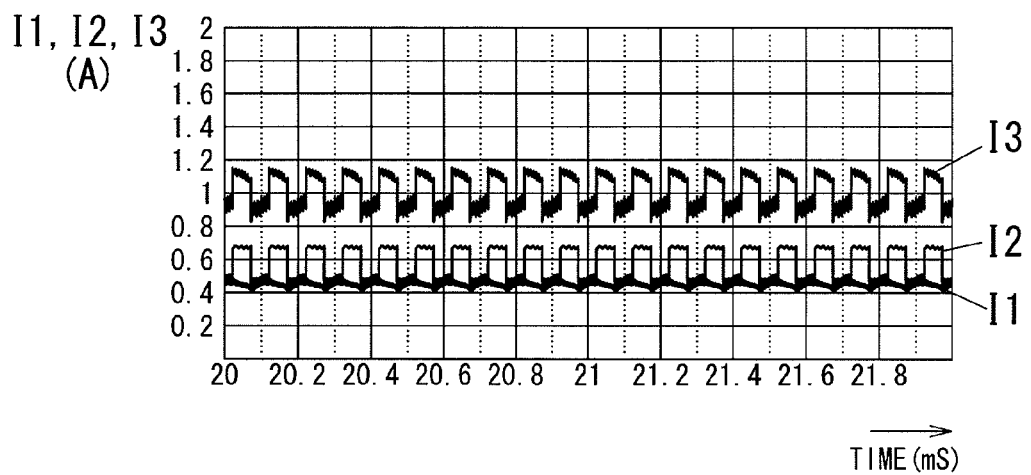
FIG. 28B is a wave form chart showing a simulation result of a load current of the illuminating light communication device of the Embodiment 15.
Figure 28C:
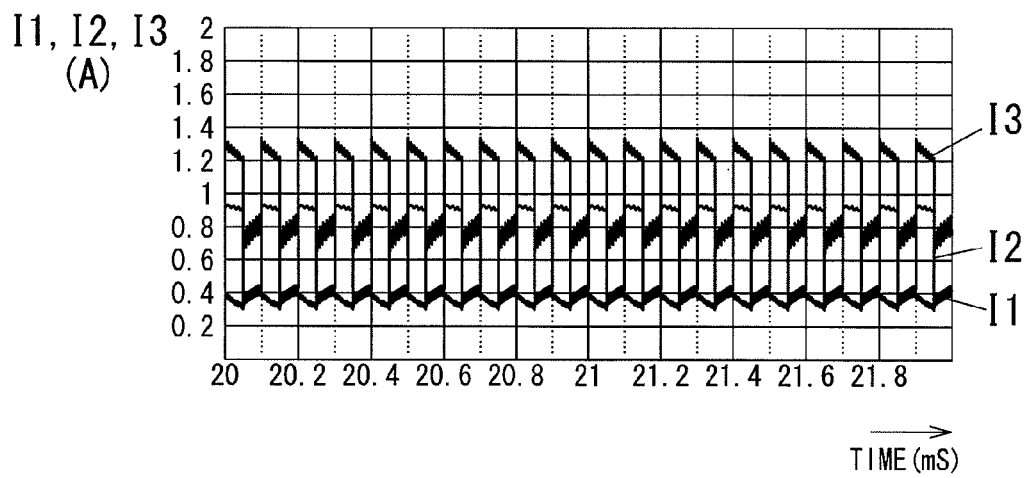
FIG. 28C is a wave form chart showing a simulation result of a load current of the illuminating light communication device of the Embodiment 15.
Figure 29:
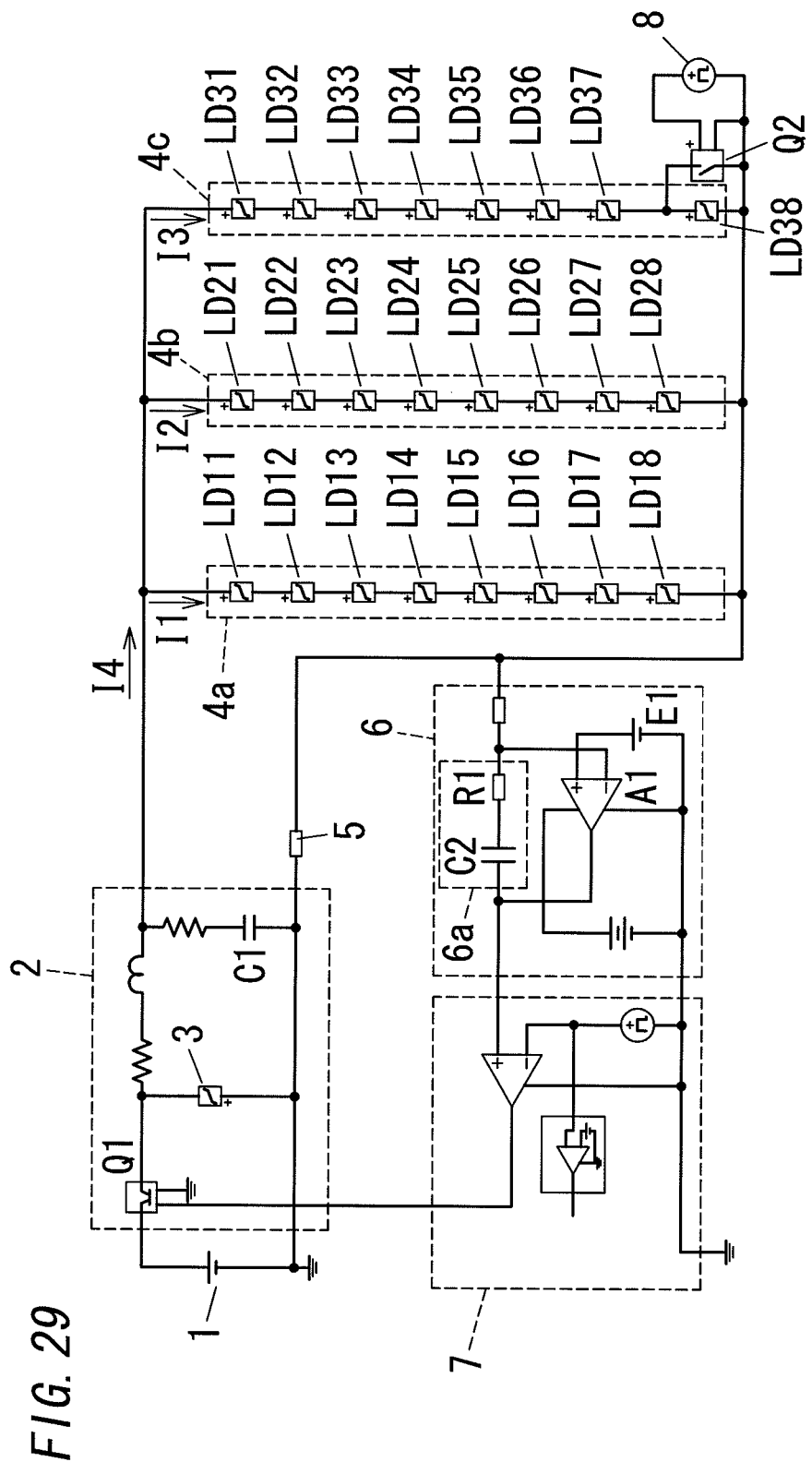
FIG. 29 is a circuit diagram showing other circuit configuration of the illuminating light communication device of the Embodiment 15.

FIGS. 28A to 28C are wave form charts showing simulation results of load currents I1, I2, which flows to the series circuits 4a, 4b, respectively, and a resultant current I3 (=I1+I2) obtained by using the above-mentioned simulation circuit. FIG. 28A shows the currents I1, I2, I3 in a state where the signal source 8 is stopped, and then each of the load currents I1, I2 is set to be about DC 500 [mA], and the resultant current I3 is set to be about DC 1 [A].

Then, FIG. 28B shows the load currents I1, I2 and the resultant current I3 when the signal source 8 outputs a rectangular wave signal of 10 [kHz] (duty cycle is 50%) and one light emitting diode LD28 is intermitted. Here, the light emitting diodes of the series circuit 4a are not intermitted with the switch element Q2, and then the load current I1 flowing to the series circuit 4a is generally a direct current and is not modulated. In contrast, the light emitting diode LD28 of the series circuit 4b is intermitted with the switch element Q2, and then the load current I2 flowing to the series circuit 4b is modulated with reference to an average current (about 500 [mA]). Then, the resultant current I3, which is a sum of the load currents I1 and I2, is modulated with reference to an average value (1 [A]).

In addition, in the above-mentioned simulation circuit, one light emitting diode LD28 is switched on/off with the switch element Q2. In contrast, FIG. 28C is a wave form chart showing simulation result of the currents I1, I2, I3 when two light emitting diodes are intermitted with the switch element Q2. From this result, it is found that the modulated width can be increased with increasing the number of the light emitting diodes intermitted with the switch element Q2. In regard to this, when the switch element Q2 is switched on, short-circuiting is generated between both ends of the part of the plurality of light emitting diodes, connected in parallel to the switch element Q2. In this time, an on-voltage of the plurality of light emitting diodes connected in series decreases depending on the number of the short-circuited light emitting diodes, and then a difference $\Delta V$ is generated between output voltages of the DC-DC converter 2 (that is, voltages of both ends of the smoothing capacitor C1). Therefore, the load current I1 flowing to the remaining light emitting diodes is increased by a value, which is determined by the operation resistance and the above-mentioned voltage difference $\Delta V$. Because this increase is not caused by the feedback system through the error amplifier A1, the load current I1 increases instantly and then good following capability can be provided to the optical communication signal. Then, the more the number of the short-circuited light emitting diodes increases, the greater the increase of the load current becomes. On the other hand, although the load current I1 decreases compared with a state where the load current I1 is not modulated with the optical communication signal when the switch element Q2 is switched off, this current value is controlled so that the average current becomes to be equal to the load current before modulation by averaging control in the constant current feedback circuit 6.

By the way, in the above-mentioned circuit, the two series circuits comprising the plurality of light emitting diodes are connected in parallel, but the number of the series circuits is not limited two and the number of the series circuits may be equal to or more than three. In a circuit shown in FIG. 29, series circuits 4a, 4b, 4c are connected in parallel between outputs of a DC-DC converter 2 through a current sensing resistor 5. The series circuit 4a comprises eight light emitting diodes LD11 to LD18 connected in series, and the series circuit 4b comprises eight light emitting diodes LD21 to LD28 connected in series, and series circuit 4c comprises eight light emitting diodes LD31 to LD38 connected in series. Then, a switch element Q2 is connected in parallel to a part (for example, the light emitting diode LD38) of the plurality of light emitting diodes LD31 to LD38, and is switched on/off in accordance with the optical communication signal.

Figure 30A:
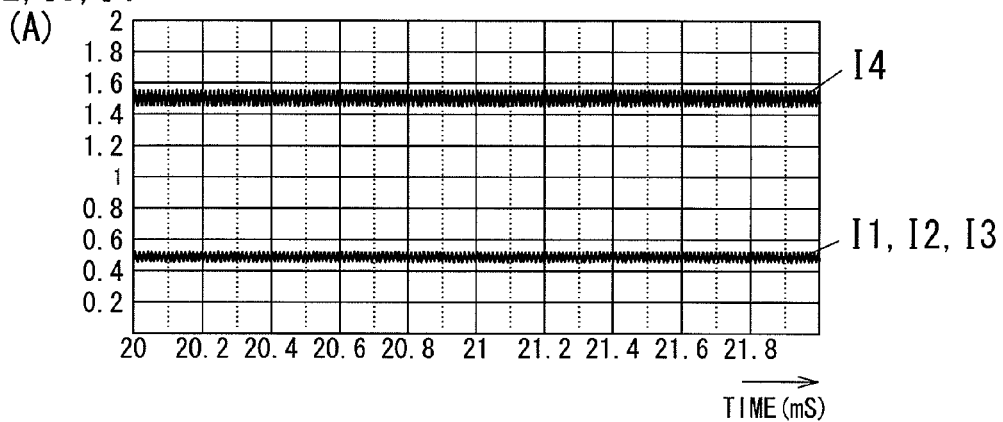
FIG. 30A is a wave form chart showing a simulation result of a load current of other circuit configuration of the illuminating light communication device of the Embodiment 15.
Figure 30B:
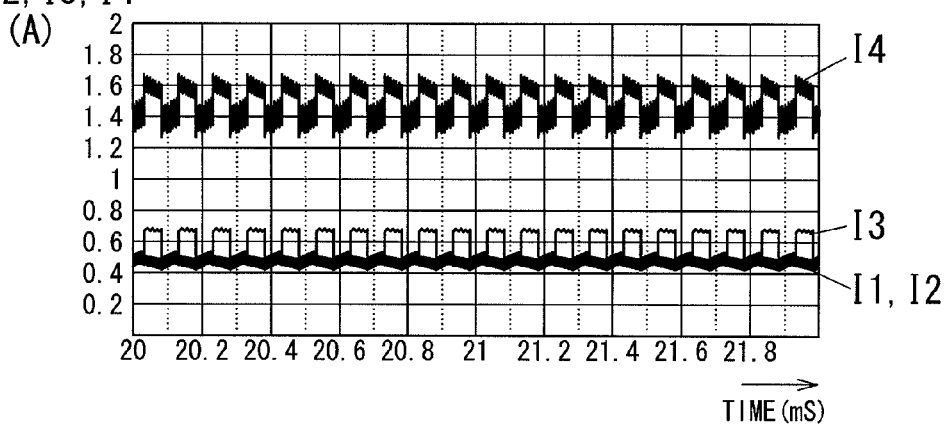
FIG. 30B is a wave form chart showing a simulation result of a load current of other circuit configuration of the illuminating light communication device of the Embodiment 15.
Figure 30C:
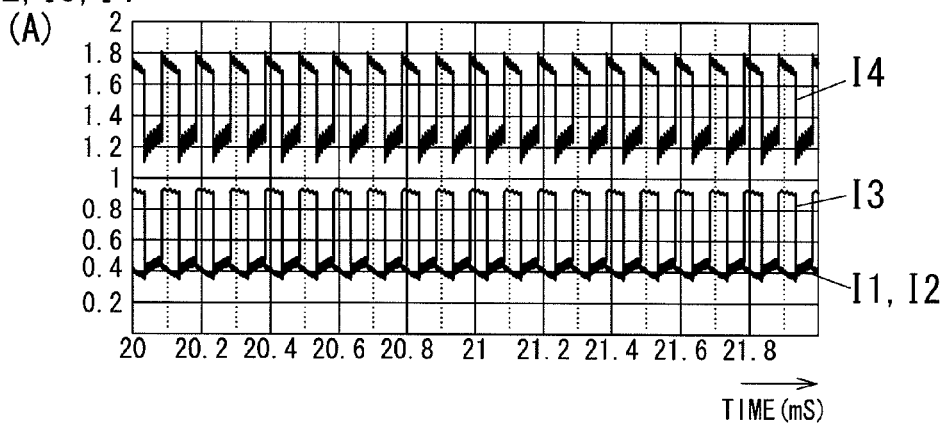
FIG. 30C is a wave form chart showing a simulation result of a load current of other circuit configuration of the illuminating light communication device of the Embodiment 15.

FIGS. 30A to 30C are wave form charts showing simulation results of load currents I1, I2, I3, which flows to the series circuits 4a, 4b, 4c, respectively, and a resultant current I4 (=I1+I2+I3) obtained by using the above-mentioned simulation circuit. FIG. 30A shows the currents I1 to I4 when the signal source 8 is stopped, and each of the load currents I1 to I3 is set to be about DC 500 [mA], and the resultant current I4 is set to be about DC 1.5 [A].

Then, FIG. 30B shows the load currents I1 to I3 and the resultant current I4, when the signal source 8 outputs a rectangular wave signal of 10 [kHz] (duty cycle is 50%) and one light emitting diode LD38 is intermitted. Here, the light emitting diodes of the series circuits 4a, 4b are not intermitted with the switch element Q2, and then the load currents I1, I2 flowing to the series circuits 4a, 4b, respectively, are generally direct currents and are not modulated. On the other hand, the light emitting diode LD38 of the series circuit 4c is intermitted with the switch element Q2, and then the load current I3 flowing to the series circuit 4c is modulated with reference to an average current (about 500 [mA]). Then, the resultant current I4, which is a sum of the load currents I1 to I3, is modulated with reference to an average value (1.5 [A]).

In addition, in the above-mentioned simulation circuit, one light emitting diode LD38 is switched on/off with the switch element Q2. In contrast, FIG. 30C is a wave form chart showing simulation result of the currents I1 to I4 when two light emitting diodes LD37, LD38 are intermitted with the switch element Q2. From this result, it is found that the modulated width can be increased with increasing the number of the light emitting diodes intermitted with the switch element Q2, as is the case with the Embodiment 14.

Embodiment 16

Figure 31:
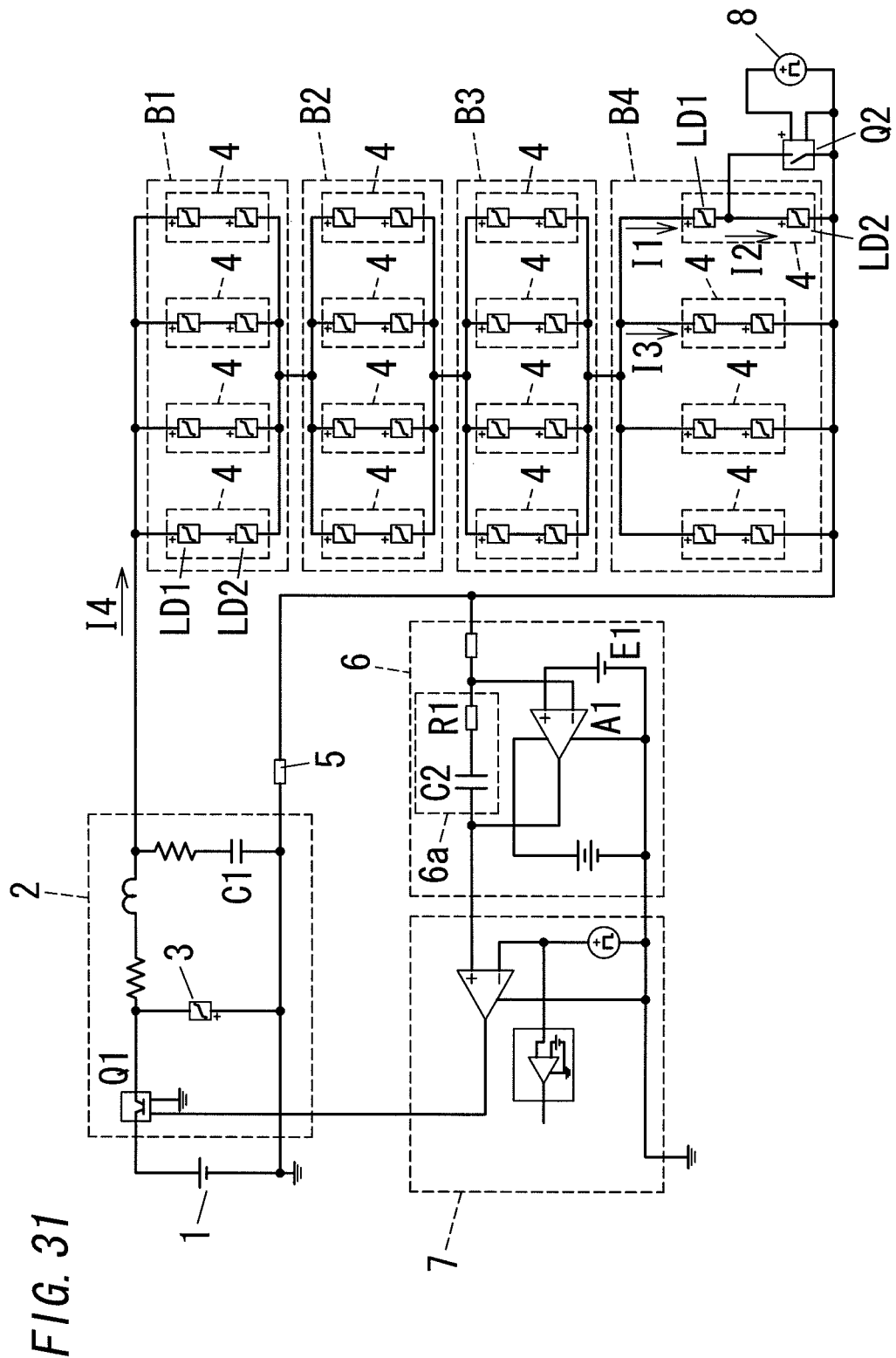
FIG. 31 is a circuit diagram for an illuminating light communication device of an Embodiment 16.

An illuminating light communication device of Embodiment 16 is explained with reference to FIG. 31, and FIGS. 32A, 32B. FIG. 31 shows a simulation circuit for inspecting a circuit operation of the present embodiment. In this circuit, four circuit blocks B1 to B4 are connected in series between outputs of a DC-DC converter 2 through a current sensing resistor 5, and each of the four circuit blocks B1 to B4 comprises a plurality of series circuits 4 (for example, four series circuits), which are connected in parallel, and each of the series circuits 4 comprises two light emitting diodes LD1, LD2 connected in series. Then, in the present circuit, a switch element Q2 is connected in parallel to a part (that is, the diode LD2) of the two light emitting diodes LD1, LD2 of one of the four series circuits 4 in the circuit block B4. The switch element Q2 is switched on/off in accordance with the optical communication signal, but in the simulation circuit of FIG. 31, a signal source 8 outputs an oscillation signal of 10 [kHz] corresponding to the optical communication signal, and the switch element is switched on/off with the signal source 8. In addition, the circuit configuration of the present embodiment is equal to that of the Embodiment 14, except for the load circuit comprising the circuit blocks B1 to B4. Thus, the same code is referred to circuit components corresponding to circuit components of the Embodiment 14, and the explanation is omitted.

Figure 32A:
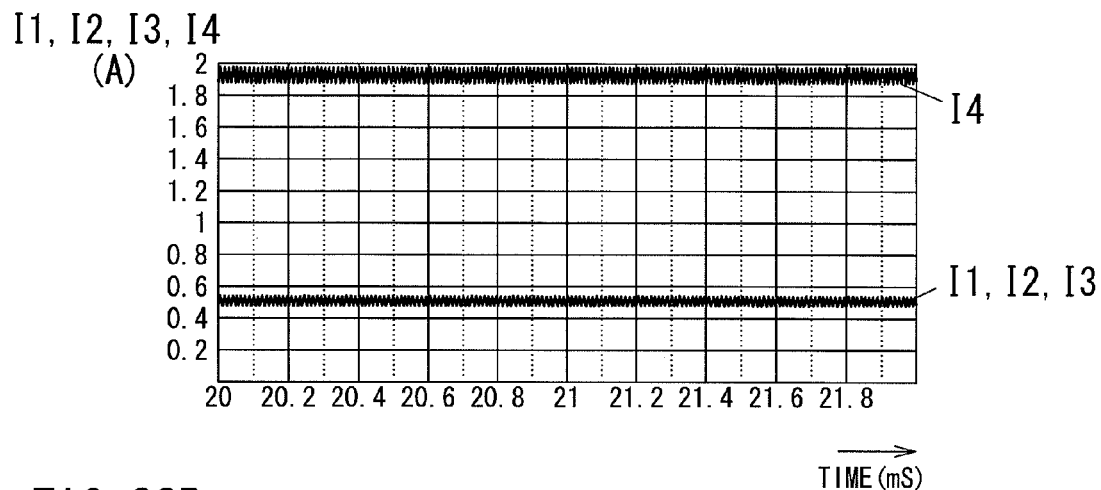
FIG. 32A is a wave form chart showing a simulation result of a load current of the illuminating light communication device of the Embodiment 16.
Figure 32B:
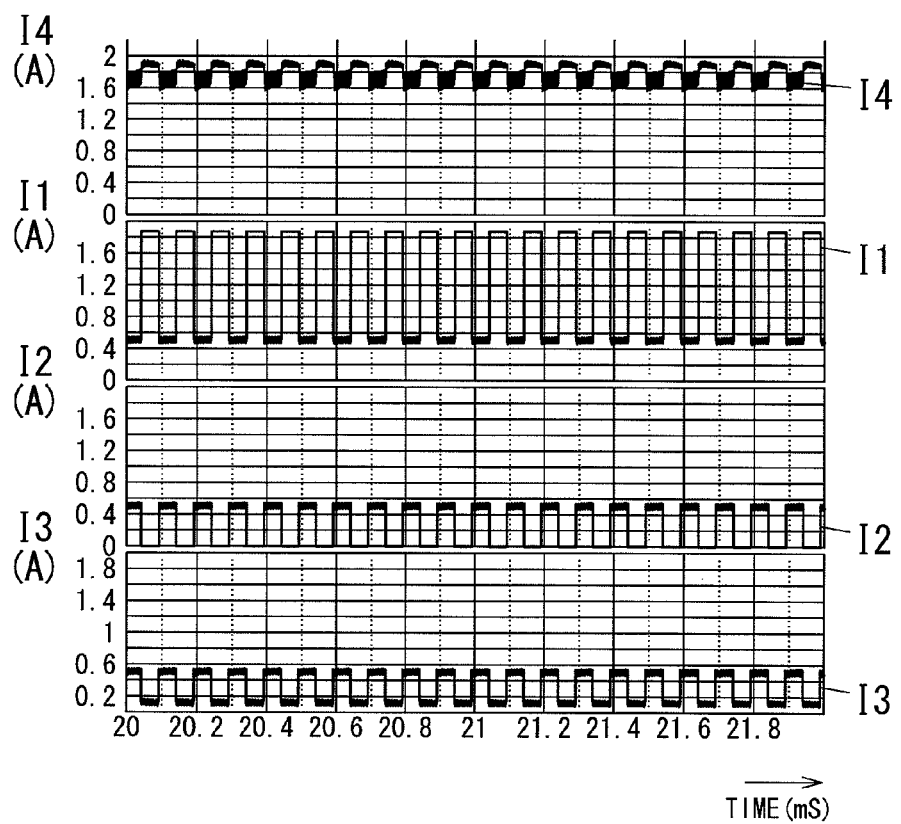
FIG. 32B is a wave form chart showing a simulation result of a load current of the illuminating light communication device of the Embodiment 16.

FIGS. 32A, 32B are wave form charts showing simulation results of currents I1 to I4, which flows to the load circuit, obtained by using the above-mentioned simulation circuit. Here, the current I2 flows to the light emitting diode LD2 connected in parallel to the switch element Q2. The current I1 flows to the light emitting diode LD1, which is connected in series to the diode LD2 connected in parallel to the switch element Q2. The current I3 flows to the other series circuit 4 in the circuit block B4, which comprises the series circuit 4 including the diode LD2 connected in parallel to the switch element Q2. The current I4 is a resultant current of all currents flowing to the load circuit.

FIG. 32A shows the currents I1 to I4 when the signal source 8 is stopped, that is, when the switch element Q2 is switched off. Each of the load currents I1 to I3 are set to be about DC 500 [mA]. The load circuit, flowing to each of four series circuits 4 in each of the circuit blocks B1 to B4, is set to be about DC 500 [mA], and thus the resultant current I4 becomes about DC 2 [A].

FIG. 32B shows the load currents I1 to I3 and the resultant current I4 when the signal source 8 outputs a rectangular wave signal of 10 [kHz] (duty cycle is 50%) and the switch element Q2 is switched on/off and thereby the above-mentioned light emitting diode LD2 is intermitted. Here, the current I2 flowing to the intermitted diode LD2 becomes about 500 [mA] when the switch element Q2 is switched off, and becomes 0 [A] when the switch element Q2 is switched on. On the other hand, the current I1, flowing to the diode LD1 connected in series to this diode LD2, becomes about 500 [mA] when the switch element Q2 is switched off, and increases by amount of change which is determined by decrease of the on-voltage when the switch element Q2 is switched on. The current I3, flowing to the other series circuit 4 in the circuit block B4, slightly decreases with increase in the current I1 when the switch element Q2 is switched on, but the resultant current I4 is modulated with reference to a current value (about 2 [A]) upon non-modulation.

In the present circuit, like each above-mentioned embodiment, the on-voltage of the load circuit decreases in accordance with on operation of the switch element Q2. Thereby, the load current increases instantly. Because this increase is not caused by a feedback system through the error amplifier A1, the load current I1 increases instantly and then good following capability can be provided to the optical communication signal. On the other hand, although the load current I1 decreases compared with a state where the load current I1 is not modulated with the optical communication signal when the switch element Q2 is switched off, this current value is controlled so that the average current becomes to be equal to the load current before modulation by averaging control in the constant current feedback circuit 6. Therefore, the circuit added for optical communication has a simple configuration, but the optical output can be faithfully modulated in accordance with the optical communication signal having a high frequency, and further the illuminating light communication device having low power loss can be provided.

In addition, in the present circuit, only one of 32 light emitting diodes is intermitted in accordance with the optical communication signal, and thereby the resultant current I4 has a low modulation degree. In contrast, if the number of the intermittently short-circuited light emitting diodes is increased, the resultant current I4 can obtain a high modulation degree. Needed modulation degree depends on sensitivity of a receiver, and if the receiver adopts a receiving system to detect a difference of illuminating light intensity, an optical modulation signal can be received even if the modulation degree is faint.

Embodiment 17

Figure 33A:
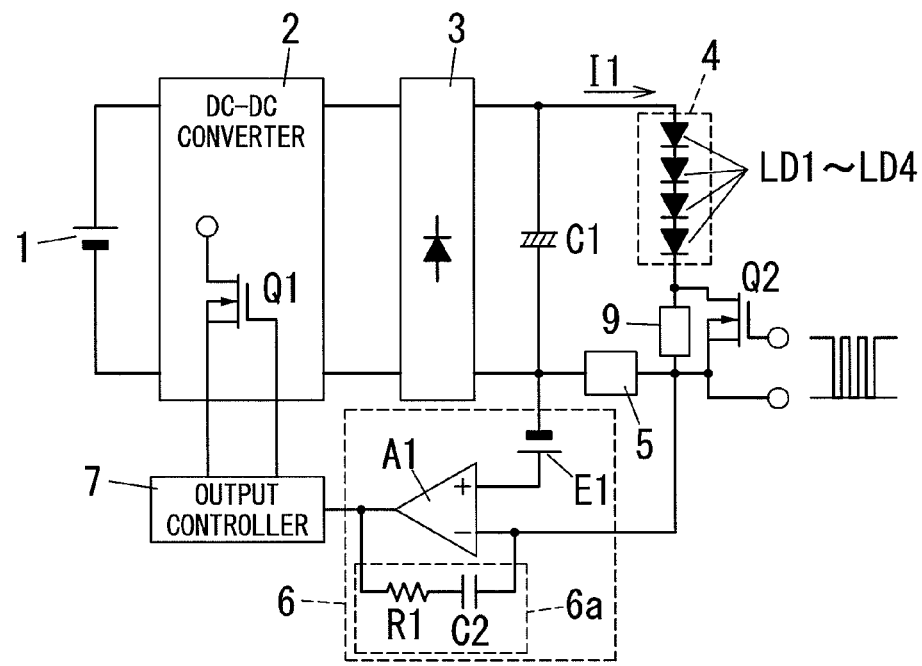
FIG. 33A is a circuit diagram for an illuminating light communication device of an Embodiment 17.

An illuminating light communication device of Embodiment 17 is explained with reference to FIGS. 33A to 33D and FIGS. 34A to 34C. FIG. 33A is a circuit diagram of the present embodiment. In the illuminating light communication device 10, a series circuit 4 and a current-limiting element 9 (a load change element) are connected in series between outputs of a DC-DC converter 2 (that is, between both ends of a smoothing capacitor C1) through a current sensing resistor 5. The series circuit 4 comprises a plurality of light emitting diodes LD1 to LD4 (for example, four diodes) connected in series. Then, a switch element Q2 is connected between both ends of the current-limiting element 9 and is switched on/off in accordance with the optical communication signal. In addition, the circuit configuration of the present embodiment is equal to that of FIG. 23A explained in the Embodiment 14, except for the load circuit comprising the light emitting diodes LD1 to LD4 and the current-limiting element 9. Thus, the same code is referred to circuit components corresponding to circuit components of the Embodiment 14, and the explanation is omitted.

Also, in the illuminating light communication device 10, the switch element Q2 is switched on/off in accordance with the optical communication signal, and thereby the current-limiting element 9 is short-circuited or opened between its both ends. Therefore, the load current I1 flowing to the light emitting diode can be modulated in accordance with the optical communication signal.

Figure 33B:
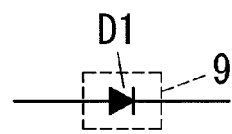
FIG. 33B is an illustration of a specific example of a current-limiting element of the Embodiment 17.
Figure 33C:
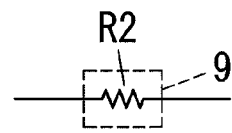
FIG. 33C is an illustration of a specific example of a current-limiting element of the Embodiment 17.
Figure 33D:
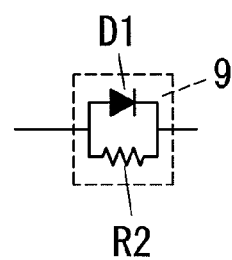
FIG. 33D is an illustration of a specific example of a current-limiting element of the Embodiment 17.

FIGS. 33B to 33D are illustrations of specific examples of current-limiting elements 9. As shown in FIG. 33B, the current-limiting element 9 may comprises a diode D1. This diode D1 is a general diode, and the number of diodes and the type of diode may be selected depending on the needed modulation degree. The diode D1 of the Embodiment 14 is a light emitting diode to irradiate with visible light, but the diode D1 may be a light emitting diode to irradiate with light (for example, infrared light), except for the visible light, and then if the diode D1 is an infrared light emitting diode, the infrared light can be received by using an infrared light receiver.

Then, FIG. 33C is an illustration of the current-limiting element 9 comprising a resistor R2, and its resistance value may be set depending on the needed modulation degree.

Then, FIG. 33D is an illustration of the current-limiting element 9 comprising a parallel circuit of a diode D1 and a resistor R2, and in some cases, the current-limiting element 9 may comprise a series circuit of the diode D1 and the resistor R2.

Figure 34A:
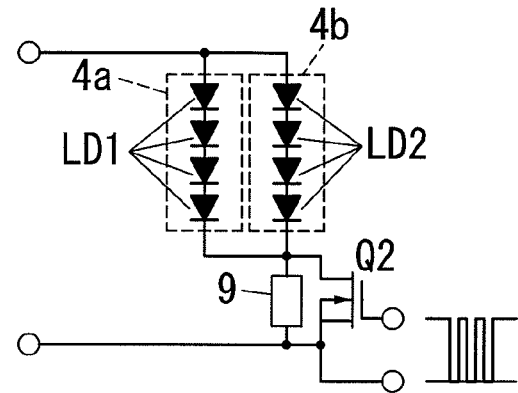
FIG. 34A is a circuit example of a load circuit of the illuminating light communication device of the Embodiment 17.
Figure 34B:
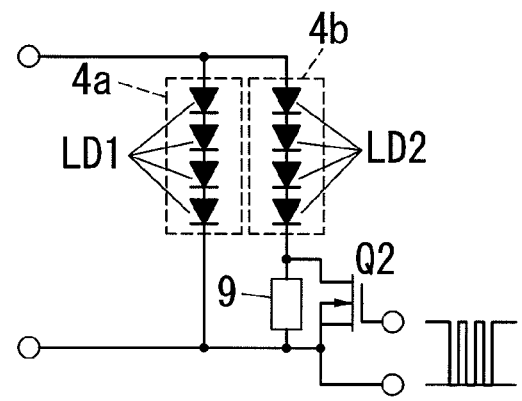
FIG. 34B is a circuit example of a load circuit of the illuminating light communication device of the Embodiment 17.
Figure 34C:
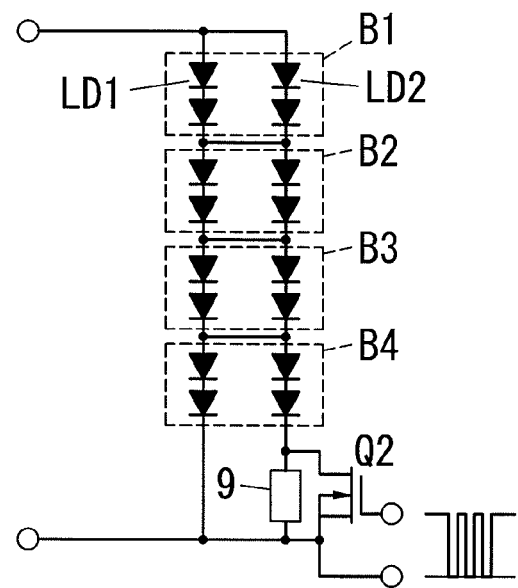
FIG. 34C is a circuit example of a load circuit of the illuminating light communication device of the Embodiment 17.

Each of FIGS. 34A, 34B is a circuit diagrams for a plurality of series circuits (for example, two circuits 4a, 4b) connected in parallel, and each of the series circuits 4a, 4b comprises a plurality of light emitting diodes connected in series (for example, four diodes). In the circuit of FIG. 34A, the current-limiting element 9 is connected to a point where the two series circuits 4a, 4b join together, and the switch element Q2 is connected in parallel to the current-limiting element 9. In the circuit of FIG. 34B, the current-limiting element 9 is connected in series to only the series circuit 4b, and the switch element Q2 is connected in parallel to the current-limiting element 9. Then, in the circuit of FIG. 34C, a plurality of circuit blocks B1 to B4 are connected in series, and each of the circuit blocks B1 to B4 comprises a plurality of series circuits (for example, two series circuits) connected in parallel, and each of series circuits comprises a plurality of light emitting diodes (for example, two diodes) connected in series. In the circuit, the current-limiting element 9 is connected in series to one series circuit of the circuit block B4, and the switch element Q2 is connected in parallel to the current-limiting element 9.

In this way, when the current-limiting element 9 is connected in series to the light emitting diode and the switch element Q2 connected in parallel to the current-limiting element 9 is switched off in accordance with the optical communication signal, voltage drop or voltage distribution is generated in the current-limiting element 9 and thereby a voltage supplied to the light emitting diodes decreases by the voltage drop or the voltage distribution and then the load current also decreases. Then, when the switch element Q2 is switched on in accordance with the optical communication signal, the voltage drop or the voltage distribution in the current-limiting element 9 disappears and then the voltage supplied to the light emitting diodes increases with increase of the load current. This increase or decrease of the voltage supplied to the diodes is caused by on/off operation of the current-limiting element 9. Then, because this increase or decrease is not caused by the feedback system (the constant current feedback circuit 6) through the error amplifier A1, the load current increases or decreases instantly and then good following capability can be provided to the optical communication signal. In addition, the load current is controlled so that the average value becomes to be equal to a value of the load current upon non-modulation by averaging control in the constant current feedback circuit 6.

Then, the current-limiting element 9 and the switch element Q2 are added to the existing LED lighting apparatus, and thereby the illuminating light communication function can be easily added. Then, the needed modulated light degree can be achieved by selecting the current-limiting element 9 having a desired characteristic, and in other words, the modulation light can be minutely adjusted in accordance with sensitivity of the receiver 20. Thus, the most suitable optical communication can be achieved.

In addition, in each of circuits of the above-mentioned Embodiments 14 to 16, instead of connecting the switch element Q2 in parallel to a part of the light emitting diodes, the current-limiting element 9 may be connected in series to the part of the diodes, and the switch element Q2 may be connected in parallel to the current-limiting element 9 and be switched on/off in accordance with the optical communication signal. In this case, like each of the circuits of the embodiments, the load current can be modulated in accordance with the optical communication signal.

Then, in the present embodiment, the plurality of light emitting diodes are not indispensable. As an extreme example, the current-limiting element 9 may be connected in series to one light emitting diode, and the switch element Q2 may be connected in parallel to the current-limiting element 9, and the current-limiting element 9 may be switched on/off with the switch element Q2.

Embodiment 18

An illuminating light communication device of Embodiment 18 is explained with reference to FIGS. 35A, 35B. FIG. 35A is a circuit diagram of the present embodiment. In the illuminating light communication device 10, several kinds of light emitting diodes LD1, LD2, LD3 (for example, by four) are connected in series between outputs of a DC-DC converter 2 (that is, between both ends of a smoothing capacitor C1) through a current sensing resistor 5. In addition, the three kinds of light emitting diodes LD1, LD2, LD3 have different emission colors (for example, three kinds of red, green, blue). The several kinds of light emitting diodes are divided into a plurality of groups (for example, first, second and third groups) by difference in the emission colors, and then a plurality of light emitting diodes in each group are connected in series. That is, the plurality of diodes LD1 belong to the first group and have the same emission colors and are connected in series. The plurality of diodes LD2 belong to the second group and have the same emission colors and are connected in series. The plurality of diodes LD3 belong to the third group, and have the same emission colors and are connected in series. Then, in the first, second and third groups, switch elements Q21, Q22, Q23 are connected in parallel to parts (for example, one diode) of the plurality of light emitting diodes LD1, LD2, LD3, respectively, and are switched on/off in accordance with individual optical communication signals S1, S2, S3, respectively. In addition, the circuit configuration of the present embodiment is equal to that of FIG. 23A explained in the Embodiment 14, except for the load circuit comprising the light emitting diodes LD1 to LD3. Thus, the same code is referred to circuit components corresponding to circuit components of the Embodiment 14, and the explanation is omitted.

Here, the switch elements Q21, Q22, Q23 are switched on/off in accordance with the optical communication signals S1, S2, S3, respectively, and the parts of the plurality of light emitting diodes LD1, LD2, LD3 are short-circuited, respectively, and thereby these optical outputs are modulated, as well as the Embodiment 14. Then, if a receiver 20 can identify color temperatures of light outputted from the illuminating light communication device 10, three kinds of signals can be received without interference. Thus, amount of transmittable information with optical communication can increases threefold in comparison with one-colored light emitting diode.

In addition, in the above-mentioned circuit, the several kinds of the plurality of light emitting diodes have different emission colors and are connected in series. In contrast, as shown in FIG. 35B, a plurality of series circuits 4a, 4b, 4c may comprise a plurality of light emitting diodes LD1, LD2, LD3 connected in series, respectively, and may be connected in parallel between outputs of the DC-DC converter 2. In this circuit, the series circuits 4a, 4b, 4c are connected in parallel between outputs of the DC-DC converter 2 through the current sensing resistor 5, and then the diodes LD1, LD2, LD3 of the series circuits 4a, 4b, 4c have different emission colors (for example, three kinds of red, green, blue), respectively, and the diodes in each series circuit are connected in series. In addition, like the circuit of FIG. 35A, the plurality of light emitting diodes LD1 belong to a first group and have the same emission colors (for example, red), and diodes LD2 belong to a second group and have the same emission colors (for example, green), and the diodes LD3 belong to a third group and have the same emission colors (for example, blue). Then, in the first, second and third groups, switch elements Q21, Q22, Q23 are connected in parallel to parts (for example, one diode) of the plurality of light emitting diodes LD1, LD2, LD3, respectively. Also, in this circuit, when the switch elements Q21, Q22, Q23 are switched on/off in accordance with individual optical communication signals S1, S2, S3, respectively, the parts of the plurality of light emitting diodes LD1, LD2, LD3 are short-circuited and thereby the optical outputs are modulated, as well as the Embodiment 14. Then, if a receiver 20 can identify color temperatures of light outputted from the illuminating light communication device 10, three kinds of signals can be received without interference. Therefore, amount of transmittable information with optical communication can increases threefold in comparison with one-colored light emitting diode. Then, in the present circuit, as explained in the Embodiment 17, the current-limiting element 9 may be connected in series to the light emitting diode and the switch element may be connected in parallel to the current-limiting element 9 and the load current may be modulated by on/off operation of the switch element.

Embodiment 19

An illuminating light communication device of Embodiment 19 is explained with reference to FIGS. 36A, 36B, FIGS. 37A to 37C, FIG. 38, and FIGS. 39A to 39C.

Figure 36A:
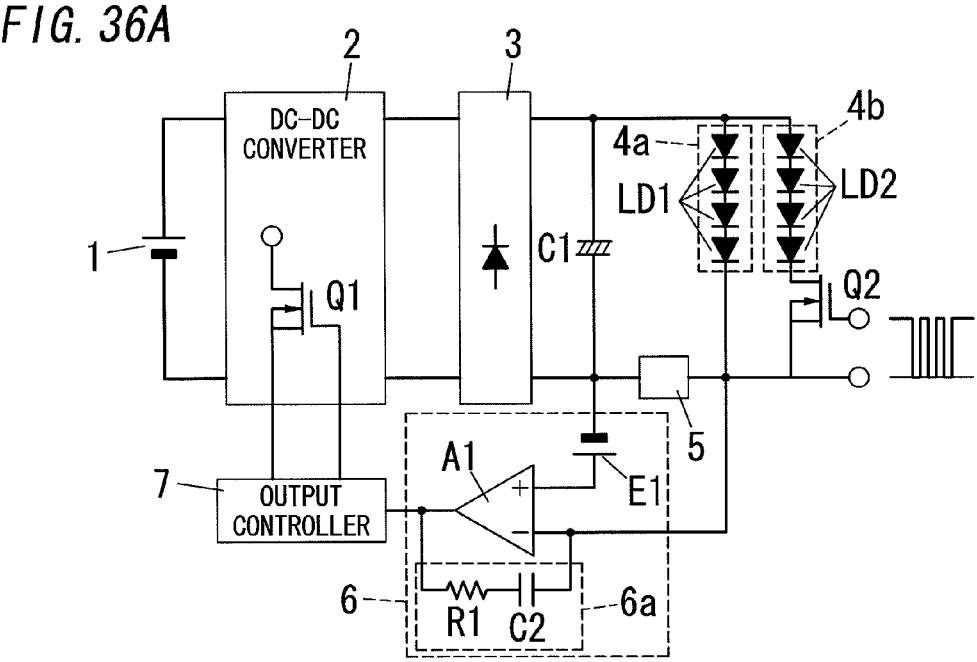
FIG. 36A is a circuit diagram for an illuminating light communication device of an Embodiment 19.

FIG. 36A is a circuit diagram of the present embodiment. In the illuminating light communication device 10, a plurality of series circuits 4a, 4b (for example, two series circuits) are connected in parallel between outputs of a DC-DC converter 2 through a current sensing resistor 5, and comprise a plurality of light emitting diodes LD1, LD2 connected in series, respectively. Then, a switch element Q2 is connected in series to the light emitting diodes LD2 of the series circuit 4b and is switched on/off in accordance with the optical communication signal. In addition, the circuit configuration of the present embodiment is equal to that of FIG. 23A explained in the Embodiment 14, except for the load circuit comprising the light emitting diodes LD1, LD2. Thus, the same code is referred to circuit components corresponding to circuit components of the Embodiment 14, and the explanation is omitted.

Figure 36B:
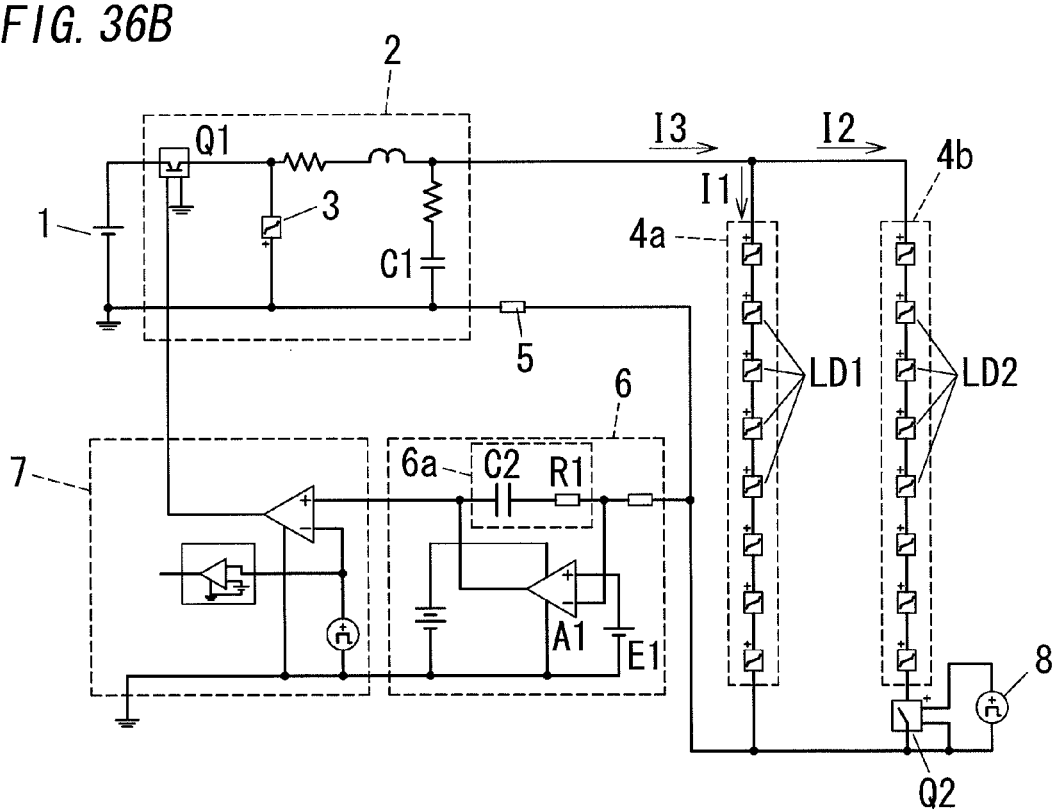
FIG. 36B is a circuit diagram modeled for simulation of the illuminating light communication device of the Embodiment 19.

FIG. 36B shows a simulation circuit for inspecting an operation of the circuit shown in FIG. 36A. In this circuit, a step-down chopper circuit is used as the DC-DC converter 2. Then, the series circuits 4a, 4b are connected in parallel between outputs of the DC-DC converter 2 through the current sensing resistor 5, and comprise eight diodes LD1 connected in series and eight diodes LD2 connected in series, respectively. The switch element Q2 is connected in series to the diodes LD2, and is switched on/off with the signal source 8 outputting the oscillation signal of 10 [kHz] corresponding to the optical communication signal.

Figure 37A:
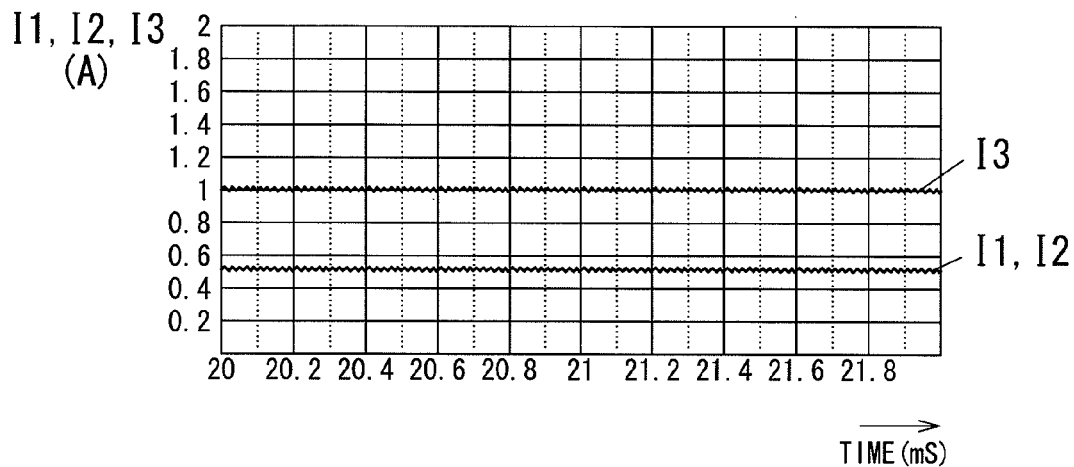
FIG. 37A is a wave form chart showing a simulation result of a load current of the illuminating light communication device of the Embodiment 19.
Figure 37B:
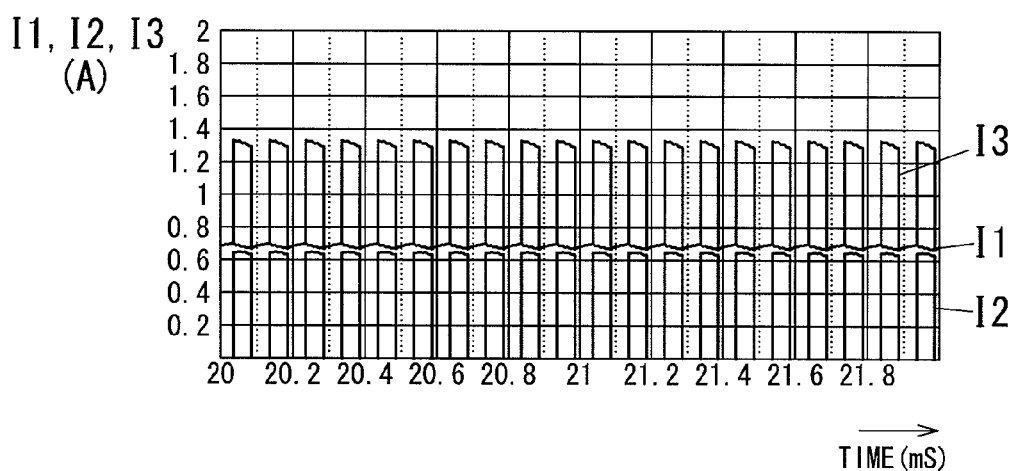
FIG. 37B is a wave form chart showing a simulation result of a load current of the illuminating light communication device of the Embodiment 19.

FIGS. 37A, 37B are wave form charts showing simulation results of load currents I1, I2, I3 obtained by using the above-mentioned simulation circuit. In addition, the load current I1 flows to the series circuit 4a comprising the light emitting diodes LD1, and the load current I2 flows to the series circuit 4b comprising the light emitting diodes LD2, and the load current I3 is a resultant current of the load currents I1, I2.

FIG. 37A shows the currents I1 to I3 when the signal source 8 is stopped (the switch is switched on), and each of the currents I1, I2 is set to be about DC 500 [mA], and the resultant current I3 is set to be about DC 1 [A].

Figure 37C:
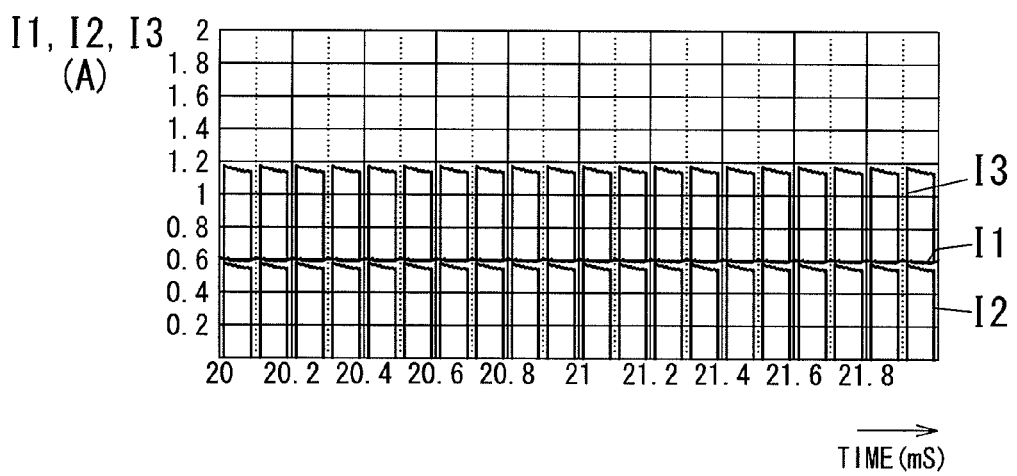
FIG. 37C is a wave form chart showing a simulation result of a load current of the illuminating light communication device of the Embodiment 19.

FIG. 37B shows the currents I1 to I3 when the signal source 8 outputs a rectangular wave signal of 10 [kHz] (the duty cycle is 50%) and the series circuit 4b comprising the diode LD2 is intermitted. Here, the series circuit 4a is not connected to the switch element Q2, and the current I1 flowing to the series circuit 4a becomes about DC 700 [mA]. On the other hand, the series circuit 4b is connected to the switch element Q2, and the current I2 flowing to the series circuit 4b becomes a rectangular wave current having a peak value of about 700 [mA] and a bottom value of 0 [A]. Therefore, the resultant current I3 is oscillated to plus and minus with oscillation of about 300 [mA] with reference to an average value (1 [A]). Then, FIG. 37C shows the current I1 to I3 when the rectangular wave signal is outputted from the signal source 8 and its duty cycle is 75%. If the duty cycle is set to be more than 50%, the peak value of the resultant current I3 can be decreased compared with a state where the duty cycle is set to be 50% while the average current being kept constant.

Figure 38:
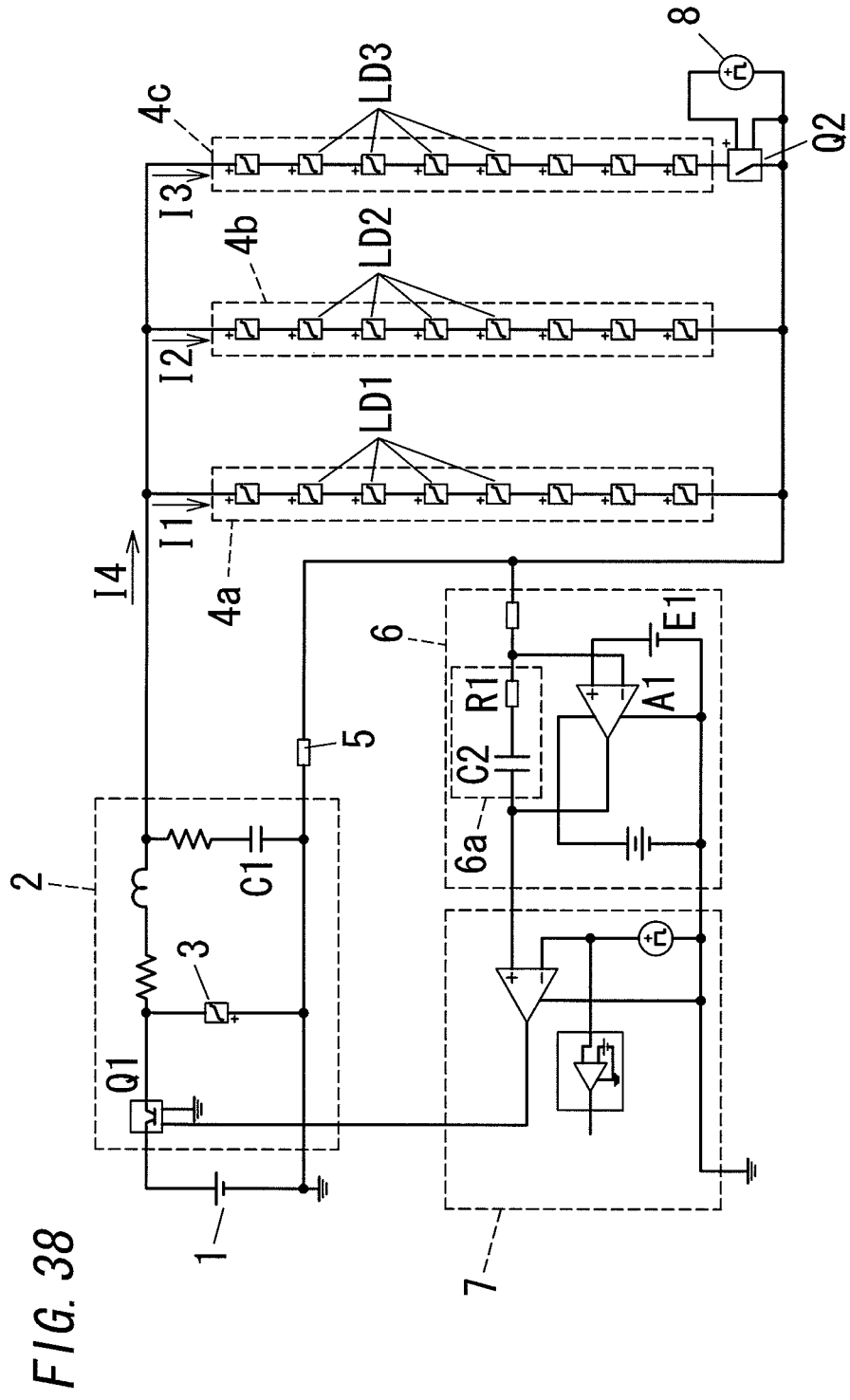
FIG. 38 is a circuit diagram showing other circuit configuration of the illuminating light communication device of the Embodiment 19.

By the way, in the circuits of FIGS. 36A, 36B, the two series circuits 4a, 4b are connected in parallel between outputs of the DC-DC converter 2, but the number of the series circuits is not limited to two. As shown in FIG. 38, for example, three series circuits 4a, 4b, 4c may be connected in parallel between outputs of the DC-DC converter 2, and may comprise eight light emitting diodes LD1, LD2, LD3 connected in series, respectively. In this circuit, the switch element Q2 is connected in series to the series circuit 4c comprising the eight light emitting diodes LD3, and is switched on/off in accordance with the optical communication signal.

Figure 39A:
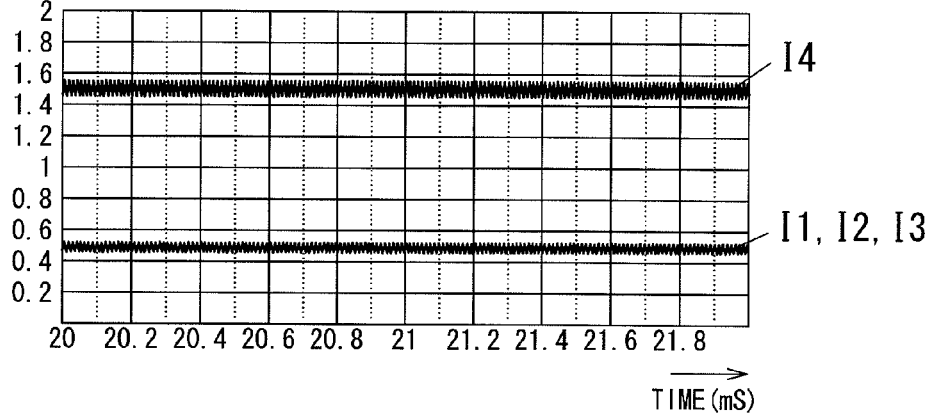
FIG. 39A is a wave form chart showing a simulation result of a load current of the illuminating light communication device of the Embodiment 19.
Figure 39B:
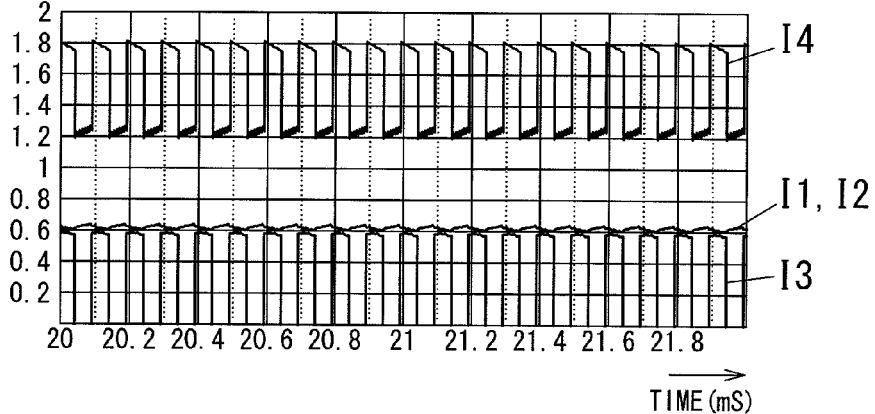
FIG. 39B is a wave form chart showing a simulation result of a load current of the illuminating light communication device of the Embodiment 19.
Figure 39C:
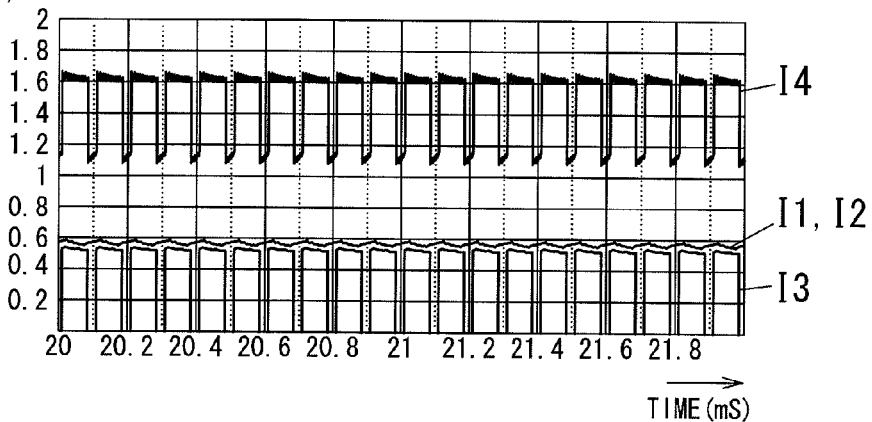
FIG. 39C is a wave form chart showing a simulation result of a load current of the illuminating light communication device of the Embodiment 19.

Here, FIGS. 39A to 39C are wave form charts showing simulation results of load currents I1, I2, I3 flowing to the series circuits 4a, 4b, 4c, respectively, and the resultant current I4.

FIG. 39A shows the currents I1 to I4 when the signal source 8 is stopped (the switch element Q2 is switched on), and each of the load currents I1, I2, I3 is set to be about DC 500 [mA], and the resultant current I4 is set to be about DC 1.5 [A].

Then, FIG. 39B shows the currents I1 to I4 when the signal source 8 outputs a rectangular wave signal of 10 [kHz] (the duty cycle is 50%) and the switch element Q2 intermits the series circuit 4c comprising the light emitting diodes LD3. Here, the series circuits 4a, 4b are not connected to the switch element Q2, and each of the current I1, I2 flowing to the series circuits 4a, 4b, respectively, becomes about DC 600 [mA]. On the other hand, the series circuit 4c is connected to the switch element Q2, and the current I3 flowing to the series circuit 4c becomes a rectangular wave current having a peak value of about 600 [mA] and a bottom value of 0 [A]. Therefore, the resultant current I4 is oscillated to plus and minus with oscillation of about 300 [mA] with reference to an average value (1.5 [A]). Then, FIG. 39C shows the currents I1 to I4 when the rectangular wave signal is outputted from the signal source 8 and its duty cycle is 75%. In this case, the current I3 flowing to the series circuit 4c becomes a rectangular wave current having a peak value of about 550 [mA] and a bottom value of 0 [A]. Although the resultant current I4 becomes the modulation signal with reference to an average value (about 1.5 [A]), the peak value of the current I3 is inhibited and thereby the peak value of the resultant current I4 is also inhibited to about 1.65 [A]. In this way, if the duty cycle is set to be more than 50%, the peak value of the resultant current I4 can be decreased compared with a state where the duty cycle is set to be 50% while the average current being kept constant.

In addition, when more than three circuits comprising the diodes are connected in parallel between outputs of the DC-DC converter 2, the switch element Q2 may be connected to a point where, except for one circuit, the other circuits are lumped together. In this case, the switch element Q2 is switched on/off in accordance with the optical communication signal, and thereby the other circuits are intermittently switched on/off and the load current can be modulated.

As explained above, in the present embodiment, the plurality of light emitting diodes are connected in parallel between outputs of the DC-DC converter 2 and the switch element Q2 is connected in series to a part of the plurality of light emitting diodes. Then, the present embodiment is based on the premise that the plurality of light emitting diodes are connected in parallel. Hereinafter, the reason is discussed.

Figure 40:
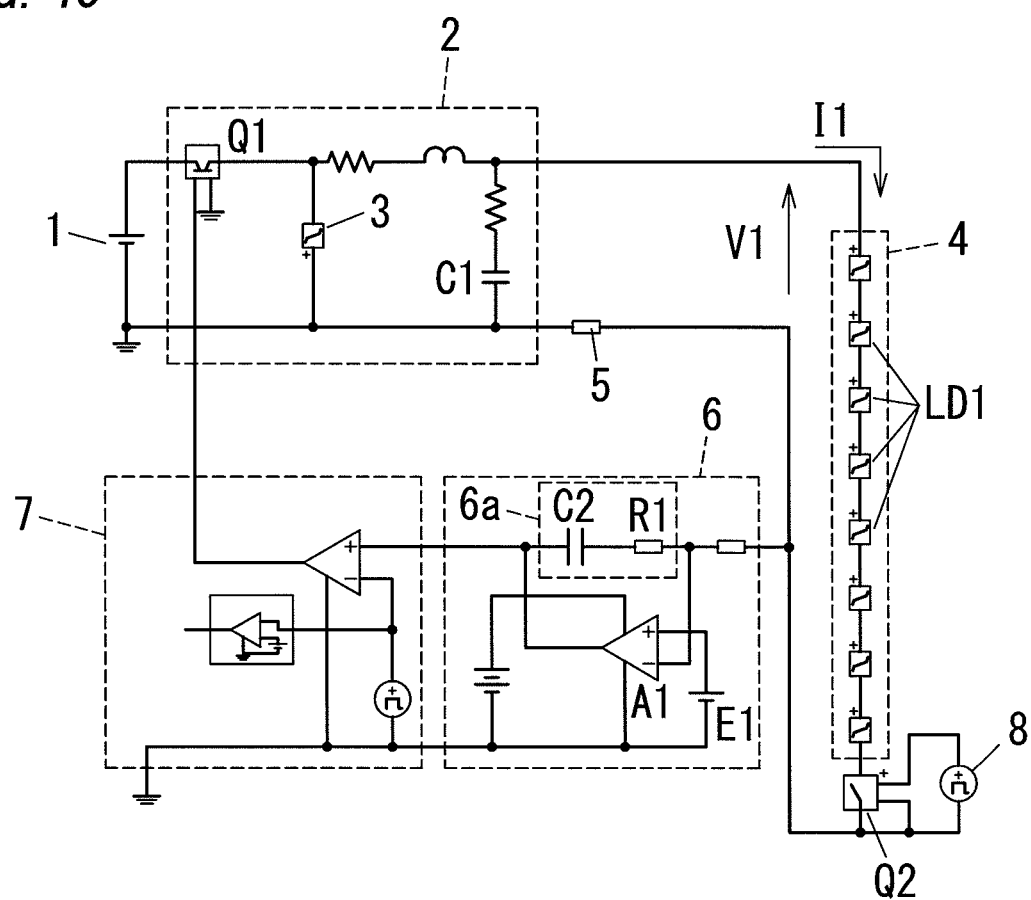
FIG. 40 is a circuit diagram for a comparative example of the illuminating light communication device of the Embodiment 19.
Figure 41A:
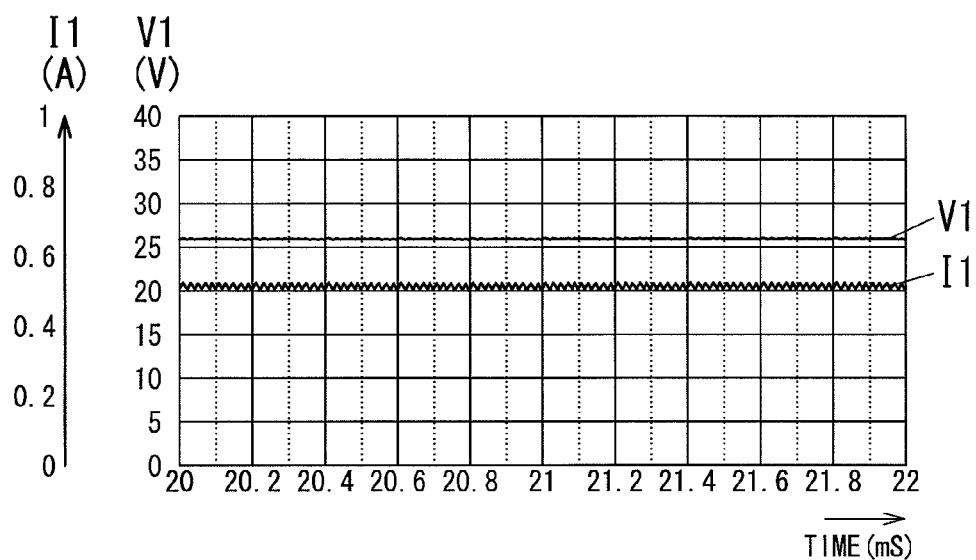
FIG. 41A is a wave form chart showing a simulation result of a load current of the illuminating light communication device of the Embodiment 19.
Figure 41B:
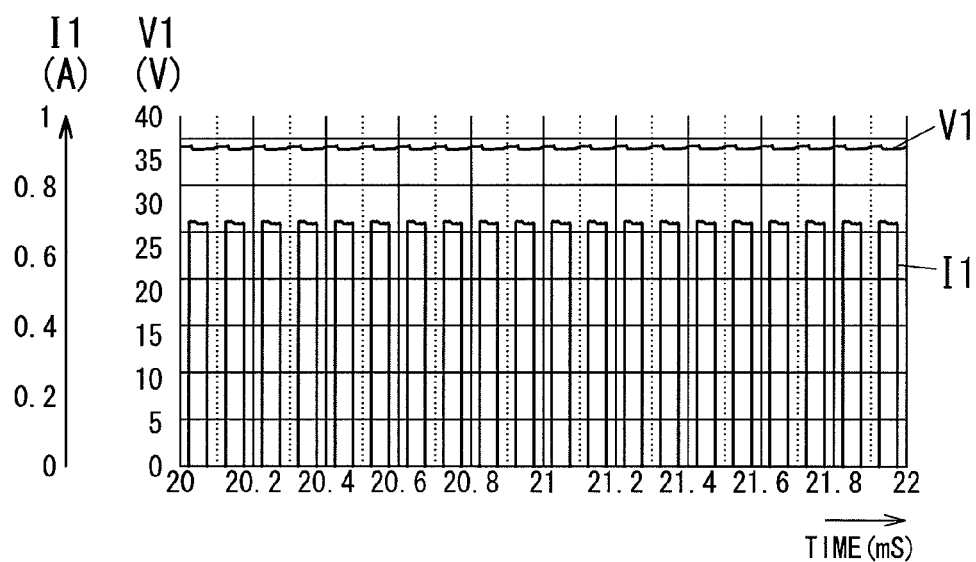
FIG. 41B is a wave form chart showing a simulation result of a load current of the illuminating light communication device of the Embodiment 19.

As shown in FIG. 40, a plurality of light emitting diodes LD1 are connected in series between outputs of the DC-DC converter 2, and a switch element Q2 is connected in series the plurality of light emitting diodes. Then, FIGS. 41A, 41B show simulation results of the load current of the circuit shown in FIG. 40. FIG. 41A shows a load current I1 and an output voltage V1 of the DC-DC converter 2 when the signal source 8 is stopped (the switch element Q2 is switched on), and then the current I1 is about DC 500 [mA], and the output voltage V1 is about DC 26 [V].

On the other hand, FIG. 41B shows the current I1 and the output voltage V1 when the signal source 8 outputs a rectangular wave signal of 10 [kHz] (the duty cycle is 50%) and the series circuit 4 comprising light emitting diodes LD1 is intermitted with the switch element Q2. In this simulation result, a peak value of the current I1 is about 6.5 [A], and the output voltage V1 is about 140 [V], and thus the circuit is not suitable for practical use. The output voltage V1 is controlled in accordance with an average value of the load current I1 by averaging control of a constant current. Therefore, in a case where the load current I1 is interrupted, the DC-DC converter 2 outputs the highest voltage and the above phenomenon is caused by this, unless a feedback function or a protection function of the output voltage V1 is added. Thus, it is necessary to avoid an unloaded condition that the load circuit is completely interrupted.

From such a point of view, when a plurality of circuits comprises a plurality of light emitting diodes and are connected in parallel and only a part of the circuits is intermittently switched on/off with a high-speed, the load current I1 can be suitably modulated, and the reason is explained as below. That is, when the part of the circuits is switched off, a load of the DC-DC converter 2 is reduced, and then if the constant current control of the DC-DC converter 2 is normally performed, a feedback control should be performed so as to increase the load current flowing to the light emitting diodes. However, when the part of the circuits is switched on/off with a high speed, such as 10 [kHz], a gain of the error amplifier A1 can not be obtained by the PI control of the constant current feedback circuit 6. As a result, the load current I1 decreases and the output voltage V1 increases. Next, when the switch element Q2 is switched on, the load current increases by increase of the output voltage V1 during the above-mentioned off-period of the part of the circuits. However, when a time axis is extended, the averaging control of the constant current is performed and the average value of the load current is controlled to be a predetermined current value (a target value).

In this way, when the switch element Q2 is switched on/off with a high frequency of about 10 [kHz] and thereby the part of the circuits is switched off, the feedback control of the constant current feedback circuit 6 does not function due to the high frequency domain. Thus, the load current is determined by only increase and decrease of the number of the light emitting diodes, and the load current can be modulated at an extremely-high speed. Therefore, in the illuminating light communication device, a circuit added for communication has a simple configuration, but an outputted light can be faithfully modulated in accordance with an optical communication signal having a high frequency. In addition, the illuminating light communication device having low power loss can be provided.

In addition, in the present embodiment, it is not necessary that a plurality of light emitting diodes are connected in series. For example, each of a plurality of circuits may comprise one light emitting diode, and the plurality of circuits may be connected in parallel, and the switch element Q2 may be connected in series to one of the circuits.

Embodiment 20

An illuminating light communication device of Embodiment 20 is explained with reference to FIG. 42.

Figure 42:
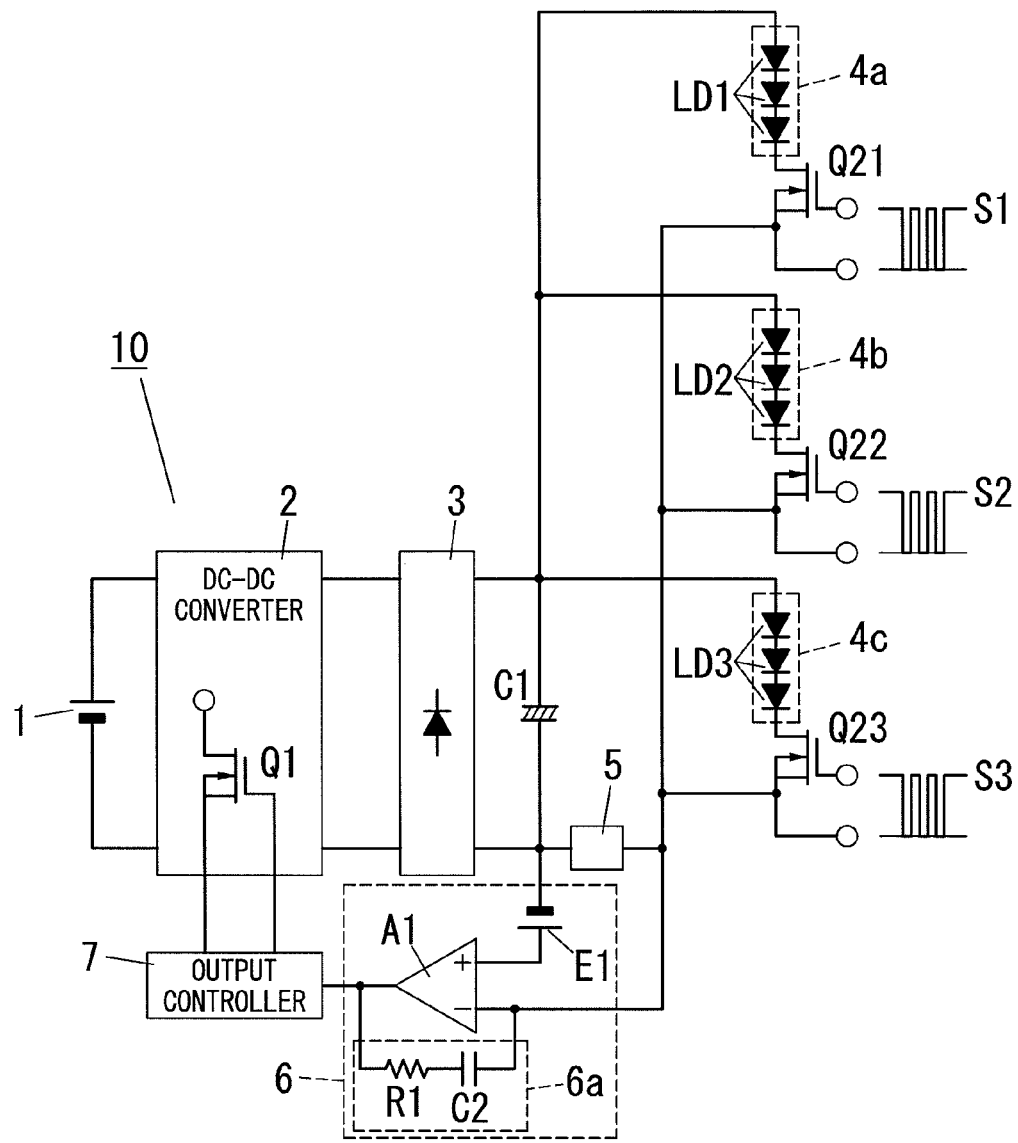
FIG. 42 is a circuit diagram for an illuminating light communication device of an Embodiment 20.

FIG. 42 is a circuit diagram for an illuminating light communication device 10 of the present embodiment. In the device 10, a plurality of series circuits 4a, 4b, 4c are connected in parallel between outputs of a DC-DC converter 2 through a current sensing resistor 5. The series circuits 4a, 4b, 4c comprise several kinds (for example, three kinds) of light emitting diodes LD1, LD2, LD3 having different emission colors, respectively, and three light emitting diodes in each series circuit are connected in series. Then, switch elements Q21, Q22, Q23 are connected in series to the series circuits 4a, 4b, 4c, respectively, and are switched on/off in accordance with individual optical communication signals S1, S2, S3, respectively. The switch elements Q21, Q22, Q23 are controlled not to be switched off at the same time. In addition, the circuit configuration of the present embodiment is equal to that of FIG. 23A explained in the Embodiment 14, except for the load circuit comprising the light emitting diodes LD1, LD2, LD3. Thus, the same code is referred to circuit components corresponding to circuit components of the Embodiment 14, and the explanation is omitted.

In the present embodiment, when the switch elements Q21, Q22, Q23 are switched on/off in accordance with the optical communication signals S1, S2, S3, respectively, the light emitting diodes LD1, LD2, LD3 are intermittently switched on/off and thereby the optical output can be modulated, as well as the above Embodiment 14. Then, if a receiver 20 can identify color temperatures of light outputted from the illuminating light communication device 10, three kinds of signals can be received without interference. Thus, amount of transmittable information with optical communication can increase threefold in comparison with one-colored light emitting diode. In addition, in this case, it is necessary that the switch elements Q21, Q22, Q23 are controlled so that all series circuit 4a, 4b, 4c are not switched off at the same time and so that unloaded condition is not generated.

In addition, in the present embodiment, it is not necessary that three light emitting diodes in each series circuit are connected in series, and as an extreme example, each series circuit may comprise one light emitting diode.

Embodiment 21

An illuminating light communication device of Embodiment 21 is explained with reference to FIGS. 43A to 43D. In the above-mentioned illuminating light communication device, the switch element Q2 is connected in parallel or in series to the light emitting diode, and is switched on/off in accordance with the optical communication signal, and thereby the load current is modulated and the optical output can be modulated. Thus, it is thought that the switch element Q2 is added to the existing LED light apparatus and thereby the optical communication function can be easily added. In addition, for safety, it is desirable that a circuit for lighting is electrically insulated from a circuit for generating the optical communication signal.

Figures 43A, 43B, 43C, 43D:
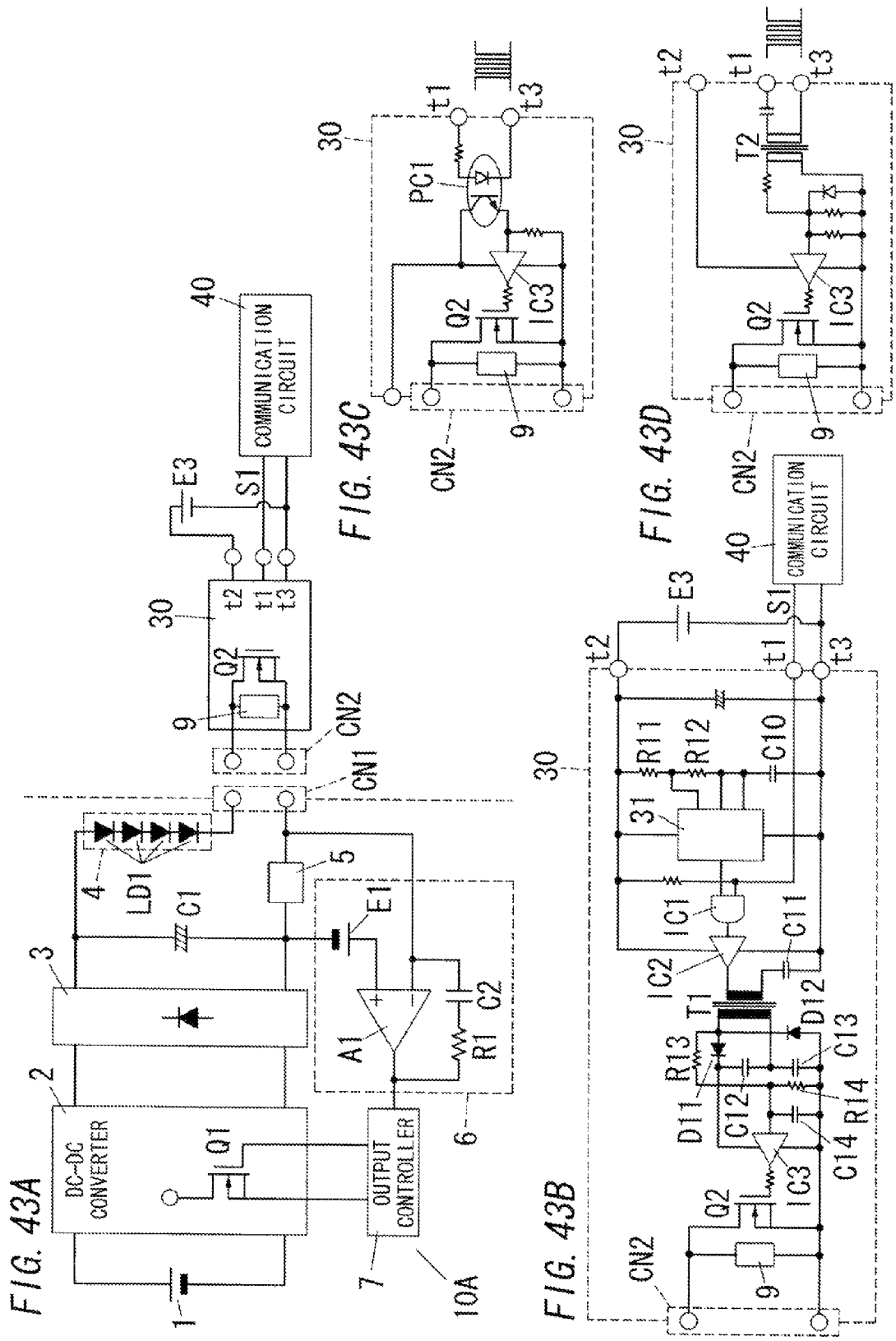
FIG. 43A is a circuit diagram for an illuminating light communication device of an Embodiment 21.
FIG. 43B is a circuit diagram for the illuminating light communication device of the Embodiment 21.
FIG. 43C is a circuit diagram for the illuminating light communication device of the Embodiment 21.
FIG. 43D is a circuit diagram for the illuminating light communication device of the Embodiment 21.
Figure 46A:
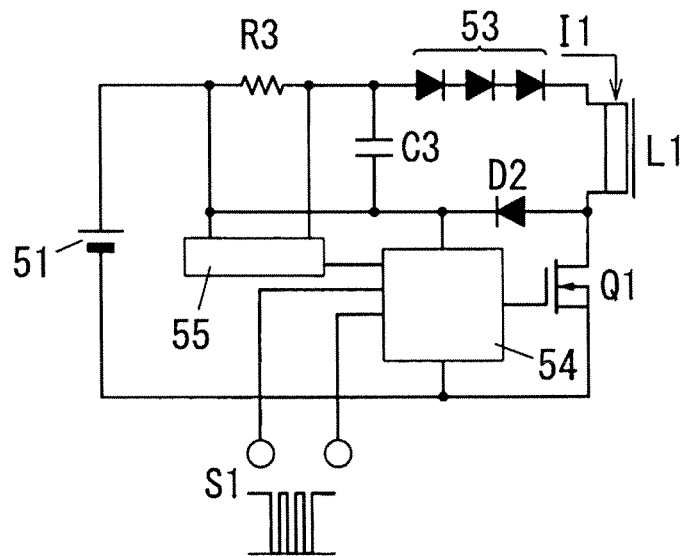
FIG. 46A is a circuit diagram for another conventional illuminating light communication device.
Figure 46B:
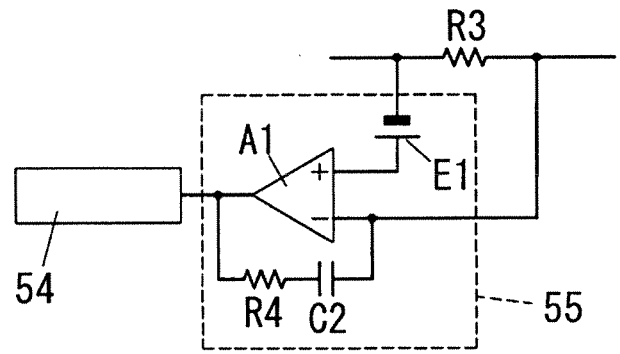
FIG. 46B is a circuit diagram for another conventional illuminating light communication device.
Figure 46C:
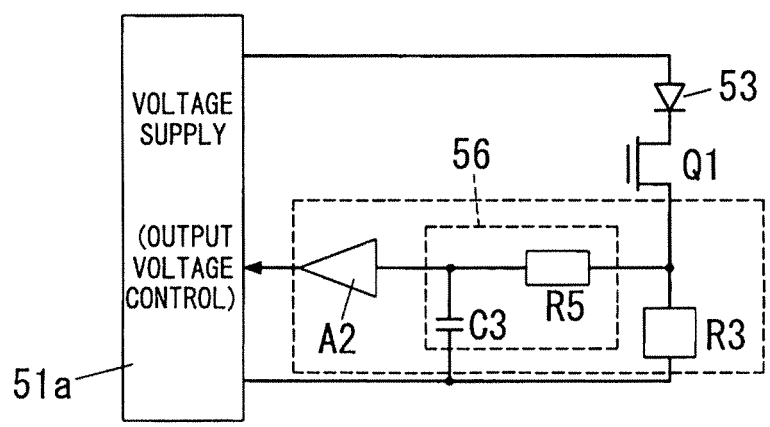
FIG. 46C is a circuit diagram for another conventional illuminating light communication device.
Figure 49A:
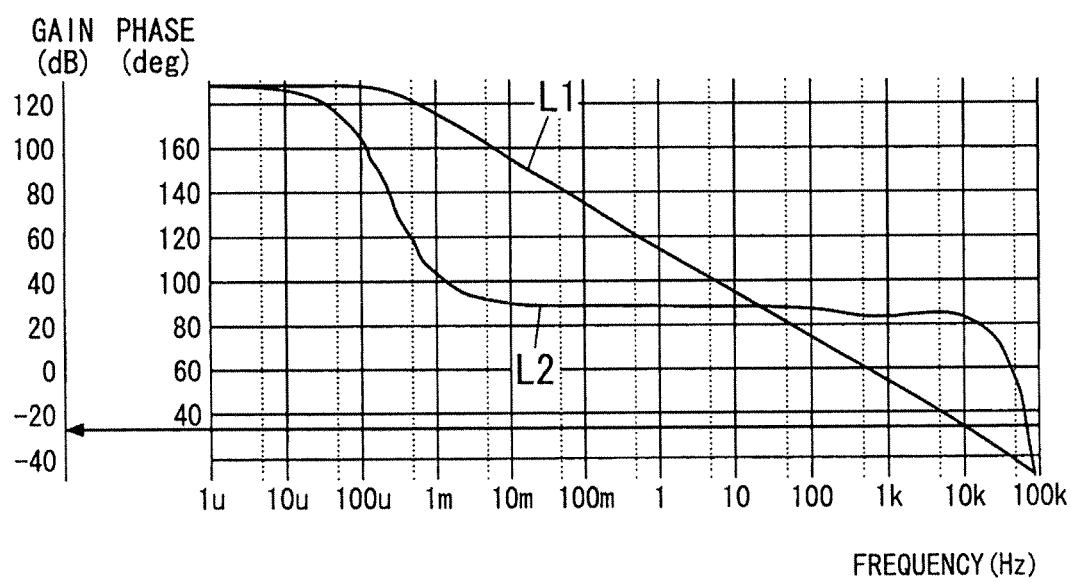
FIG. 49A is Bode diagram for the yet another conventional illuminating light communication device.
Figure 49B:
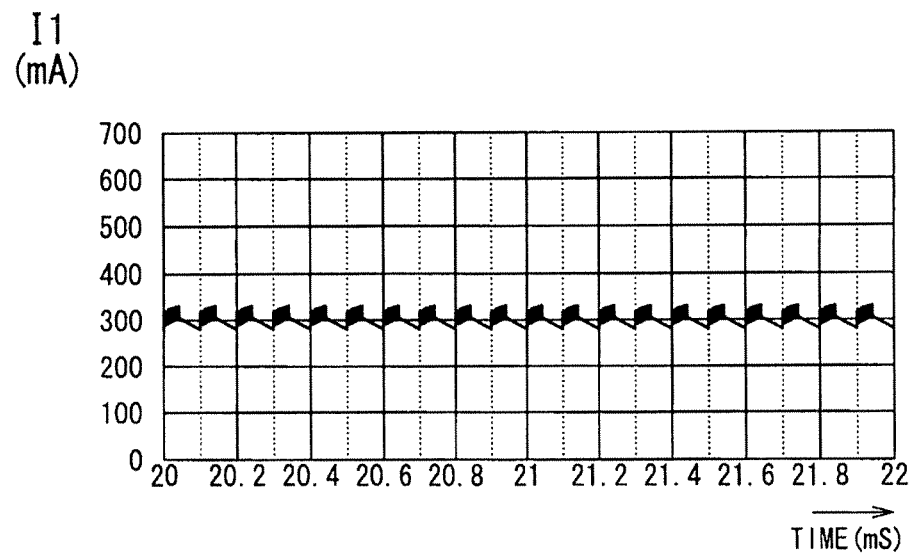
FIG. 49B is a wave form chart showing a load current of the yet another conventional illuminating light communication device.
Figure 50:
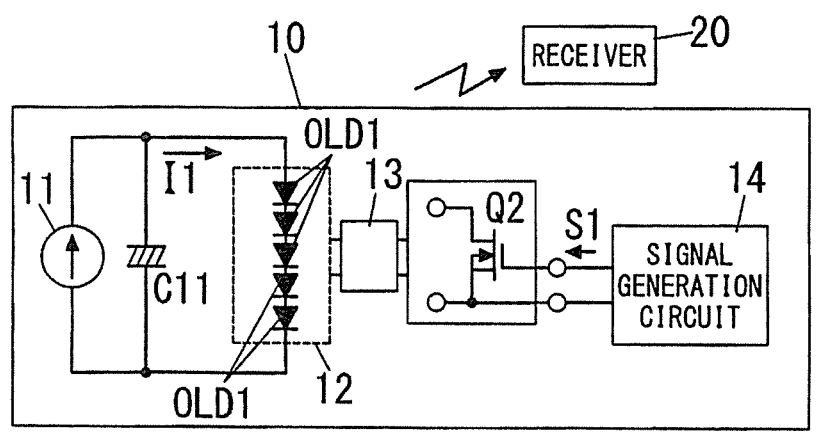
FIG. 50 is a circuit diagram for an illuminating light communication device using an organic LED.

FIG. 43A is a circuit diagram for an illuminating light communication device which is provided by addition of a communication unit 30 to the existing light apparatus 10A. In addition, the same code is referred to circuit components corresponding to circuit components of the illuminating light communication device 10 shown in FIG. 23A, and the explanation is omitted.

The light apparatus 10A comprises a connector CN1 to which the communication unit 30 is connected, and then the connector CN1 is located between outputs of a DC-DC converter 2. Then, a plurality of light emitting diodes LD1 (for example, four diodes) are connected in series between the connector CN1 and an output of a high-voltage side of the DC-DC converter 2 (that is, a high-voltage side of a smoothing capacitor C1). Then, a current sensing resistor 5 is connected in series between the connector CN1 and an output of a low-voltage side of the DC-DC converter 2 (that is, a low-voltage side of the smoothing capacitor C1).

FIG. 43B shows a specific circuit diagram of the communication unit 30. This communication unit 30 comprises a connector CN2 detachably connected to the connector CN1. Then, the current-limiting element 9, explained in the Embodiment 17, and the switch element Q2 are connected in parallel between terminals of the connector CN2. In this communication unit 30, the switch element Q2 is switched on/off in accordance with the optical communication signal S1 inputted from an external communication circuit 40 to an input terminal t1. Then, the communication circuit 40 is electrically insulated from the light apparatus 10A through a transformer T1 built into the communication unit 30. In the present circuit, an IC for timer 31 (for example, LMC555 of National Semiconductor Corp.), resistors R11, R12, and a capacitor C10 constitutes an astable multi-vibrator. The astable multi-vibrator oscillates with a frequency (for example, 1 [MHz]) being higher enough than a frequency of the optical communication signal S1. An output signal from the IC for timer 31 is inputted to one input terminal of an AND gate IC1. The optical communication signal S1 is inputted to the other input terminal of the AND gate IC1, and then a logical sum of the optical communication signal S1 and the output signal from the IC for timer 31 is inputted to a buffer IC2, and then a primary winding of the insulating transformer T1 is excited through a coupling capacitor C11. Then, a carrier frequency of 1 [MHz] is modulated with the optical communication signal S1 of 9.6 [kHz], and thereby a high frequency voltage is evoked in a secondary winding of the insulating transformer T1, and is rectified and smoothed by a voltage double rectifier circuit having diodes D11, D12 and capacitors C12, C13. The power of a buffer IC3 for driving a gate of the switch element Q2 is generated by an output voltage of the voltage double rectifier circuit. The voltage evoked in the secondary winding of the insulating transformer T1 is divided and shaped in resistors R13, R14 and a capacitor C14, and then is inputted to the buffer IC3. The frequency component of 1 [MHz] is removed by this waveform shaping and thereby the optical communication signal S1 is reproduced. Then, the gate of the switch element Q2, being a power MOSFET, is driven. In addition, it is also thought that the insulating transformer T1 is driven by only the optical communication signal S1 and the switch element Q2 is directly driven by the output of the insulating transformer T1. In this case, the communication unit 30 requires upsizing of the insulating transformer T1 and a device to obtain a drive waveform which is faithful to the optical communication signal S1.

By the way, in the above-mentioned circuit, the communication unit 30 is applied to the circuit shown in FIG. 23A. In contrast, the communication unit 30 may be applied to the illuminating light communication devices in the above-mentioned Embodiments 14 to 18. In such a case, one of current-limiting elements 9 shown in FIGS. 33B to 33D may be built into the communication unit 30, and the current-limiting element 9 may be connected in parallel to the switch element Q2. Also, the communication unit 30 of the present embodiment may be applied to the illuminating light communication devices of the Embodiments 19, 20, and in this case, it is not necessary that the current-limiting element 9 is connected in parallel to the switch element Q2.

In this way, the current-limiting element 9 and the switch element Q2 are built into the communication unit 30. Then, the communication unit 30 is connected to the load circuit 4 through the connectors CN1 and CN2 of mechanism elements for connection Thereby, when the optical communication function is added to the existing light apparatus 10A without the optical communication function, it is not necessary to add something special to the existing light apparatus 10A, except for installation of the connector CN1.

Then, the switch element Q2 is electrically insulated from the communication circuit 40 generating the optical communication signal S1 through the insulating transformer T1, and thereby the insulation between the communication circuit 40 and the light apparatus 10A can be secured. In addition, the power for driving the switch element Q2 is supplied from the communication circuit 40 through the insulating transformer T1, being the insulation. Thus, it is not necessary to add something special, such as the power for driving the switch element Q2 is located in the existing light apparatus 10A.

In addition, FIG. 43C shows another circuit example of the communication unit 30, and the circuit is configured to communicate the optical communication signal S1 inputted from the outside into an input terminal of a gate element IC3 with a photocoupler PC1, and to drive the switch element Q2 with the gate element IC3. Although in this circuit, it is necessary to receive the power for driving the gate element IC3 and the photocoupler PC1 from the DC-DC converter 2 in the light apparatus, the circuit configuration of the communication unit 30 can be simplified compared with the circuit configuration shown in FIG. 43B. Then, FIG. 43D shows yet another circuit example of the communication unit 30. The circuit is configured to communicate the optical communication signal S1 into an input terminal of a gate element IC3 with a pulse transformer T2, and to drive the switch element Q2. Also, in this circuit, the circuit configuration of the communication unit 30 can be simplified.

In addition, in each of the above-mentioned embodiments, a light emitting diode is used as a light source, but instead of the light emitting diode, an organic electroluminescence (an organic light emitting diode OLD1) may be used.

Although the present invention has been described with reference to certain preferred embodiments, numerous modifications and variations can be made by those skilled in the art without departing from the true spirit and scope of this invention, namely claims.

The invention claimed is:

1. An illuminating light communication device including an illuminating light communication circuit that superimposes, on illuminating light, modulation light in accordance with a binary signal for an optical communication, and output superimposed light, the illuminating light communication circuit comprising:
   a constant current source;
   a smoothing circuit connected across output ends of the constant current source;
   a load circuit comprising a light emitting diode for emitting the illumination light, one end of the load circuit being connected to one of output ends of the constant current source;
   an auxiliary load, one end of the auxiliary load being connected to the load circuit; and
   a switch;
   a signal generation circuit for generating the binary signal for the optical communication based on communication data and for controlling the switch by the binary signal,
   wherein in the illuminating light communication circuit, when the auxiliary load is added to the load circuit, a load characteristic of the load circuit changes,
   wherein the constant current source comprises a constant current feedback system, which comprises a converter generating a DC output, a current sensing circuit generating a voltage drop depending on a load current flowing to the load circuit, a differential amplifier, and a controller, wherein the differential amplifier amplifies a difference between the voltage drop generated in the current sensing circuit and a predetermined reference voltage, wherein the controller controls an output of the converter so that an average value of the load current becomes generally constant in accordance with an output of the differential amplifier, wherein the switch is controlled by the binary signal for the optical communication output from the signal generation circuit to add the auxiliary load to the load circuit or not in accordance with the binary signal for the optical communication, thereby superimposing the communication data to the illuminating light, and wherein the switch is controlled to be switched on/off in a high frequency domain by the binary signal for the optical communication.

2. The illuminating light communication device as claimed in claim 1, wherein the auxiliary load is a resistor which is connected in series to the light emitting diode, and wherein the switch is connected in parallel to the resistor.

3. The illuminating light communication device as claimed in claim 2, wherein the load circuit comprises a plurality of load circuits, each comprising the light emitting diode, the plurality of load circuits being connected in parallel between outputs of the constant current source, and wherein at least one of the plurality of load circuits is provided with the auxiliary load and the switch.

4. The illuminating light communication device as claimed in claim 3, wherein the plurality of load circuits comprises at least a first load circuit comprising a first light emitting diode and a second load circuit comprising a second light emitting diode, and the switch comprises at least a first switch and a second switch, the first load circuit is connected to the first switch and the second load circuit connected to the second switch, and the second light emitting diode has a different emission color from the first light emitting diode.

5. The illuminating light communication device as claimed in claim 1, wherein the auxiliary load comprises a constant voltage circuit, which includes at least a constant voltage element connected in series to the light emitting diode, and wherein the switch is connected in parallel to the constant voltage circuit.

6. The illuminating light communication device as claimed in claim 5, wherein the load circuit comprises a plurality of load circuits, each comprising the light emitting diode, the plurality of load circuits being connected in parallel between outputs of the constant current source, and wherein at least one of the plurality of load circuits is provided with the auxiliary load and the switch.

7. The illuminating light communication device as claimed in claim 6, wherein the plurality of load circuits comprises at least a first load circuit comprising a first light emitting diode and a second load circuit comprising a second light emitting diode, and the switch comprises at least a first switch and a second switch, the first load circuit is connected to the first switch and the second load circuit connected to the second switch, and the second light emitting diode has a different emission color from the first light emitting diode.

8. The illuminating light communication device as claimed in claim 1, wherein the load circuit comprises a plurality of load circuits, each comprising the light emitting diode, the plurality of load circuits being connected in parallel between outputs of the constant current source, and wherein at least one of the plurality of load circuits is provided with the auxiliary load and the switch.

9. The illuminating light communication device as claimed in claim 8, wherein the plurality of load circuits comprises at least a first load circuit comprising a first light emitting diode and a second load circuit comprising a second light emitting diode, and the switch comprises at least a first switch and a second switch, the first load circuit is connected to the first switch and the second load circuit connected to the second switch, and the second light emitting diode has a different emission color from the first light emitting diode.

10. The illuminating light communication device as claimed in claim 1, wherein the load circuit comprises the light emitting diode comprising a plurality of light emitting diodes which are connected in series, and wherein the switch is connected in parallel to a part of the plurality of light emitting diodes.

11. The illuminating light communication device as claimed in claim 1, wherein the load circuit comprises at least a first load circuit comprising first light emitting diodes connected in series and a second load circuit comprising second light emitting diodes connected in series, and the switch comprises at least a first switch and a second switch, the first and second load circuits being connected in parallel between outputs of the constant current source, respectively, wherein the first light emitting diodes have a different emission color from the second light emitting diodes, and wherein the first switch is connected in parallel to a part of the first light emitting diodes and the second switch is connected in parallel to a part of the second light emitting diodes.

12. The illuminating light communication device as claimed in claim 1, wherein the load circuit comprises at least a first load circuit and a second load circuit, the first and second load circuits being connected in parallel between outputs of the constant current source, wherein the switch is connected in series to at least the first load circuit, and is not connected to the second load circuit, and wherein the auxiliary load is the first load circuit to which the switch is connected in series.

13. The illuminating light communication device as claimed in claim 1, further comprising a duty regulation circuit that changes an on/off duty ratio of the binary signal for the optical communication.

14. The illuminating light communication device as claimed in claim 1, wherein the constant current feedback system is provided with a phase compensation circuit including an integral element, and adjusting a phase of the output of the differential amplifier.

15. The illuminating light communication device as claimed in claim 1, further comprising an insulation component for electrically isolating the switch from the signal generation circuit.

16. The illuminating light communication device as claimed in claim 15,
wherein the binary signal for the optical communication comprises at least a first signal group for the optical communication and a second signal group for the optical communication different from the first signal group,
wherein the insulation component comprises at least a first insulation component and a second insulation component,
wherein the switch includes a first switch provided for the first signal group and a second switch provided for the second signal group, and
wherein the first and second insulation components are located to electrically isolate the signal generation circuit from the first and second switches, respectively.

17. The illuminating light communication device as claimed in claim 1, further comprising:
a carrier wave generation circuit for generating a carrier wave, which is set so as to have a higher frequency than the binary signal for the optical communication, the frequency of the carrier wave is sufficiently high for the carrier wave to be separated from the binary signal for the optical communication;
a modulation circuit for modulating the binary signal for the optical communication with the carrier wave;
an isolation transformer connected between the modulation circuit and the switch; and
a demodulation circuit for outputting a signal, obtained by removing the carrier wave from an output of the isolation transformer, into the switch.

18. The illuminating light communication device as claimed in claim 1,
wherein the light emitting diode is an organic light emitting diode.

19. The illuminating light communication device as claimed in claim 1, wherein a connection of the auxiliary load is one selected from the group consisting of:
(i) the auxiliary load is connected in series with the load circuit, and in parallel with the switch;
(ii) the auxiliary load is connected in parallel with part of the load circuit, and in series with the switch;
(iii) plural load circuits connected in parallel are provided, and the auxiliary load is connected in series with one of the load circuits, and in parallel with the switch; and
(iv) the auxiliary load is connected in parallel with the load circuit, and in series with the switch.

20. The illuminating light communication device as claimed in claim 1, wherein the signal generation circuit receives the communication data from outside the illuminating light communication device.

21. The illuminating light communication device as claimed in claim 1, wherein the binary signal has a frequency such that when the illuminating light is modulated by superimposing the communication data, human eyes cannot recognize light modulation of the illuminating light.

* * * * *